(12) United States Patent
Platzer et al.

(10) Patent No.: US 9,760,272 B2
(45) Date of Patent: *Sep. 12, 2017

(54) APPLICATION PROGRAMMING INTERFACES FOR SCROLLING OPERATIONS

(71) Applicant: Apple Inc., Cupertino, CA (US)

(72) Inventors: Andrew Platzer, Santa Clara, CA (US); Scott Herz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,582

(22) Filed: Sep. 19, 2016

(65) Prior Publication Data

US 2017/0102850 A1    Apr. 13, 2017

Related U.S. Application Data

(60) Continuation of application No. 14/712,637, filed on May 14, 2015, now Pat. No. 9,448,712, which is a
(Continued)

(51) Int. Cl.
   *G06F 3/0488*    (2013.01)
   *G06F 3/0485*    (2013.01)
   *G06F 3/0484*    (2013.01)

(52) U.S. Cl.
   CPC ........ *G06F 3/0485* (2013.01); *G06F 3/04845* (2013.01); *G06F 3/04883* (2013.01); *G06F 2203/04808* (2013.01)

(58) Field of Classification Search
CPC .......... G06F 3/038; G06F 3/041; G06F 3/048; G06F 3/0481; G06F 3/0484;
(Continued)

(56) References Cited

U.S. PATENT DOCUMENTS 3,825,730 A    7/1974    Worthington, Jr. et al.
3,846,826 A    11/1974    Mueller
(Continued)

FOREIGN PATENT DOCUMENTS

AU    2007283771 A1    4/2008
CA    2755443 A1    9/2010
(Continued)

OTHER PUBLICATIONS

*Apple Inc.* vs. *Samsung Electronics Co. Ltd. et al.*, Judgment in Interlocutory proceeding, Case No. 396957/KG ZA 11-730, civil law sector,, , Aug. 24, 2011, pp. 1-65.
(Continued)

*Primary Examiner* — Xiomar L Bautista
(74) *Attorney, Agent, or Firm* — Morrison & Foerster LLP

(57) ABSTRACT

At least certain embodiments of the present disclosure include an environment with user interface software interacting with a software application. A method for operating through an application programming interface (API) in this environment includes transferring a set bounce call. The method further includes setting at least one of maximum and minimum bounce values. The set bounce call causes a bounce of a scrolled region in an opposite direction of a scroll based on a region past an edge of the scrolled region being visible in a display region at the end of the scroll.

18 Claims, 38 Drawing Sheets

Related U.S. Application Data continuation of application No. 14/189,922, filed on Feb. 25, 2014, now Pat. No. 9,037,995, which is a continuation of application No. 13/867,950, filed on Apr. 22, 2013, now Pat. No. 8,661,363, which is a continuation of application No. 12/869,182, filed on Aug. 26, 2010, now Pat. No. 8,429,557, which is a division of application No. 11/620,717, filed on Jan. 7, 2007, now Pat. No. 7,844,915.

(58) Field of Classification Search
CPC .. G06F 3/0485; G06F 3/0488; G06F 3/04855; G06F 3/04847; G06F 3/00; G06F 3/01; G06F 3/016; G06F 3/017; G06F 3/1626; G06F 9/4443
See application file for complete search history.

(56) References Cited

U.S. PATENT DOCUMENTS

| | | |
|---|---|---|
| 4,014,000 A | 3/1977 | Uno et al. |
| 4,146,924 A | 3/1979 | Birk et al. |
| 4,219,847 A | 8/1980 | Pinkney et al. |
| 4,290,052 A | 9/1981 | Eichelberger et al. |
| 4,305,071 A | 12/1981 | Bell et al. |
| 4,305,131 A | 12/1981 | Best |
| 4,340,911 A | 7/1982 | Kato et al. |
| 4,346,376 A | 8/1982 | Mallos |
| 4,375,674 A | 3/1983 | Thornton |
| 4,396,945 A | 8/1983 | Dimatteo et al. |
| 4,435,835 A | 3/1984 | Sakow et al. |
| 4,455,452 A | 6/1984 | Schuyler |
| 4,475,122 A | 10/1984 | Green |
| 4,484,179 A | 11/1984 | Kasday |
| 4,526,043 A | 7/1985 | Boie et al. |
| 4,542,375 A | 9/1985 | Alles et al. |
| 4,550,221 A | 10/1985 | Mabusth |
| 4,561,017 A | 12/1985 | Greene |
| 4,613,942 A | 9/1986 | Chen |
| 4,618,989 A | 10/1986 | Tsukune et al. |
| 4,629,319 A | 12/1986 | Clarke et al. |
| 4,631,525 A | 12/1986 | Serravalle |
| 4,631,676 A | 12/1986 | Pugh |
| 4,644,100 A | 2/1987 | Brenner et al. |
| 4,654,872 A | 3/1987 | Hisano et al. |
| 4,686,332 A | 8/1987 | Greanias et al. |
| 4,686,374 A | 8/1987 | Liptay-Wagner et al. |
| 4,710,760 A | 12/1987 | Kasday |
| 4,746,770 A | 5/1988 | Mcavinney |
| 4,755,811 A | 7/1988 | Slavin et al. |
| 4,763,356 A | 8/1988 | Day et al. |
| 4,787,040 A | 11/1988 | Ames et al. |
| 4,806,709 A | 2/1989 | Evans |
| 4,839,634 A | 6/1989 | More et al. |
| 4,843,568 A | 6/1989 | Krueger et al. |
| 4,914,624 A | 4/1990 | Dunthorn |
| 4,954,967 A | 9/1990 | Takahashi |
| 4,988,981 A | 1/1991 | Zimmerman et al. |
| 5,045,843 A | 9/1991 | Hansen |
| 5,046,434 A | 9/1991 | Breezer et al. |
| 5,072,294 A | 12/1991 | Engle |
| 5,073,950 A | 12/1991 | Colbert et al. |
| 5,105,186 A | 4/1992 | May |
| 5,113,041 A | 5/1992 | Blonder et al. |
| 5,119,079 A | 6/1992 | Hube et al. |
| 5,153,829 A | 10/1992 | Furuya et al. |
| 5,168,531 A | 12/1992 | Sigel |
| 5,186,629 A | 2/1993 | Rohen |
| 5,203,704 A | 4/1993 | Mccloud |
| 5,223,547 A | 6/1993 | Harada et al. |
| 5,227,985 A | 7/1993 | Dementhon |
| 5,231,381 A | 7/1993 | Duwaer |
| 5,233,547 A | 8/1993 | Kapp et al. |
| 5,235,509 A | 8/1993 | Mueller et al. |
| 5,252,951 A | 10/1993 | Tannenbaum et al. |
| 5,267,327 A | 11/1993 | Hirayama |
| RE34,476 E | 12/1993 | Norwood |
| 5,276,794 A | 1/1994 | Lamb, Jr. |
| 5,293,430 A | 3/1994 | Shiau et al. |
| 5,297,030 A | 3/1994 | Vassigh et al. |
| 5,327,161 A | 7/1994 | Logan et al. |
| 5,335,557 A | 8/1994 | Yasutake |
| 5,341,133 A | 8/1994 | Savoy et al. |
| 5,374,787 A | 12/1994 | Miller et al. |
| 5,412,189 A | 5/1995 | Cragun |
| 5,418,760 A | 5/1995 | Kawashima et al. |
| 5,428,367 A | 6/1995 | Mikan |
| 5,454,960 A | 10/1995 | Newsom |
| 5,459,793 A | 10/1995 | Naoi et al. |
| 5,463,388 A | 10/1995 | Boie et al. |
| 5,463,725 A | 10/1995 | Henckel et al. |
| 5,468,947 A | 11/1995 | Danielson et al. |
| 5,479,528 A | 12/1995 | Speeter |
| 5,483,261 A | 1/1996 | Yasutake |
| 5,488,204 A | 1/1996 | Mead et al. |
| 5,491,495 A | 2/1996 | Ward et al. |
| 5,495,269 A | 2/1996 | Elrod et al. |
| 5,495,566 A | 2/1996 | Kwatinetz |
| 5,511,148 A | 4/1996 | Wellner |
| 5,513,309 A | 4/1996 | Meier et al. |
| 5,528,266 A | 6/1996 | Arbeitman et al. |
| 5,530,456 A | 6/1996 | Kokubo |
| 5,534,893 A | 7/1996 | Hansen et al. |
| 5,543,588 A | 8/1996 | Bisset et al. |
| 5,543,591 A | 8/1996 | Gillespie et al. |
| 5,552,787 A | 9/1996 | Schuler et al. |
| 5,559,301 A | 9/1996 | Bryan et al. |
| 5,566,337 A | 10/1996 | Szymanski et al. |
| 5,570,113 A | 10/1996 | Zetts |
| 5,572,239 A | 11/1996 | Jaeger |
| 5,581,243 A | 12/1996 | Ouellette et al. |
| 5,583,543 A | 12/1996 | Takahashi et al. |
| 5,589,856 A | 12/1996 | Stein et al. |
| 5,594,806 A | 1/1997 | Colbert |
| 5,603,053 A | 2/1997 | Gough et al. |
| 5,627,567 A | 5/1997 | Davidson |
| 5,627,959 A | 5/1997 | Brown et al. |
| 5,638,093 A | 6/1997 | Takahashi et al. |
| 5,655,094 A | 8/1997 | Cline et al. |
| 5,676,064 A | 10/1997 | Shuert |
| 5,686,940 A | 11/1997 | Kuga |
| 5,708,460 A | 1/1998 | Young et al. |
| 5,709,219 A | 1/1998 | Chen et al. |
| 5,712,661 A | 1/1998 | Jaeger |
| 5,726,685 A | 3/1998 | Kuth et al. |
| 5,729,249 A | 3/1998 | Yasutake |
| 5,734,742 A | 3/1998 | Asaeda et al. |
| 5,745,116 A | 4/1998 | Pisutha-Arnond |
| 5,749,908 A | 5/1998 | Snell |
| 5,764,218 A | 6/1998 | Della et al. |
| 5,798,752 A | 8/1998 | Buxton et al. |
| 5,805,144 A | 9/1998 | Scholder et al. |
| 5,805,145 A | 9/1998 | Jaeger |
| 5,805,146 A | 9/1998 | Jaeger et al. |
| 5,805,161 A | 9/1998 | Tiphane |
| 5,809,166 A | 9/1998 | Huang et al. |
| 5,818,455 A | 10/1998 | Stone et al. |
| 5,825,352 A | 10/1998 | Bisset et al. |
| 5,835,079 A | 11/1998 | Shieh |
| 5,838,302 A | 11/1998 | Kuriyama et al. |
| 5,841,428 A | 11/1998 | Jaeger et al. |
| 5,844,547 A | 12/1998 | Minakuchi et al. |
| 5,850,358 A | 12/1998 | Danielson et al. |
| 5,856,822 A | 1/1999 | Du et al. |
| 5,859,631 A | 1/1999 | Bergman et al. |
| 5,864,636 A | 1/1999 | Chisaka |
| 5,867,149 A | 2/1999 | Jaeger |
| 5,867,158 A | 2/1999 | Murasaki et al. |
| 5,869,791 A | 2/1999 | Young |
| 5,871,251 A | 2/1999 | Welling et al. |
| 5,880,411 A | 3/1999 | Gillespie et al. |
| 5,898,434 A | 4/1999 | Small et al. |
| 5,903,902 A | 5/1999 | Orr et al. |
| 5,917,477 A | 6/1999 | Lee |

(56) References Cited

U.S. PATENT DOCUMENTS

| | | |
|---|---|---|
| 5,923,319 A | 7/1999 | Bishop et al. |
| 5,936,613 A | 8/1999 | Jaeger et al. |
| 5,942,733 A | 8/1999 | Allen et al. |
| 5,943,043 A | 8/1999 | Furuhata et al. |
| 5,943,052 A | 8/1999 | Allen et al. |
| 5,949,345 A | 9/1999 | Beckert et al. |
| 5,956,020 A | 9/1999 | D'Amico et al. |
| 5,982,352 A | 11/1999 | Pryor |
| 5,982,355 A | 11/1999 | Jaeger et al. |
| 5,995,104 A | 11/1999 | Kataoka et al. |
| 6,002,808 A | 12/1999 | Freeman |
| 6,008,800 A | 12/1999 | Pryor |
| 6,016,355 A | 1/2000 | Dickinson et al. |
| 6,028,271 A | 2/2000 | Gillespie et al. |
| 6,028,602 A | 2/2000 | Weidenfeller et al. |
| 6,029,214 A | 2/2000 | Dorfman et al. |
| 6,034,688 A | 3/2000 | Greenwood et al. |
| 6,035,343 A | 3/2000 | Tsushima et al. |
| 6,037,882 A | 3/2000 | Levy |
| 6,037,937 A | 3/2000 | Beaton et al. |
| 6,057,540 A | 5/2000 | Gordon et al. |
| 6,061,063 A | 5/2000 | Wagner et al. |
| 6,066,075 A | 5/2000 | Poulton |
| 6,067,068 A | 5/2000 | Hussain |
| 6,089,371 A | 7/2000 | Lin |
| 6,100,874 A | 8/2000 | Schena et al. |
| 6,111,577 A | 8/2000 | Zilles et al. |
| 6,121,960 A | 9/2000 | Carroll et al. |
| 6,141,018 A | 10/2000 | Beri et al. |
| 6,169,538 B1 | 1/2001 | Nowlan et al. |
| 6,175,610 B1 | 1/2001 | Peter |
| 6,188,391 B1 | 2/2001 | Seely et al. |
| 6,208,329 B1 | 3/2001 | Ballare |
| 6,219,035 B1 | 4/2001 | Skog |
| 6,222,465 B1 | 4/2001 | Kumar et al. |
| 6,239,389 B1 | 5/2001 | Allen et al. |
| 6,255,604 B1 | 7/2001 | Tokioka et al. |
| 6,256,020 B1 | 7/2001 | Pabon et al. |
| 6,259,436 B1 | 7/2001 | Moon et al. |
| 6,262,717 B1 | 7/2001 | Donohue et al. |
| 6,278,441 B1 | 8/2001 | Gouzman et al. |
| 6,278,443 B1 | 8/2001 | Amro et al. |
| 6,310,610 B1 | 10/2001 | Beaton et al. |
| 6,311,162 B1 | 10/2001 | Reichwein et al. |
| 6,313,849 B1 | 11/2001 | Takase et al. |
| 6,313,853 B1 | 11/2001 | Lamontagne et al. |
| 6,323,846 B1 | 11/2001 | Westerman et al. |
| 6,330,009 B1 | 12/2001 | Murasaki et al. |
| 6,337,698 B1 | 1/2002 | Keely et al. |
| 6,369,821 B2 | 4/2002 | Merrill et al. |
| 6,380,929 B1 | 4/2002 | Platt |
| 6,393,401 B1 | 5/2002 | Loudermilk et al. |
| 6,414,672 B2 | 7/2002 | Rekimoto et al. |
| 6,421,042 B1 | 7/2002 | Omura et al. |
| 6,421,046 B1 | 7/2002 | Edgren |
| 6,429,846 B2 | 8/2002 | Rosenberg et al. |
| 6,441,806 B1 | 8/2002 | Jaeger |
| 6,446,083 B1 | 9/2002 | Leight et al. |
| 6,466,203 B2 | 10/2002 | Van Ee |
| 6,486,896 B1 | 11/2002 | Ubillos |
| 6,489,951 B1 | 12/2002 | Wong et al. |
| 6,492,979 B1 | 12/2002 | Kent et al. |
| 6,498,590 B1 | 12/2002 | Dietz et al. |
| 6,504,530 B1 | 1/2003 | Wilson et al. |
| 6,509,907 B1 | 1/2003 | Kuwabara |
| 6,538,635 B1 | 3/2003 | Ringot |
| 6,552,719 B2 | 4/2003 | Lui et al. |
| 6,559,869 B1 | 5/2003 | Lui et al. |
| 6,563,492 B1 | 5/2003 | Furuya |
| 6,567,102 B2 | 5/2003 | Kung |
| 6,570,557 B1 | 5/2003 | Westerman et al. |
| 6,570,594 B1 | 5/2003 | Wagner |
| 6,590,595 B1 | 7/2003 | Wagner et al. |
| 6,597,347 B1 | 7/2003 | Yasutake |
| 6,636,242 B2 | 10/2003 | Bowman-Amuah |
| 6,639,584 B1 | 10/2003 | Li |
| 6,657,615 B2 | 12/2003 | Harada |
| 6,661,409 B2 | 12/2003 | Demartines et al. |
| 6,664,982 B1 | 12/2003 | Bi |
| 6,664,989 B1 | 12/2003 | Snyder et al. |
| 6,677,932 B1 | 1/2004 | Westerman |
| 6,677,965 B1 | 1/2004 | Ullmann et al. |
| 6,683,628 B1 | 1/2004 | Nakagawa et al. |
| 6,690,365 B2 | 2/2004 | Hinckley et al. |
| 6,690,387 B2 | 2/2004 | Zimmerman et al. |
| 6,707,449 B2 | 3/2004 | Hinckley et al. |
| 6,714,221 B1 | 3/2004 | Christie et al. |
| 6,714,936 B1 | 3/2004 | Nevin, III |
| 6,720,949 B1 | 4/2004 | Pryor et al. |
| 6,727,891 B2 | 4/2004 | Moriya et al. |
| 6,735,583 B1 | 5/2004 | Bjarnestam et al. |
| 6,741,996 B1 | 5/2004 | Brechner et al. |
| 6,750,848 B1 | 6/2004 | Pryor |
| 6,757,673 B2 | 6/2004 | Makus et al. |
| 6,765,557 B1 | 7/2004 | Segal et al. |
| 6,778,992 B1 | 8/2004 | Searle et al. |
| 6,788,815 B2 | 9/2004 | Lui et al. |
| 6,791,530 B2 | 9/2004 | Vernier et al. |
| 6,809,724 B1 | 10/2004 | Shiraishi et al. |
| 6,820,237 B1 | 11/2004 | Abu-Hakima et al. |
| 6,831,631 B2 | 12/2004 | Chuang |
| 6,839,721 B2 | 1/2005 | Schwols |
| 6,856,259 B1 | 2/2005 | Sharp |
| 6,856,326 B1 | 2/2005 | Zhai |
| 6,888,532 B2 | 5/2005 | Wong et al. |
| 6,888,536 B2 | 5/2005 | Westerman et al. |
| 6,903,927 B2 | 6/2005 | Anlauff |
| 6,907,575 B2 | 6/2005 | Duarte |
| 6,912,462 B2 | 6/2005 | Ogaki |
| 6,920,619 B1 | 7/2005 | Milekic |
| 6,924,790 B1 | 8/2005 | Bi |
| 6,938,222 B2 | 8/2005 | Hullender et al. |
| 6,957,392 B2 | 10/2005 | Simister et al. |
| 6,958,749 B1 | 10/2005 | Matsushita et al. |
| 6,963,937 B1 | 11/2005 | Kamper et al. |
| 6,970,160 B2 | 11/2005 | Mulligan et al. |
| 6,972,749 B2 | 12/2005 | Hinckley et al. |
| 6,972,776 B2 | 12/2005 | Davis et al. |
| 6,975,306 B2 | 12/2005 | Hinckley et al. |
| 6,985,137 B2 | 1/2006 | Kaikuranta |
| 6,985,178 B1 | 1/2006 | Morita et al. |
| 7,009,599 B2 | 3/2006 | Pihlaja |
| 7,009,626 B2 | 3/2006 | Anwar |
| 7,013,435 B2 | 3/2006 | Gallo et al. |
| 7,015,894 B2 | 3/2006 | Morohoshi |
| 7,023,427 B2 | 4/2006 | Kraus et al. |
| 7,030,860 B1 | 4/2006 | Hsu et al. |
| 7,030,861 B1 | 4/2006 | Westerman et al. |
| 7,030,862 B2 | 4/2006 | Nozaki |
| 7,046,230 B2 | 5/2006 | Zadesky et al. |
| 7,061,474 B2 | 6/2006 | Hinckley et al. |
| 7,075,512 B1 | 7/2006 | Fabre et al. |
| 7,081,886 B2 | 7/2006 | Nakano et al. |
| 7,084,859 B1 | 8/2006 | Pryor |
| 7,088,374 B2 | 8/2006 | David et al. |
| 7,102,626 B2 | 9/2006 | Denny, III |
| 7,109,978 B2 | 9/2006 | Gillespie et al. |
| 7,117,453 B2 | 10/2006 | Drucker et al. |
| 7,138,983 B2 | 11/2006 | Wakai et al. |
| 7,152,210 B1 | 12/2006 | Van Den Hoven et al. |
| 7,154,534 B2 | 12/2006 | Seki et al. |
| 7,155,048 B2 | 12/2006 | Ohara |
| 7,173,623 B2 | 2/2007 | Calkins et al. |
| 7,180,500 B2 | 2/2007 | Marvit et al. |
| 7,181,373 B2 | 2/2007 | Le Cocq et al. |
| 7,184,064 B2 | 2/2007 | Zimmerman et al. |
| 7,184,796 B2 | 2/2007 | Karidis et al. |
| 7,202,857 B2 | 4/2007 | Hinckley et al. |
| 7,240,291 B2 | 7/2007 | Card et al. |
| 7,254,775 B2 | 8/2007 | Geaghan et al. |
| 7,256,767 B2 | 8/2007 | Wong et al. |
| 7,283,126 B2 | 10/2007 | Leung |
| 7,337,412 B2 | 2/2008 | Guido et al. |
| RE40,153 E | 3/2008 | Westerman et al. |

(56) References Cited

U.S. PATENT DOCUMENTS

| | | |
|---|---|---|
| 7,339,580 B2 | 3/2008 | Westerman et al. |
| 7,346,850 B2 | 3/2008 | Swartz et al. |
| 7,355,620 B2 | 4/2008 | Ikehata et al. |
| 7,382,139 B2 | 6/2008 | Mackey |
| 7,385,592 B2 | 6/2008 | Collins |
| 7,411,575 B2 | 8/2008 | Hill et al. |
| 7,446,783 B2 | 11/2008 | Grossman |
| 7,450,113 B2 | 11/2008 | Gillespie et al. |
| 7,450,114 B2 | 11/2008 | Anwar |
| 7,469,381 B2 | 12/2008 | Ording |
| 7,479,949 B2 | 1/2009 | Jobs et al. |
| 7,487,447 B1 | 2/2009 | Jerger |
| 7,499,027 B2 | 3/2009 | Brigham et al. |
| 7,508,375 B2 | 3/2009 | Liu |
| 7,511,702 B2 | 3/2009 | Hotelling |
| 7,532,205 B2 | 5/2009 | Gillespie et al. |
| 7,561,159 B2 | 7/2009 | Abel et al. |
| 7,564,448 B2 | 7/2009 | Yi |
| 7,576,732 B2 | 8/2009 | Lii |
| 7,598,949 B2 | 10/2009 | Han |
| 7,612,786 B2 | 11/2009 | Vale et al. |
| 7,614,008 B2 | 11/2009 | Ording |
| 7,614,019 B2 | 11/2009 | Rimas Ribikauskas et al. |
| 7,653,883 B2 | 1/2010 | Hotelling et al. |
| 7,658,675 B2 | 2/2010 | Hotta |
| 7,663,607 B2 | 2/2010 | Hotelling et al. |
| 7,673,255 B2 | 3/2010 | Schechter et al. |
| 7,701,442 B2 | 4/2010 | Wong et al. |
| 7,719,523 B2 | 5/2010 | Hillis |
| 7,724,242 B2 | 5/2010 | Hillis et al. |
| 7,728,821 B2 | 6/2010 | Hillis et al. |
| 7,735,016 B2 | 6/2010 | Celik et al. |
| 7,750,893 B2 | 7/2010 | Hashimoto et al. |
| 7,786,975 B2 | 8/2010 | Ording et al. |
| 7,812,826 B2 | 10/2010 | Ording et al. |
| 7,839,391 B2 | 11/2010 | Varian et al. |
| 7,843,427 B2 | 11/2010 | Ording et al. |
| 7,843,429 B2 | 11/2010 | Pryor |
| 7,844,913 B2 | 11/2010 | Amano et al. |
| 7,844,915 B2 | 11/2010 | Platzer et al. |
| 7,864,037 B2 | 1/2011 | Miller |
| 7,872,640 B2 | 1/2011 | Lira |
| 7,872,652 B2 | 1/2011 | Platzer et al. |
| 7,900,156 B2 | 3/2011 | Andre |
| 7,903,115 B2 | 3/2011 | Platzer et al. |
| 7,907,124 B2 | 3/2011 | Hillis et al. |
| 7,907,125 B2 | 3/2011 | Weiss et al. |
| 7,917,584 B2 | 3/2011 | Arthursson |
| 7,924,271 B2 | 4/2011 | Christie et al. |
| 7,925,996 B2 | 4/2011 | Hofmeister et al. |
| 7,941,760 B2 | 5/2011 | Kocienda et al. |
| 7,956,847 B2 | 6/2011 | Christie |
| 7,962,862 B2 | 6/2011 | Kulp et al. |
| 7,966,578 B2 | 6/2011 | Tolmasky et al. |
| 7,995,030 B2 | 8/2011 | Joung et al. |
| 8,051,406 B2 | 11/2011 | Knight et al. |
| 8,091,045 B2 | 1/2012 | Christie et al. |
| 8,112,299 B2 | 2/2012 | Kim et al. |
| 8,115,744 B2 | 2/2012 | Kong et al. |
| 8,135,171 B2 | 3/2012 | Ho et al. |
| 8,140,570 B2 | 3/2012 | Ingrassia et al. |
| 8,171,432 B2 | 5/2012 | Matas et al. |
| 8,174,502 B2 | 5/2012 | Bolsinga et al. |
| 8,214,768 B2 | 7/2012 | Boule et al. |
| 8,239,784 B2 | 8/2012 | Hotelling et al. |
| 8,253,695 B2 | 8/2012 | Ganatra et al. |
| 8,285,499 B2 | 10/2012 | Moore et al. |
| 8,289,289 B2 | 10/2012 | Rimon et al. |
| 8,291,344 B2 | 10/2012 | Chaudhri |
| 8,296,332 B2 | 10/2012 | Boley et al. |
| 8,310,459 B2 | 11/2012 | Nurmi |
| 8,314,775 B2 | 11/2012 | Westerman et al. |
| 8,428,893 B2 | 4/2013 | Moore et al. |
| 8,489,783 B2 | 7/2013 | Wilson |
| 8,560,975 B2 | 10/2013 | Beaver et al. |
| 8,566,044 B2 | 10/2013 | Shaffer et al. |
| 8,566,045 B2 | 10/2013 | Shaffer et al. |
| 8,570,277 B2 * | 10/2013 | Rekimoto ............ G06F 1/1616 178/18.01 |
| 8,645,827 B2 | 2/2014 | Beaver et al. |
| 8,661,363 B2 | 2/2014 | Platzer et al. |
| 8,682,602 B2 | 3/2014 | Moore et al. |
| 9,037,995 B2 | 5/2015 | Platzer et al. |
| 9,448,712 B2 | 9/2016 | Platzer et al. |
| 2001/0009033 A1 | 7/2001 | Morisaki et al. |
| 2001/0011998 A1 | 8/2001 | Agata et al. |
| 2001/0012001 A1 | 8/2001 | Rekimoto et al. |
| 2001/0028369 A1 | 10/2001 | Gallo et al. |
| 2001/0035880 A1 | 11/2001 | Musatov et al. |
| 2001/0045949 A1 | 11/2001 | Chithambaram et al. |
| 2002/0015024 A1 | 2/2002 | Westerman et al. |
| 2002/0015064 A1 | 2/2002 | Robotham et al. |
| 2002/0018051 A1 | 2/2002 | Singh |
| 2002/0036618 A1 | 3/2002 | Wakai et al. |
| 2002/0056575 A1 | 5/2002 | Keely et al. |
| 2002/0067346 A1 | 6/2002 | Mouton |
| 2002/0130839 A1 | 9/2002 | Wallace et al. |
| 2002/0158838 A1 | 10/2002 | Smith et al. |
| 2002/0191029 A1 | 12/2002 | Gillespie et al. |
| 2002/0194589 A1 | 12/2002 | Cristofalo et al. |
| 2003/0016252 A1 | 1/2003 | Noy et al. |
| 2003/0071850 A1 | 4/2003 | Geidl |
| 2003/0071858 A1 | 4/2003 | Morohoshi |
| 2003/0080946 A1 | 5/2003 | Chuang |
| 2003/0085870 A1 | 5/2003 | Hinckley |
| 2003/0095096 A1 | 5/2003 | Robbin et al. |
| 2003/0095135 A1 | 5/2003 | Kaasila et al. |
| 2003/0095697 A1 | 5/2003 | Wood et al. |
| 2003/0122787 A1 | 7/2003 | Zimmerman et al. |
| 2003/0132959 A1 | 7/2003 | Simister et al. |
| 2003/0146941 A1 | 8/2003 | Bailey et al. |
| 2003/0159567 A1 | 8/2003 | Subotnick |
| 2003/0160832 A1 | 8/2003 | Ridgley et al. |
| 2003/0167119 A1 | 9/2003 | Cherveny |
| 2003/0174149 A1 | 9/2003 | Fujisaki et al. |
| 2003/0184525 A1 | 10/2003 | Tsai |
| 2003/0184593 A1 | 10/2003 | Dunlop |
| 2003/0193481 A1 | 10/2003 | Sokolsky |
| 2003/0197689 A1 | 10/2003 | May |
| 2003/0210258 A1 | 11/2003 | Williams |
| 2003/0222917 A1 | 12/2003 | Trantow |
| 2003/0231168 A1 | 12/2003 | Bell et al. |
| 2004/0001627 A1 | 1/2004 | Simmons et al. |
| 2004/0012572 A1 | 1/2004 | Sowden et al. |
| 2004/0021676 A1 | 2/2004 | Chen et al. |
| 2004/0021694 A1 | 2/2004 | Doar |
| 2004/0021698 A1 | 2/2004 | Baldwin et al. |
| 2004/0027398 A1 | 2/2004 | Jaeger |
| 2004/0034801 A1 | 2/2004 | Jaeger |
| 2004/0039474 A1 | 2/2004 | Kontani |
| 2004/0056837 A1 | 3/2004 | Koga et al. |
| 2004/0070573 A1 | 4/2004 | Graham |
| 2004/0080541 A1 | 4/2004 | Saiga et al. |
| 2004/0095387 A1 | 5/2004 | Demsey et al. |
| 2004/0100479 A1 | 5/2004 | Nakano et al. |
| 2004/0108995 A1 | 6/2004 | Hoshino et al. |
| 2004/0119700 A1 | 6/2004 | Ichikawa |
| 2004/0125136 A1 | 7/2004 | Wallenius |
| 2004/0135817 A1 | 7/2004 | Daughtery et al. |
| 2004/0155888 A1 | 8/2004 | Padgitt et al. |
| 2004/0160419 A1 | 8/2004 | Padgitt |
| 2004/0160420 A1 | 8/2004 | Baharav et al. |
| 2004/0161132 A1 | 8/2004 | Cohen et al. |
| 2004/0167919 A1 | 8/2004 | Sterling et al. |
| 2004/0189720 A1 | 9/2004 | Wilson et al. |
| 2004/0210847 A1 | 10/2004 | Berson et al. |
| 2004/0215643 A1 | 10/2004 | Brechner et al. |
| 2004/0222992 A1 | 11/2004 | Calkins et al. |
| 2004/0224638 A1 | 11/2004 | Fadell et al. |
| 2004/0263486 A1 | 12/2004 | Seni |
| 2005/0005241 A1 | 1/2005 | Hunleth et al. |
| 2005/0008343 A1 | 1/2005 | Frohlich et al. |
| 2005/0012723 A1 | 1/2005 | Pallakoff |
| 2005/0017957 A1 | 1/2005 | Yi |

(56) References Cited

U.S. PATENT DOCUMENTS

| | | |
|---|---|---|
| 2005/0024341 A1 | 2/2005 | Gillespie et al. |
| 2005/0027666 A1 | 2/2005 | Beck et al. |
| 2005/0030255 A1 | 2/2005 | Chiu et al. |
| 2005/0041385 A1 | 2/2005 | Kikinis et al. |
| 2005/0046621 A1 | 3/2005 | Kaikuranta et al. |
| 2005/0052427 A1 | 3/2005 | Wu et al. |
| 2005/0057524 A1 | 3/2005 | Hill et al. |
| 2005/0088418 A1 | 4/2005 | Nguyen |
| 2005/0088443 A1 | 4/2005 | Blanco et al. |
| 2005/0093868 A1 | 5/2005 | Hinckley |
| 2005/0110769 A1 | 5/2005 | DaCosta et al. |
| 2005/0114788 A1 | 5/2005 | Fabritius |
| 2005/0122806 A1 | 6/2005 | Arakawa et al. |
| 2005/0145807 A1 | 7/2005 | Lapstun et al. |
| 2005/0162402 A1 | 7/2005 | Watanachote |
| 2005/0168353 A1 | 8/2005 | Dement et al. |
| 2005/0168488 A1 | 8/2005 | Montague |
| 2005/0179648 A1 | 8/2005 | Barabe et al. |
| 2005/0183035 A1 | 8/2005 | Ringel et al. |
| 2005/0190144 A1 | 9/2005 | Kong |
| 2005/0193015 A1 | 9/2005 | Logston et al. |
| 2005/0193351 A1 | 9/2005 | Huoviala |
| 2005/0195154 A1 | 9/2005 | Robbins et al. |
| 2005/0198588 A1 | 9/2005 | Lin et al. |
| 2005/0210419 A1 | 9/2005 | Kela et al. |
| 2005/0212754 A1 | 9/2005 | Marvit et al. |
| 2005/0237308 A1 | 10/2005 | Autio et al. |
| 2005/0268247 A1 | 12/2005 | Baneth |
| 2005/0270269 A1 | 12/2005 | Tokkonen |
| 2005/0275618 A1 | 12/2005 | Juh et al. |
| 2005/0275636 A1 | 12/2005 | Dehlin et al. |
| 2006/0001650 A1 | 1/2006 | Robbins et al. |
| 2006/0001652 A1 | 1/2006 | Chiu et al. |
| 2006/0007174 A1 | 1/2006 | Shen |
| 2006/0007176 A1 | 1/2006 | Shen |
| 2006/0007178 A1 | 1/2006 | Davis |
| 2006/0010400 A1 | 1/2006 | Dehlin et al. |
| 2006/0022955 A1 | 2/2006 | Kennedy |
| 2006/0022956 A1 | 2/2006 | Lengeling et al. |
| 2006/0025218 A1 | 2/2006 | Hotta |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0026676 A1 | 2/2006 | O'Donoghue |
| 2006/0028428 A1 | 2/2006 | Dai et al. |
| 2006/0028455 A1 | 2/2006 | Hinckley et al. |
| 2006/0031786 A1 | 2/2006 | Hillis et al. |
| 2006/0033751 A1 | 2/2006 | Keely et al. |
| 2006/0036955 A1 | 2/2006 | Baudisch et al. |
| 2006/0038796 A1 | 2/2006 | Hinckley et al. |
| 2006/0044259 A1 | 3/2006 | Hotelling et al. |
| 2006/0047386 A1 | 3/2006 | Kanevsky et al. |
| 2006/0048073 A1 | 3/2006 | Jarrett et al. |
| 2006/0049920 A1 | 3/2006 | Sadler et al. |
| 2006/0055662 A1 | 3/2006 | Rimas-Ribikauskas et al. |
| 2006/0055669 A1 | 3/2006 | Das |
| 2006/0061551 A1 | 3/2006 | Fateh |
| 2006/0066588 A1 | 3/2006 | Lyon et al. |
| 2006/0077183 A1 | 4/2006 | Studt |
| 2006/0077544 A1 | 4/2006 | Stark |
| 2006/0082549 A1 | 4/2006 | Hoshino et al. |
| 2006/0084852 A1 | 4/2006 | Mason et al. |
| 2006/0092142 A1 | 5/2006 | Gillespie et al. |
| 2006/0094502 A1 | 5/2006 | Katayama et al. |
| 2006/0097991 A1 | 5/2006 | Hotelling et al. |
| 2006/0101354 A1 | 5/2006 | Hashimoto et al. |
| 2006/0112335 A1 | 5/2006 | Hofmeister et al. |
| 2006/0123353 A1 | 6/2006 | Matthews et al. |
| 2006/0125799 A1 | 6/2006 | Hillis et al. |
| 2006/0125803 A1 | 6/2006 | Westerman et al. |
| 2006/0132460 A1 | 6/2006 | Kolmykov-Zotov et al. |
| 2006/0136833 A1 | 6/2006 | Dettinger et al. |
| 2006/0156249 A1 | 7/2006 | Blythe et al. |
| 2006/0161871 A1 | 7/2006 | Hotelling et al. |
| 2006/0164399 A1 | 7/2006 | Cheston et al. |
| 2006/0181510 A1 | 8/2006 | Faith |
| 2006/0181519 A1 | 8/2006 | Vernier et al. |
| 2006/0187215 A1 | 8/2006 | Rosenberg et al. |
| 2006/0190833 A1 | 8/2006 | Sangiovanni et al. |
| 2006/0197753 A1 | 9/2006 | Hotelling |
| 2006/0202953 A1 | 9/2006 | Pryor et al. |
| 2006/0210958 A1 | 9/2006 | Rimas-Ribikauskas et al. |
| 2006/0227116 A1 | 10/2006 | Zotov et al. |
| 2006/0236263 A1 | 10/2006 | Bathiche et al. |
| 2006/0238495 A1 | 10/2006 | Davis |
| 2006/0242602 A1 | 10/2006 | Schechter et al. |
| 2006/0242607 A1* | 10/2006 | Hudson ............... G06F 3/04817 715/863 |
| 2006/0250377 A1 | 11/2006 | Zadesky et al. |
| 2006/0253793 A1 | 11/2006 | Zhai et al. |
| 2006/0267959 A1 | 11/2006 | Goto et al. |
| 2006/0279548 A1 | 12/2006 | Geaghan |
| 2006/0284792 A1 | 12/2006 | Foxlin |
| 2006/0288313 A1 | 12/2006 | Hillis |
| 2006/0294472 A1 | 12/2006 | Cheng et al. |
| 2007/0008066 A1 | 1/2007 | Fukuda |
| 2007/0013697 A1 | 1/2007 | Gilboa |
| 2007/0024646 A1 | 2/2007 | Saarinen et al. |
| 2007/0028191 A1 | 2/2007 | Tsuji |
| 2007/0035513 A1 | 2/2007 | Sherrard et al. |
| 2007/0036346 A1 | 2/2007 | Kwon |
| 2007/0046643 A1 | 3/2007 | Hillis et al. |
| 2007/0046646 A1 | 3/2007 | Kwon et al. |
| 2007/0050469 A1 | 3/2007 | Gupta et al. |
| 2007/0055967 A1 | 3/2007 | Poff et al. |
| 2007/0061126 A1 | 3/2007 | Russo et al. |
| 2007/0064004 A1 | 3/2007 | Bonner et al. |
| 2007/0064869 A1 | 3/2007 | Albert |
| 2007/0067745 A1 | 3/2007 | Choi et al. |
| 2007/0075965 A1 | 4/2007 | Huppi et al. |
| 2007/0081726 A1 | 4/2007 | Westerman et al. |
| 2007/0089069 A1 | 4/2007 | Hsieh et al. |
| 2007/0109275 A1 | 5/2007 | Chuang |
| 2007/0109279 A1 | 5/2007 | Sigona |
| 2007/0120835 A1 | 5/2007 | Sato |
| 2007/0132789 A1 | 6/2007 | Ording et al. |
| 2007/0146337 A1 | 6/2007 | Ording et al. |
| 2007/0149252 A1 | 6/2007 | Jobs et al. |
| 2007/0150826 A1 | 6/2007 | Anzures et al. |
| 2007/0150842 A1 | 6/2007 | Chaudhri et al. |
| 2007/0152976 A1 | 7/2007 | Townsend et al. |
| 2007/0152978 A1 | 7/2007 | Kocienda et al. |
| 2007/0152979 A1 | 7/2007 | Jobs et al. |
| 2007/0152984 A1 | 7/2007 | Ording et al. |
| 2007/0155434 A1 | 7/2007 | Jobs et al. |
| 2007/0156364 A1 | 7/2007 | Rothkopf |
| 2007/0157089 A1 | 7/2007 | Van Os et al. |
| 2007/0157094 A1 | 7/2007 | Lemay et al. |
| 2007/0174257 A1 | 7/2007 | Howard |
| 2007/0176903 A1 | 8/2007 | Dahlin et al. |
| 2007/0177803 A1 | 8/2007 | Elias et al. |
| 2007/0177804 A1 | 8/2007 | Elias et al. |
| 2007/0185876 A1 | 8/2007 | Mendis et al. |
| 2007/0198926 A1 | 8/2007 | Joguet et al. |
| 2007/0214462 A1 | 9/2007 | Boillot |
| 2007/0236475 A1 | 10/2007 | Wherry |
| 2007/0242056 A1 | 10/2007 | Engelhardt et al. |
| 2007/0242607 A1 | 10/2007 | Sadler et al. |
| 2007/0247435 A1 | 10/2007 | Benko et al. |
| 2007/0247442 A1 | 10/2007 | Andre et al. |
| 2007/0252821 A1 | 11/2007 | Hollemans et al. |
| 2007/0256026 A1 | 11/2007 | Klassen et al. |
| 2007/0257891 A1 | 11/2007 | Esenther et al. |
| 2007/0262964 A1 | 11/2007 | Zotov et al. |
| 2007/0277124 A1 | 11/2007 | Shin et al. |
| 2007/0288856 A1 | 12/2007 | Butlin et al. |
| 2007/0291009 A1 | 12/2007 | Wright et al. |
| 2008/0001923 A1 | 1/2008 | Hall et al. |
| 2008/0005703 A1 | 1/2008 | Radivojevic et al. |
| 2008/0012835 A1 | 1/2008 | Rimon et al. |
| 2008/0016096 A1 | 1/2008 | Wilding et al. |
| 2008/0028327 A1 | 1/2008 | Hirota et al. |
| 2008/0034029 A1 | 2/2008 | Fang et al. |
| 2008/0036743 A1 | 2/2008 | Westerman et al. |

(56) References Cited

U.S. PATENT DOCUMENTS

| | | |
|---|---|---|
| 2008/0043020 A1 | 2/2008 | Snow et al. |
| 2008/0046425 A1 | 2/2008 | Perski |
| 2008/0048978 A1 | 2/2008 | Trent et al. |
| 2008/0052945 A1 | 3/2008 | Matas et al. |
| 2008/0062207 A1 | 3/2008 | Park |
| 2008/0084400 A1 | 4/2008 | Rosenberg |
| 2008/0088602 A1 | 4/2008 | Hotelling |
| 2008/0094356 A1 | 4/2008 | Ording et al. |
| 2008/0094368 A1 | 4/2008 | Ording et al. |
| 2008/0094369 A1 | 4/2008 | Ganatra et al. |
| 2008/0094370 A1 | 4/2008 | Ording et al. |
| 2008/0104544 A1 | 5/2008 | Collins et al. |
| 2008/0114614 A1 | 5/2008 | Mahesh et al. |
| 2008/0120576 A1 | 5/2008 | Kariathungal et al. |
| 2008/0158191 A1 | 7/2008 | Yang et al. |
| 2008/0162751 A1 | 7/2008 | Wilson |
| 2008/0165132 A1 | 7/2008 | Weiss et al. |
| 2008/0165136 A1 | 7/2008 | Christie et al. |
| 2008/0165140 A1 | 7/2008 | Christie et al. |
| 2008/0165141 A1 | 7/2008 | Christie |
| 2008/0165160 A1 | 7/2008 | Kocienda et al. |
| 2008/0168388 A1 | 7/2008 | Decker |
| 2008/0168395 A1 | 7/2008 | Ording et al. |
| 2008/0168402 A1 | 7/2008 | Blumenberg |
| 2008/0168404 A1 | 7/2008 | Ording |
| 2008/0168405 A1 | 7/2008 | Tolmasky et al. |
| 2008/0172633 A1 | 7/2008 | Jeon et al. |
| 2008/0180404 A1 | 7/2008 | Han et al. |
| 2008/0204426 A1 | 8/2008 | Hotelling et al. |
| 2008/0207130 A1 | 8/2008 | Kunii |
| 2008/0218489 A1 | 9/2008 | Park et al. |
| 2008/0231610 A1 | 9/2008 | Hotelling et al. |
| 2008/0284925 A1 | 11/2008 | Han |
| 2009/0049388 A1 | 2/2009 | Taib et al. |
| 2009/0051671 A1 | 2/2009 | Konstas |
| 2009/0058830 A1 | 3/2009 | Herz et al. |
| 2009/0064047 A1 | 3/2009 | Shim et al. |
| 2009/0207140 A1 | 8/2009 | Hansson |
| 2009/0211891 A1 | 8/2009 | Lai et al. |
| 2009/0225037 A1 | 9/2009 | Williamson et al. |
| 2009/0225038 A1 | 9/2009 | Bolsinga et al. |
| 2009/0225039 A1 | 9/2009 | Williamson et al. |
| 2009/0228828 A1 | 9/2009 | Beatty et al. |
| 2009/0228901 A1 | 9/2009 | Beaver et al. |
| 2009/0231281 A1 | 9/2009 | Whytock et al. |
| 2009/0244020 A1 | 10/2009 | Sjolin |
| 2009/0251434 A1 | 10/2009 | Rimon et al. |
| 2009/0259969 A1 | 10/2009 | Pallakoff |
| 2009/0262087 A1 | 10/2009 | Kim |
| 2009/0273571 A1 | 11/2009 | Bowens |
| 2009/0282332 A1 | 11/2009 | Porat |
| 2009/0284479 A1 | 11/2009 | Dennis et al. |
| 2009/0307623 A1 | 12/2009 | Agarawala et al. |
| 2009/0309847 A1 | 12/2009 | Russell et al. |
| 2009/0322687 A1 | 12/2009 | Duncan et al. |
| 2009/0322699 A1 | 12/2009 | Hansson |
| 2009/0322700 A1 | 12/2009 | D'Souza et al. |
| 2010/0013676 A1 | 1/2010 | Do et al. |
| 2010/0020025 A1 | 1/2010 | Lemort et al. |
| 2010/0020221 A1 | 1/2010 | Tupman et al. |
| 2010/0030612 A1 | 2/2010 | Kim et al. |
| 2010/0046850 A1 | 2/2010 | Ho et al. |
| 2010/0085323 A1 | 4/2010 | Bogue |
| 2010/0107116 A1 | 4/2010 | Rieman et al. |
| 2010/0146458 A1 | 6/2010 | Wadekar |
| 2010/0149122 A1 | 6/2010 | Lin |
| 2010/0156804 A1 | 6/2010 | Young |
| 2010/0172624 A1 | 7/2010 | Watts |
| 2010/0177053 A2 | 7/2010 | Yasutake |
| 2010/0182248 A1 | 7/2010 | Chun |
| 2010/0235118 A1 | 9/2010 | Moore et al. |
| 2010/0245267 A1 | 9/2010 | Min et al. |
| 2010/0267449 A1 | 10/2010 | Gagner et al. |
| 2010/0281435 A1 | 11/2010 | Bangalore et al. |
| 2010/0283739 A1 | 11/2010 | Zhang et al. |
| 2010/0299594 A1 | 11/2010 | Zalewski et al. |
| 2010/0325575 A1 | 12/2010 | Platzer et al. |
| 2011/0037714 A1 | 2/2011 | Seo et al. |
| 2011/0047459 A1 | 2/2011 | Van Der Westhuizen |
| 2011/0069021 A1 | 3/2011 | Hill |
| 2011/0090257 A1 | 4/2011 | Ko et al. |
| 2011/0102336 A1 | 5/2011 | Seok et al. |
| 2011/0115745 A1 | 5/2011 | Cabrera Cordon et al. |
| 2011/0167391 A1 | 7/2011 | Momeyer et al. |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0252306 A1 | 10/2011 | Williamson et al. |
| 2011/0252307 A1 | 10/2011 | Williamson et al. |
| 2011/0252368 A1 | 10/2011 | Anzures et al. |
| 2011/0291951 A1 | 12/2011 | Tong |
| 2011/0295596 A1 | 12/2011 | Hung et al. |
| 2011/0310046 A1 | 12/2011 | Beaver et al. |
| 2011/0310047 A1 | 12/2011 | Moore et al. |
| 2011/0314430 A1 | 12/2011 | Blumenberg |
| 2011/0321125 A1 | 12/2011 | Kyohgoku et al. |
| 2012/0023509 A1 | 1/2012 | Blumenberg |
| 2012/0278725 A1 | 11/2012 | Gordon et al. |
| 2013/0009986 A1 | 1/2013 | Shah et al. |
| 2013/0016039 A1 | 1/2013 | Moore et al. |
| 2013/0069899 A1 | 3/2013 | Beaver et al. |

FOREIGN PATENT DOCUMENTS

| | | | |
|---|---|---|---|
| CN | 1326564 A | 12/2001 | |
| CN | 1422481 A | 6/2003 | |
| CN | 1695105 A | 11/2005 | |
| CN | 1704886 A | 12/2005 | |
| CN | 1754141 A | 3/2006 | |
| CN | 1797308 A | 7/2006 | |
| CN | 1841284 A | 10/2006 | |
| CN | 1845046 A | 10/2006 | |
| CN | 1860429 A | 11/2006 | |
| CN | 1967458 A | 5/2007 | |
| CN | 101410781 A | 4/2009 | |
| CN | 101526880 A | 9/2009 | |
| CN | 101727240 A | 6/2010 | |
| DE | 102008052485 A1 | 4/2010 | |
| EP | 269364 A2 | 6/1988 | |
| EP | 450196 A1 | 10/1991 | |
| EP | 538705 A1 | 4/1993 | |
| EP | 609021 A2 | 8/1994 | |
| EP | 622722 A2 | 11/1994 | |
| EP | 626635 A2 | 11/1994 | |
| EP | 635779 A1 | 1/1995 | |
| EP | 701220 A1 | 3/1996 | |
| EP | 712825 A1 | 5/1996 | |
| EP | 725331 A1 | 8/1996 | |
| EP | 827064 A2 | 3/1998 | |
| EP | 827094 A2 | 3/1998 | |
| EP | 880091 A2 | 11/1998 | |
| EP | 944218 A1 | 9/1999 | |
| EP | 1517228 A2 * | 3/2005 | ............ G06F 3/033 |
| EP | 2031837 A2 | 3/2009 | |
| EP | 2102738 A1 | 9/2009 | |
| EP | 2141576 A2 | 1/2010 | |
| EP | 1964022 B1 | 3/2010 | |
| EP | 2184673 A1 | 5/2010 | |
| EP | 2390766 A1 | 11/2011 | |
| GB | 1517521 A | 7/1978 | |
| GB | 2319591 A | 5/1998 | |
| GB | 2327558 A | 1/1999 | |
| GB | 2347200 A | 8/2000 | |
| GB | 2351215 A | 12/2000 | |
| GB | 2351639 A | 1/2001 | |
| GB | 2373778 A | 10/2002 | |
| GB | 2404547 A | 2/2005 | |
| JP | 63167923 A | 7/1988 | |
| JP | 1142818 A | 6/1989 | |
| JP | 2140822 A | 5/1990 | |
| JP | 3271976 A | 12/1991 | |
| JP | 5298002 A | 11/1993 | |
| JP | 6161661 A | 6/1994 | |

(56) References Cited

FOREIGN PATENT DOCUMENTS

| | | |
|---|---|---|
| JP | 7230352 A | 8/1995 |
| JP | 8076926 A | 3/1996 |
| JP | 9231004 A | 9/1997 |
| JP | 10500509 A | 1/1998 |
| JP | 10141974 A | 5/1998 |
| JP | 11126149 A | 5/1999 |
| JP | 2000501526 A | 2/2000 |
| JP | 2000137555 A | 5/2000 |
| JP | 2000137564 A | 5/2000 |
| JP | 2000163031 A | 6/2000 |
| JP | 2000163193 A | 6/2000 |
| JP | 2000163443 A | 6/2000 |
| JP | 2000163444 A | 6/2000 |
| JP | 2000222130 A | 8/2000 |
| JP | 2000322495 A | 11/2000 |
| JP | 2001290585 A | 10/2001 |
| JP | 2002254614 A | 9/2002 |
| JP | 2002342033 A | 11/2002 |
| JP | 2003296024 A | 10/2003 |
| JP | 2003330613 A | 11/2003 |
| JP | 2005056286 A | 3/2005 |
| JP | 2005082086 A | 3/2005 |
| JP | 2005234199 A | 9/2005 |
| JP | 2005234291 A | 9/2005 |
| JP | 2005242669 A | 9/2005 |
| JP | 2005322088 A | 11/2005 |
| JP | 2006102275 A | 4/2006 |
| JP | 2008508601 A | 3/2008 |
| JP | 2008146165 A | 6/2008 |
| JP | 2008312153 A | 12/2008 |
| JP | 2010503124 A | 1/2010 |
| JP | 2010503125 A | 1/2010 |
| JP | 4542637 B2 | 9/2010 |
| JP | 2012014299 A | 1/2012 |
| KR | 1020020095992 A | 12/2002 |
| KR | 1020040071767 A | 8/2004 |
| KR | 1020090057304 A | 6/2009 |
| KR | 1020090057421 A | 6/2009 |
| WO | 9429788 A1 | 12/1994 |
| WO | 9806054 A1 | 2/1998 |
| WO | 9807112 A2 | 2/1998 |
| WO | 9928812 A1 | 6/1999 |
| WO | 9940562 A1 | 8/1999 |
| WO | 9957630 A1 | 11/1999 |
| WO | 0038042 A1 | 6/2000 |
| WO | 0129702 A2 | 4/2001 |
| WO | 0177792 A2 | 10/2001 |
| WO | 0201338 A1 | 1/2002 |
| WO | 0208881 A2 | 1/2002 |
| WO | 0213176 A2 | 2/2002 |
| WO | 0221338 A2 | 3/2002 |
| WO | 03054681 A1 | 7/2003 |
| WO | 03060622 A2 | 7/2003 |
| WO | 03081458 A1 | 10/2003 |
| WO | 2004001560 A1 | 12/2003 |
| WO | 2005052773 A2 | 6/2005 |
| WO | 2006003590 A2 | 1/2006 |
| WO | 2006003591 A2 | 1/2006 |
| WO | 2006020304 A2 | 2/2006 |
| WO | 2006020305 A2 | 2/2006 |
| WO | 2006045530 A2 | 5/2006 |
| WO | 2006067711 A2 | 6/2006 |
| WO | 2006094308 A2 | 9/2006 |
| WO | 2006128248 A1 | 12/2006 |
| WO | 2007037806 A1 | 4/2007 |
| WO | 2007067858 A2 | 6/2007 |
| WO | 2007079425 A2 | 7/2007 |
| WO | 2007089766 A2 | 8/2007 |
| WO | 2008020446 A1 | 2/2008 |
| WO | 2008030563 A2 | 3/2008 |
| WO | 2008030779 A2 | 3/2008 |
| WO | 2008030879 A2 | 3/2008 |
| WO | 2008030880 A1 | 3/2008 |
| WO | 2008085846 A2 | 7/2008 |
| WO | 2008085848 A1 | 7/2008 |
| WO | 2008085855 A1 | 7/2008 |
| WO | 2008085871 A1 | 7/2008 |
| WO | 2008085877 A1 | 7/2008 |
| WO | 2008086218 A2 | 7/2008 |
| WO | 2008148021 A2 | 12/2008 |
| WO | 2009018314 A2 | 2/2009 |
| WO | 2009111189 A1 | 9/2009 |
| WO | 2009111458 A1 | 9/2009 |
| WO | 2009111460 A1 | 9/2009 |
| WO | 2009111469 A2 | 9/2009 |
| WO | 2011045805 A1 | 4/2011 |

OTHER PUBLICATIONS

*Apple Inc.* vs. *Samsung Electronics Co. Ltd., et al.*, Samsung's Motion to Supplement Invalidity Contentions, Case No. 11-cv-01846-LHK, filed Jan. 27, 2012 together with Exhibit 6, , Jan. 27, 2012, 47 pages.
*Apple Inc.* vs. *Samsung Electronics Co. Ltd., et al.*, Samsung's Patent Local Rule 3-3 and 3-4 Disclosures, Case No. 11-cv-01846-LHK, dated Oct. 7, 2011, together with Exhibits G-1 through G-7 and Exhibit H, , Oct. 7, 2011, 287 pages.
Corrected Notice of Commission Determination Not to Review an Initial Determination Terminating the Investigation as to Certain Asserted Patient Claims: ITC Inv. No. 337-TA-797, Jun. 22, 2012.
Flash to the Core Website, http://flashtothecore.praystation.com, 2002.
Flashloaded SlideMem Website, http://flashloaded.com/flashcomponents/slidemem/, 2007.
Flashloaded SlideMenu Date, Flashloaded.com, 2007.
HTC Europe Co. Ltd and Apple Inc. Invalidity Claim dated Apr. 5, 2012, together with annexes, , Apr. 5, 2012, 12 pages.
HTC Europe Co. Ltd and Apple Inc. invalidity Claim dated Jul. 29, 2011, together with amended Particulars of Claim and amended Grounds of Invalidity, , Jul. 29, 2011, 22 pages.
Microsoft Word 2003 Screenshots, 1983-2003, 2 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, , Apr. 2012, 53 pages.
Non-Final Office Action received for U.S. Appl. No. 12/042,067, mailed on Oct. 15, 2010, 4 pages.
Notice of Allowance received for Chinese Patent Application No. 201310073437.3, mailed on May 10, 2016, 4 pages (2 pages of English Translation and 2 pages of Official Copy).
Notice of Allowance received for U.S. Appl. No. 14/712,637, mailed on May 12, 2016, 10 pages.
Notice of Allowance received for U.S. Appl. No. 14/712,637, mailed on Jun. 28, 2016, 2 pages.
Notice of Appeal in Expedited Appeal in Summary Proceedings dated Sep. 14, 2011, pp. 1-51.
Order Contruing Disputed Claim terms of U.S. Pat. Nos. 7,844,915 (DI 849): *Apple Inc.* v. *Samsung Electronics Co. Ltd, et al.*, 5:11-cv-01846 (N.D.Cal).
Order Denying Motion for Summary Judgment (DI 1158): *Apple Inc.* v. *Samsung Electronics Co. Ltd, et al.*, 5:11-cv-01846 (N.D. Cal).
Order No. 52: Initial Determination Granting Renewed Motion to Terminate Investigation With Respect to Certain Claims: ITC Inv. No. 337-TA-797.
ORder No. 57: Construing the Terms of the Asserted Claims of the Patents at Issue: ITC Inv. No. 337-TA-797.
Order No. 58: Initial Determination Granting Motion to Terminate Investigation with Respect to Certain Claims: ITC Inv. No. 337-TA-797.
PlasmaplugsScrollBar Website, 2006.
Pleading notes Mr B.J. Berghuis van Woortman, in matter of *Apple Inc.* vs *Samsung Electronics*, Case No. KG ZA 11-730 and KG ZA 11-731, Aug. 10-11, 2010, pp. 1-16.
Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.

(56) References Cited

OTHER PUBLICATIONS

*Samsung Electronics GmbH* vs *Apple Inc.*, "List scrolling and document translation, scaling and rotation on a touch-screen display", Opposition, Jan. 30, 2012, 27 pages.
*Samsung Electronics* vs *Apple Inc.*, Statement of Defense Also Counterclaim, Case No. KG ZA 2011-730, Jul. 20, 2011, 44 pages.
*Samsung Electronics* vs *Apple Inc.*, Statement of Defense Also Counterclaim, Case No. KG ZA 2011-731, Jul. 20, 2011, 48 pages.
Scroll Movie with Inertia, Flash Kit, Aug. 28, 2005, pp. 1-5.
Summon to attend Oral Proceedings received for European Patent Application No. 08712964.9, mailed on May 12, 2016, 6 pages.
Teleprompter—VBForums, 2003.
Office Action received for European Patent Application No. 08705471.4, mailed on Dec. 19, 2011, 6 pages.
Summons to Attend Oral Proceedings received for European Patent Application No. 08705751.9, mailed on Oct. 28, 2011, , Oct. 28, 2011, 9 pages.
Office Action received for European Patent Application No. 08712946.6, mailed on Oct. 20, 2014, 6 pages.
Office Action received for European Patent Application No. 08712946.6, mailed on Oct. 30, 2012, 20 pages.
Office Action received for European Patent Application No. 08712964.9, mailed on Jan. 20, 2015, 8 pages.
Office Action received for European Patent Application No. 08712964.9, mailed on Nov. 26, 2012, 6 pages.
Decision to Grant received for European Patent Application No. 08713567.9, mailed on Oct. 7, 2011, 1 page.
Office Action received for European Application No. 08713567.9, mailed on Dec. 29, 2009, 5 pages.
Extended European Search Report (includes Partial European Search Report and European Search Opinion) received for European Patent Application No. 09154313.2, mailed on Apr. 21, 2009, 6 pages.
Office Action received for European Patent Application No. 09154313.2, mailed on Feb. 12, 2010, 1 page.
Summons to Attend Oral Proceedings received for European Patent Application No. 09154313.2, mailed on May 15, 2013, 30 pages.
Office Action received for European Patent Application No. 09700006.1, mailed on Oct. 15, 2010, 4 pages.
Summons to Attend Oral Proceedings received for European Patent Application No. 09700006.1, mailed on Mar. 7, 2013, 5 pages.
Office Action received for European Patent Application No. 09700007.9, mailed on Aug. 28, 2014, 8 pages.
Office Action received for European Patent Application No. 09700007.9, mailed on Mar. 9, 2012, 7 pages.
Office Action received for European Patent Application No. 09700007.9, mailed on Nov. 26, 2010, 5 pages.
Summons to Attend Oral Proceeding received for European Patent Application No. 09700007.9, mailed on Oct. 30, 2013, 5 pages.
Summons to Attend Oral Proceedings received for European Patent Application No. 09700008.7, mailed on Mar. 27, 2013, 4 pages.
Office Action received for Taiwan Patent Application No. 100147539, mailed on Apr. 8, 2014, 12 pages (5 pages of English Translation and 7 pages of Official copy).
Certificate of Grant received for Hong Kong Patent Application No. 10103983.1, mailed on Feb. 3, 2012, 5 pages.
Office Action received for Korean Patent Application No. 10-2009-7003574, mailed on Aug. 27, 2009, 1 page (English Translation only).
Notice of Allowance received for Korean Patent Application No. 10-2009-7007114, mailed on Apr. 26, 2013, 2 pages (Official Copy only).
Notice of Allowance received for Korean Patent Application No. 10-2011-7024288, mailed on May 29, 2013, , May 29, 2013, 2 pages (Official copy only).
Office Action received for Korean Patent Application No. 10-2012-7022239, mailed on Apr. 30, 2014, 5 pages (2 pages of English Translation and 3 pages of official copy).
Office Action received for Korean Patent Application No. 10-2012-7029618, mailed on Dec. 5, 2013, 4 pages (English Translation only).
Office Action received for Korean Patent Application No. 10-2013-7000337, mailed on Apr. 28, 2014, 7 pages (3 pages of English Translation and 4 pages of Official Copy).
Office Action received for Korean Patent Application No. 10-2013-7000337, mailed on Jun. 25, 2013, 7 pages (3 pages of English Translation and 4 pages of Official Copy).
Office Action received for Korean Patent Application No. 10-2013-7019463, mailed on Jun. 26, 2014, 6 pages (2 pages of English Translation and 4 pages of Official copy).
Office Action received for European Patent Application No. 10712825.8, mailed on Jun. 19, 2013, 5 pages.
Final Office Action received for U.S. Appl. No. 11/620,709, mailed on Nov. 13, 2009, 8 pages.
Non-Final Office Action received for U.S. Appl. No. 11/620,709, mailed on Apr. 1, 2009, 8 pages.
Non-Final Office Action received for U.S. Appl. No. 11/620,709, mailed on Jun. 9, 2010, 8 pages.
Non-Final Office Action Received for U.S. Appl. No. 11/620,710, mailed on Jul. 21, 2010, 28 pages.
Final Office Action received for U.S. Appl. No. 11/620,715, mailed on Mar. 1, 2013, 15 pages.
Non-Final Office Action received for U.S. Appl. No. 11/620,715, mailed on Aug. 29, 2012, 16 pages.
Non-Final Office Action received for U.S. Appl. No. 11/620,717, mailed on Dec. 29, 2009, 8 pages.
Non-Final Office Action received for U.S. Appl. No. 11/620,717, mailed on Jul. 8, 2009, 6 pages.
Notice of Allowance received for U.S. Appl. No. 11/620,717, mailed on Jul. 20, 2010, 11 pages.
Final Office Action received for U.S. Appl. No. 11/620,720, mailed on Jun. 23, 2009, 17 pages.
Non-Final Office Action received for U.S. Appl. No. 11/620,720, mailed on Dec. 23, 2008, 18 pages.
Non-Final Office Action received for U.S. Appl. No. 11/620,720, mailed on Nov. 18, 2009, 17 pages.
Final Office Action received for U.S. Appl. No. 11/620,723, mailed on Nov. 17, 2009, 8 pages.
Non-Final Office Action received for U.S. Appl. No. 11/620,723, mailed on Apr. 1, 2009, 8 pages.
Non-Final Office Action received for U.S. Appl. No. 11/620,723, mailed on Jun. 8, 2010, 8 pages.
Final Office Action received for U.S. Appl. No. 11/620,727, mailed on Mar. 12, 2012, 20 pages.
Final Office Action received for U.S. Appl. No. 11/620,727, mailed on Mar. 7, 2013, 23 pages.
Non-Final Office Action received for U.S. Appl. No. 11/620,727, mailed on Aug. 15, 2012, 19 pages.
Non-Final Office Action received for U.S. Appl. No. 11/620,727, mailed on Nov. 4, 2011, 15 pages.
Examiner's Amendment received for U.S. Appl. No. 11/956,969, mailed on Oct. 29, 2008, 6 pages.
Notice of Allowance received for U.S. Appl. No. 11/956,969, mailed on Oct. 29, 2008, 6 pages.
Certificate of Grant received for Hong-Kong Patent Application No. 11110416.2, mailed on Nov. 30, 2012, 1 page.
Decision to Grant received for European Patent Application No. 11150786.9 , mailed on Jul. 26, 2012, 2 pages.
Extended European Search Report (includes Partial European Search Report and European Search Opinion) received for European Patent Application No. 11150786.9, mailed on Mar. 2, 2011, 5 pages.
Extended European Search Report (includes Partial European Search Report and European Search Opinion) received for European Patent Application No. 11150788.5, mailed on Mar. 1, 2011, 6 pages.
Office Action received for European Patent Application No. 11150788.5, mailed on May 9, 2014, 6 pages.
Extended European Search Report (includes European Search Report and European Search Opinion) received for European Patent Application No. 11152015.1, mailed on May 20, 2011, 9 pages.

(56) References Cited

OTHER PUBLICATIONS

Office Action received for European Patent Application No. 11152015.1, mailed on Jul. 26, 2013, 6 pages.
Extended European Search Report (includes Partial European Search Report and European Search Opinion) received for European Patent Application No. 11182954.5, mailed on Nov. 29, 2011, 6 pages.
European Search Report received for European Patent Application No. 11182959.4, mailed on Nov. 30, 2011, 7 pages.
European Search Report received for European Patent Application No. 11182962.8, mailed on Dec. 1, 2011, 8 pages.
Extended European Search Report (includes Partial European Search Report and European Search Opinion) received for European Patent Application No. 11182963.6, mailed on Dec. 1, 2011, 7 pages.
Extended European Search Report (includes Partial European Search Report and European Search Opinion) received for European Patent Application No. 11184167.2, mailed on Nov. 23, 2011, 6 pages.
Office Action received for European Patent Application No. 11184167.2, mailed on May 14, 2014, 6 pages.
Extended European Search Report (includes Partial European Search Report and European Search Opinion) received for European Patent Application No. 11184169.8, mailed on Nov. 24, 2011, 6 pages.
Office Action received for European Patent Application No. 11184169.8, mailed on May 14, 2014, 6 pages.
Extended European Search Report (includes Partial European Search Report and European Search Opinion) received for European Patent Application No. 11184170.6, mailed on Nov. 18, 2011, 6 pages.
Office Action received for European Patent Application No. 11184170.6, mailed on May 16, 2014, 5 pages.
Extended European Search Report (includes Partial European Search Report and European Search Opinion) received for European Patent Application No. 11184172.2, mailed on Nov. 18, 2011, 6 pages.
Office Action received for European Patent Application No. 11184172.2, mailed on May 16, 2014, 5 pages.
Extended European Search Report (includes Partial European Search Report and European Search Opinion) received for European Patent Application No. 11184186.2, mailed on Dec. 7, 2011, 6 pages.
Office Action received for European Patent Application No. 11184186.2, mailed on Mar. 20, 2014, 5 pages.
Extended European Search Report (includes Partial European Search Report and European Search Opinion) received for European Patent Application No. 11184222.5, mailed on Jan. 13, 2012, 7 pages.
Office Action received for European Patent Application No. 11184222.5, mailed on Sep. 12, 2012, 4 pages.
Summons to Attend Oral Proceeding received for European Patent Application No. 11184222.5, mailed on Oct. 30, 2013, 5 pages.
Extended European Search Report (includes Partial European Search Report and European Search Opinion) received for European Patent Application No. 11184223.3, mailed on Jan. 13, 2012, 7 pages.
Office Action received for European Patent Application No. 11184223.3, mailed on Sep. 12, 2012, 4 pages.
Summons to Attend Oral Proceeding received for European Patent Application No. 11184223.3, mailed on Oct. 30, 2013, 5 pages.
Extended European Search Report (includes Partial European Search Report and European Search Opinion) received for European Patent Application No. 11184224.1, mailed on Jan. 13, 2012, 7 pages.
Office Action received for European Patent Application No. 11184224.1, mailed on Sep. 12, 2012, 4 pages.
Summons to Attend Oral Proceeding received for European Patent Application No. 11184224.1, mailed on Oct. 30, 2013, 5 pages.

Extended European Search Report (includes Partial European Search Report and European Search Opinion) received for European Patent Application No. 11184226.6, mailed on Jan. 13, 2012, 7 pages.
Office Action received for European Patent Application No. 11184226.6, mailed on Sep. 12, 2012, 5 pages.
Summons to Attend Oral Proceeding received for European Patent Application No. 11184226.6, mailed on Oct. 30, 2013, 5 pages.
Extended European Search Report (includes Partial European Search Report and European Search Opinion) received for European Patent Application No. 11184409.8, mailed on Nov. 30, 2011, 6 pages.
Office Action received for European Patent Application No. 11184409.8, mailed on May 16, 2014, 6 pages.
Office Action received for German Patent Application No. 112008000144.8, mailed on Oct. 29, 2010, 8 pages (4 pages of English translation and 4 pages of Official Copy).
Office Action received for German Patent Application No. 112009000001.0, mailed on Oct. 19, 2010.
Office Action received for German Patent Application No. 112009000001.0, mailed on Sep. 26, 2012, 5 pages.
Office Action received for German Patent Application No. 112009000002.9, mailed on Sep. 26, 2012, 5 pages.
Office Action received for German Patent Application No. 112009000003.7, mailed on Aug. 10, 2010, 3 pages of English Translation Only.
Office Action received for German Patent Application No. 112009000003.7, mailed on Sep. 26, 2012, 5 pages.
Office Action received for European Patent Application No. 11727371.4, mailed on Aug. 22, 2013, 6 pages.
Office Action received for European Patent Application No. 11808779.0, mailed on Jul. 1, 2014, 5 pages.
Final Office Action received for U.S. Appl. No. 12/042,067, mailed on Jul. 28, 2011, 13 pages.
Non-Final Office Action received for U.S. Appl. No. 12/042,067, mailed on Jan. 18, 2011, 14 pages.
Non-Final Office Action received for U.S. Appl. No. 12/042,067, mailed on Mar. 14, 2013, 15 pages.
Notice of Allowance received for U.S. Appl. No. 12/042,067, mailed on Dec. 6, 2013, 9 pages.
Notice of Allowance received for U.S. Appl. No. 12/042,067, mailed on Sep. 27, 2013, 10 pages.
Final Office Action received for U.S. Appl. No. 12/042,237, mailed on Jun. 2, 2011, 10 pages.
Non-Final Office Action received for U.S. Appl. No. 12/042,237, mailed on Dec. 30, 2010, 9 pages.
Non-Final Office Action received for U.S. Appl. No. 12/042,237, mailed on Sep. 14, 2011, 8 pages.
Notice of Allowance received for U.S. Appl. No. 12/042,237, mailed on Mar. 6, 2012, 8 pages.
Final Office Action received for U.S. Appl. No. 12/042,299, mailed on Jul. 8, 2011, 8 pages.
Non-Final Office Action received for U.S. Appl. No. 12/042,299, mailed on Jan. 4, 2011, 9 pages.
Non-Final Office Action received for U.S. Appl. No. 12/042,299, mailed on May 3, 2012, 9 pages.
Notice of Allowance received for U.S. Appl. No. 12/042,299, mailed on Dec. 12, 2012, 8 pages.
Final Office Action received for U.S. Appl. No. 12/042,318, mailed on Sep. 15, 2011, 39 pages.
Non-Final Office Action received for U.S. Appl. No. 12/042,318, mailed on Feb. 16, 2011, 25 pages.
Notice of Allowance received for U.S. Appl. No. 12/042,318, mailed on Dec. 16, 2013, 30 pages.
Non-Final Office Action received for U.S. Appl. No. 12/207,429, mailed on Mar. 30, 2012, 9 pages.
Non-Final Office Action received for U.S. Appl. No. 12/270,805 , mailed on Oct. 11, 2011, 27 pages.
Notice of Allowance received for U.S. Appl. No. 12/270,805, mailed on May 17, 2012, 14 pages.
Non-Final Office Action received for U.S. Appl. No. 12/270,807 , mailed on Oct. 11, 2011, 26 pages.

(56) References Cited

OTHER PUBLICATIONS

Notice of Allowance received for U.S. Appl. No. 12/270,807, mailed on May 11, 2012, 12 pages.
Non-Final Office Action received for U.S. Appl. No. 12/270,810 , mailed on Oct. 12, 2011, 12 pages.
Notice of Allowance received for U.S. Appl. No. 12/270,810, mailed on Jul. 11, 2012, 17 pages.
Non-Final Office Action received for U.S. Appl. No. 12/270,812 , mailed on May 17, 2012, 14 pages.
Non-Final Office Action received for U.S. Appl. No. 12/270,812 , mailed on Oct. 13, 2011, 12 pages.
Notice of Allowance received for U.S. Appl. No. 12/270,812, mailed on Sep. 19, 2012, 20 pages.
Final Office Action received for U.S. Appl. No. 12/270,815, mailed on Feb. 14, 2013, 12 pages.
Non-Final Office Action received for U.S. Appl. No. 12/270,815, mailed on May 17, 2012, 13 pages.
Non-Final Office Action received for U.S. Appl. No. 12/270,815, mailed on Oct. 11, 2011, 12 pages.
Non-Final Office Action received for U.S. Appl. No. 12/566,660, mailed on Dec. 9, 2011, 6 pages.
Notice of Allowance received for U.S. Appl. No. 12/566,660, mailed on Jul. 26, 2012, 5 pages.
Notice of Allowance received for U.S. Appl. No. 12/566,660, mailed on May 24, 2012, 9 pages.
Final Office Action received for U.S. Appl. No. 12/789,695, mailed on May 7, 2014, 17 pages.
Non-Final Office Action received for U.S. Appl. No. 12/789,695, mailed on Oct. 24, 2013, 14 pages.
Non-Final Office Action received for U.S. Appl. No. 12/789,695, mailed on Mar. 4, 2013, 13 pages.
Non-Final Office Action received for U.S. Appl. No. 12/869,182, mailed on Jun. 20, 2012, 6 pages.
Non-Final Office Action received for U.S. Appl. No. 12/869,182, mailed on Oct. 24, 2011, 7 pages.
Notice of Allowance received for U.S. Appl. No. 12/869,182, mailed on Dec. 12, 2012, 5 pages.
Notice of Allowance received for U.S. Appl. No. 12/869,182, mailed on Feb. 23, 2012, 5 pages.
Notice of Allowance received for U.S. Appl. No. 12/892,848, mailed on May 15, 2013, 10 pages.
Final Office Action received for U.S. Appl. No. 12/892,851, mailed on Jul. 19, 2013, 12 pages.
Non-Final Office Action received for U.S. Appl. No. 12/892,851, mailed on Oct. 9, 2012, 11 pages.
Non-Final Office Action received for U.S. Appl. No. 12/892,851, mailed on May 22, 2014, 11 pages.
Extended European Search Report (includes Partial European Search Report and European Search Opinion) received for European Patent Application No. 12156394.4, mailed on Jun. 5, 2012, 6 pages.
Office Action received for European Patent Application No. 12156394.4, mailed on Oct. 22, 2014, 6 pages.
Extended European Search Report (includes Partial European Search Report and European Search Opinion) received for European Patent Application No. 12156395.1, mailed on Jun. 6, 2012, 6 pages.
Office Action received for European Patent Application No. 12156395.1, mailed on Jul. 9, 2012, 8 pages.
Office Action received for European Patent Application No. 12156395.1, mailed on Oct. 22, 2014, 6 pages.
Extended European Search Report (includes Partial European Search Report and European Search Opinion) received for European Patent Application No. 12188748.3, mailed on Feb. 28, 2013, 8 pages.
Office Action received for European Patent Application No. 12188748.3, mailed on Oct. 30, 2013, 5 pages.
Notice of Allowance received for U.S. Appl. No. 13/077,925, mailed on Jun. 27, 2013, 10 pages.
Notice of Allowance received for U.S. Appl. No. 13/077,927, mailed on Jun. 13, 2013, 10 pages.
Final Office Action received for U.S. Appl. No. 13/077,931, mailed on Sep. 9, 2013, 14 pages.
Non-Final Office Action received for U.S. Appl. No. 13/077,931, mailed on Jul. 17, 2014, 21 pages.
Non-Final Office Action received for U.S. Appl. No. 13/077,931, mailed on Jan. 3, 2013, 13 pages.
Notice of Allowance received for U.S. Appl. No. 13/077,931, mailed on Dec. 31, 2014, 8 pages.
Final Office Action received for U.S. Appl. No. 13/084,472, mailed on Jun. 17, 2014, 31 pages.
Final Office Action received for U.S. Appl. No. 13/084,472, mailed on Jun. 20, 2013, 20 pages.
Non Final Office Action received for U.S. Appl. No. 13/084,472, mailed on Dec. 6, 2013, 24 pages.
Non Final Office Action received for U.S. Appl. No. 13/084,472, mailed on Dec. 10, 2014, 25 pages.
Non-Final Office Action received for U.S. Appl. No. 13/084,472, mailed on Oct. 9, 2012, 14 pages.
Non-Final Office Action received for U.S. Appl. No. 13/163,624, mailed on Mar. 22, 2013, 9 pages.
Non-Final Office Action received for U.S. Appl. No. 13/163,624, mailed on Nov. 21, 2012, 9 pages.
Non-Final Office Action received for U.S. Appl. No. 13/163,624, mailed on Oct. 24, 2013, 8 pages.
Notice of Allowance received for U.S. Appl. No. 13/163,624, mailed on May 12, 2014, 5 pages.
Non- Final Office Action received for U.S. Appl. No. 13/163,626, mailed on Nov. 26, 2012, 9 pages.
Non-Final Office Action received for U.S. Appl. No. 13/163,626, mailed on Mar. 20, 2013, 8 pages.
Non-Final Office Action received for U.S. Appl. No. 13/163,626, mailed on Oct. 24, 2013, 8 pages.
Notice of Allowance received for U.S. Appl. No. 13/163,626, mailed on Mar. 31, 2014, 5 pages.
Non-Final Office Action received for U.S. Appl. No. 13/221,827, mailed on Jun. 23, 2014, 19 pages.
Notice of Allowance received for U.S. Appl. No. 13/221,830, mailed on Dec. 3, 2012, 5 pages.
Notice of Allowance received for U.S. Appl. No. 13/221,830, mailed on May 23, 2012, 8 pages.
Final Office Action received for U.S. Appl. No. 13/221,836, mailed on May 15, 2013, 22 pages.
Final Office Action received for U.S. Appl. No. 13/221,836, mailed on May 20, 2014, 36 pages.
Non-Final Office Action received for U.S. Appl. No. 13/221,836, mailed on Nov. 5, 2012, 16 pages.
Non-Final Office Action received for U.S. Appl. No. 13/221,836, mailed on Oct. 30, 2013, 31 pages.
Final Office Action received for U.S. Appl. No. 13/221,837, mailed on Feb. 14, 2013, 13 pages.
Non-Final Office Action received for U.S. Appl. No. 13/221,837, mailed on Jul. 24, 2012, 13 pages.
Examiner's Answer to Appeal Brief received for U.S. Appl. No. 13/251,121, mailed on Apr. 29, 2014, 41 pages.
Final Office Action received for U.S. Appl. No. 13/251,121, mailed on Jul. 9, 2012, 21 pages.
Final Office Action received for U.S. Appl. No. 13/251,121, mailed on Sep. 23, 2013, 24 pages.
Non-Final Office Action Received for U.S. Appl. No. 13/251,121, mailed on Jan. 10, 2012, 16 pages.
Non-Final Office Action Received for U.S. Appl. No. 13/251,121, mailed on May 1, 2013, 17 pages.
Examiner's Answer to Appeal Brief received for U.S. Appl. No. 13/251,146, mailed on May 7, 2014, 43 pages.
Final Office Action received for U.S. Appl. No. 13/251,146, mailed on Jun. 20, 2012, 14 pages.
Final Office Action received for U.S. Appl. No. 13/251,146, mailed on Oct. 2, 2013, 20 pages.
Non-Final Office Action received for U.S. Appl. No. 13/251,146, mailed on Apr. 11, 2013, 15 pages.

(56) References Cited

OTHER PUBLICATIONS

Non-Final Office Action received for U.S. Appl. No. 13/251,146, mailed on Jan. 31, 2012, 16 pages.
Examiner's Answer to Appeal Brief received for U.S. Appl. No. 13/251,150, mailed on Jun. 17, 2014, 48 pages.
Final Office Action received for U.S. Appl. No. 13/251,150, mailed on Dec. 11, 2013, 43 pages.
Final Office Action received for U.S. Appl. No. 13/251,150, mailed on Jul. 5, 2012, 27 pages.
Non-Final Office Action received for U.S. Appl. No. 13/251,150, mailed on Feb. 10, 2012, 23 pages.
Non-Final Office Action received for U.S. Appl. No. 13/251,150, mailed on Jun. 7, 2013, 34 pages.
Examiner's Answer to Appeal Brief received for U.S. Appl. No. 13/251,152, mailed on May 21, 2014, 45 pages.
Final Office Action received for U.S. Appl. No. 13/251,152, mailed on Jun. 20, 2012, 24 pages.
Final Office Action received for U.S. Appl. No. 13/251,152, mailed on Oct. 18, 2013, 32 pages.
Non-Final Office Action received for U.S. Appl. No. 13/251,152, mailed on Apr. 23, 2013, 29 pages.
Notice of Allowance received for U.S. Appl. No. 13/867,950, mailed on Nov. 15, 2013, 7 pages.
Notice of Allowance received for U.S. Appl. No. 13/867,950, mailed on Oct. 22, 2013, 8 pages.
Non-Final Office Action received for U.S. Appl. No. 14/189,922, mailed on Sep. 24, 2014, 7 pages.
Notice of Allowance received for U.S. Appl. No. 14/189,922, mailed on Apr. 7, 2015, 6 pages.
Non Final Office Action received for U.S. Appl. No. 14/712,637, mailed on Sep. 23, 2015, 10 pages.
Notice of Allowance received for Canadian Patent Application No. 2,755,443, mailed on Nov. 2, 2012, 1 page.
Office Action received for Canadian Patent Application No. 2,759,090, mailed on Nov. 4, 2013, 3 pages.
Office Action received for Canadian Patent Application No. 2,759,091, mailed on Nov. 7, 2013, 4 pages.
Notice of Allowance received for Canadian Patent Application No. 2,817,648, mailed on Apr. 10, 2014, 1 page.
Office Action received for Canadian Patent Application No. 2,817,890, mailed on Apr. 22, 2014, 3 pages.
Office Action received for Dutch Patent Application No. 2007993, mailed Jun. 2012, 6 pages (English Translation only).
Office Action received for Australian Patent Application No. 2008100283, mailed on Jul. 1, 2008, 2 pages.
Office Action received for Australian Patent Application No. 2008201540, mailed on Feb. 19, 2009, 2 pages.
Office Action received for Australian Patent Application No. 2008201540, mailed on Jul. 15, 2009, 2 pages.
Office Action received for Chinese Patent Application No. 200880000019.9, mailed on Feb. 18, 2013, 23 pages (12 pages of English Translation and 11 pages of Official Copy).
Office Action received for Chinese Patent Application No. 200880000019.9, mailed on Jan. 5, 2012, 14 pages (English Translation only).
Office Action received for Chinese Patent Application No. 200880000019.9, mailed on Jul. 23, 2013, 7 pages (4 pages of English translation and 3 pages of Official copy).
Office Action received for Chinese Patent Application No. 200880000019.9, mailed on Nov. 23, 2010, 13 pages(English Translation only).
Office Action received for Chinese Patent Application No. 200880000019.9, mailed on Sep. 20, 2012, 22 pages (13 pages of English Translation and 9 pages of Official copy).
Office Action received for Chinese Patent Application No. 200880001822.7, mailed on Jan. 29, 2012, 5 pages (English Translation only).
Board Opinion received for Chinese Patent Application No. 200880001827.7, mailed on Apr. 9, 2015, 11 pages (5 pages of English Translation and 6 pages of Official Copy).
Office Action received for Chinese Patent Application No. 200880001827.7, mailed on Jan. 29, 2012, 5 pages.
Office Action received for Chinese Patent Application No. 200880001827.7, mailed on Jul. 2, 2013, 7 pages (English Translation only).
Office Action received for Chinese Patent Application No. 200880001827.7, mailed on Nov. 11, 2010, , Nov. 11, 2010, 6 pages.
Office Action received for Chinese Patent Application No. 200880001855.9, mailed on Jul. 29, 2014, 14 pages (Official Copy only).
Office Action received for Chinese Patent Application No. 200880001855.9, mailed on Jun. 6, 2012.
Office Action received for Chinese Patent Application No. 200880001855.9, mailed on Mar. 7, 2013, 21 pages (English Translation only).
Office Action received for Chinese Patent Application No. 200880001855.9, mailed on Nov. 5, 2012, 17 pages (English Translation only).
Decision to Grant received for Japanese Patent No. 2009080377, mailed on Jul. 27, 2012, 4 pages.
Office Action received for Japanese Patent Application No. 2009080377, mailed on Aug. 26, 2011.
Grant for Invention received for Chinese Patent Application No. ZL200910118596.4, mailed on Mar. 22, 2011, 3 pages.
Office Action received for Australian Patent Application No. 2009200366, mailed on Feb. 11, 2009, 2 pages.
Office Action received for Australian Patent Application No. 2009200493, mailed on Feb. 25, 2011, 3 pages.
Office Action received for Australian Patent Application No. 2009200493, mailed on Aug. 9, 2011, 2 pages.
Notice of Acceptance received for Australian Patent Application No. 2009208099, mailed on Nov. 24, 2011, 3 pages.
Notice of Acceptance received for Australian Patent Application No. 2009208103, mailed on Apr. 14, 2011, 3 pages.
Office Action received for Australian Patent Application No. 2009208103, mailed on Apr. 8, 2010, 2 pages.
Decision to Grant received for Japanese Patent Application No. 2009-544996, mailed on May 20, 2011, 1 page (English Translation only).
Office Action received for Japanese Patent Application No. 2009-544996, mailed on Feb. 12, 2010, 1 page (English Translation only).
Office Action received for Japanese Patent Application No. 2009-544996, mailed on Nov. 8, 2010, 6 pages (English Translation only).
Notification of Grant received for Chinese Patent Application No. 200980000013.6, mailed on Nov. 6, 2013, 2 pages.
Office Action received for Chinese Patent Application No. 200980000013.6, mailed on Dec. 5, 2012, 7 pages (English Translation only).
Office Action received for Chinese Patent Application No. 200980000013.6, mailed on Jul. 3, 2013, 6 pages (3 pages of English Translation and 3 pages of Official copy).
Office Action received for Chinese Patent Application No. 200980000013.6, mailed on Jun. 6, 2012, 6 pages.
Office Action received for Chinese Patent Application No. 200980000013.6, mailed on Oct. 26, 2011, 11 pages.
Decision to Grant received for Chinese Patent No. 200980000014.0, mailed on Nov. 27, 2012, 1 page (Official copy only).
Office Action received for Chinese Patent Application No. 200980000014.0, mailed on Jun. 13, 2012, 6 pages.
Office Action received for Chinese Patent Application No. 200980000014.0, mailed on Oct. 19, 2011, 15 pages.
Office Action received for Chinese Patent Application No. 200980000015.5, mailed on Feb. 22, 2012, 9 pages.
Office Action received for Chinese Patent Application No. 200980000015.5, mailed on Jul. 14, 2011, 8 pages.
Office Action received for Chinese Patent Application No. 200980000015.5, mailed on Sep. 11, 2012, 9 pages.
Decision to Grant received for Japanese Patent Application No. 2010-157302, mailed on Oct. 26, 2012, 3 pages (Official Copy only).
Decision to Grant received for Japanese Patent Application No. 2010-157303, mailed on Apr. 15, 2013, 3 pages (Official Copy only).

(56) References Cited

OTHER PUBLICATIONS

Office Action received for Japanese Patent Application No. 2010-157303, mailed on Oct. 15, 2012, 4 pages (2 pages of English Translation and 2 pages of Official copy).
Office Action received for Australian Patent Application No. 2010226120, issued on Oct. 17, 2012, 3 pages.
Office Action received for Japanese Patent Application No. 2010502356 mailed on Oct. 24, 2011.
Office Action received for Japanese Patent Application No. 2010502357, mailed on Jan. 16, 2012, 2 pages.
Office Action received for Japanese Patent Application No. 2010-502357, mailed on Sep. 2, 2013, 11 pages (English Translation only).
Decision to Grant received for Japanese Patent Application No. 2010502358, mailed on Mar. 23, 2012.
Office Action received for Japanese Patent Application No. 2010502358, mailed on Aug. 3, 2011.
Decision to Grant received for Chinese Patent Application No. 201080020598.0, mailed on Apr. 24, 2014, 1 page (Official copy only).
Office Action received for Chinese Patent Application No. 201080020598.0, mailed on Oct. 31, 2013, 2 pages.
Notice of Allowance received for Chinese Patent Application No. 201110063183.8, mailed on Feb. 24, 2014, 4 pages (Official copy only).
Office Action received for Chinese Patent Application No. 201110063183.8, mailed on Aug. 26, 2013, 3 pages.
Office Action received for Chinese Patent Application No. 201110063183.8, mailed on Oct. 22, 2012, 8 pages (English Translation only).
Certificate of Examination received for Australian Patent No. 2011101154, mailed on dated May 7, 2012, 1 page.
Office Action received for Australian Patent Application No. 2011101154, mailed on Dec. 13, 2011, 4 pages.
Certificate of Examination received for Australian Patent No. 2011101155, mailed on May 8, 2012, 1 page.
Office Action received for Australian Patent Application No. 2011101155, mailed on Dec. 13, 2011, 3 pages.
Certificate of Examination received for Australian Patent No. 2011101156, mailed on May 8, 2012, 1 page.
Office Action received for Australian Patent Application No. 2011101156, mailed on Dec. 13, 2011, 3 pages.
Certificate of Examination received for Australian Patent No. 2011101157, mailed on May 8, 2012, 1 page.
Office Action received for Australian Patent Application No. 2011101157, mailed on Dec. 13, 2011, 4 pages.
Office Action received for Chinese Patent Application No. 201110148738.9, mailed on Aug. 5, 2013, 6 pages.
Office Action received for Chinese Patent Application No. 201110148738.9, mailed on Jan. 21, 2013, 17 pages (10 pages of English Translation and 7 pages of Official copy).
Office Action received for Chinese Patent Application No. 201110463262.8, mailed on Apr. 30, 2014, 14 pages (3 pages of English Translation and 11 pages of Official copy).
Notice of Acceptance received for Australian Patent Application No. 2011201639, mailed on Nov. 9, 2011, 3 pages.
Notice of Acceptance received for Australian Patent Application No. 2011205170, mailed on Jul. 3, 2013, 2 pages.
Office Action received for Australian Patent Application No. 2011205170, mailed on Feb. 22, 2012, 3 pages.
Notice of Grant received for Chinese Patent Application No. 201120580018.5, mailed on Jul. 26, 2013, 2 pages (Official Copy only).
Office Action received for Chinese Patent Application No. 201120580018.5, mailed on Apr. 22, 2013, 4 pages (English Translation only).
Office Action received for Chinese Patent Application No. 201120580018.5, mailed on Oct. 19, 2012, 4 pages (2 pages of English Translation and 2 pages of Official copy).

Notice of Acceptance Received for Australian Patent Application No. 2011209720, mailed on May 1, 2014, 3 pages.
Office Action received for Australian Patent Application No. 2011209720, issued on Jun. 28, 2013, 4 pages.
Notice of Acceptance received for Australian Patent Application No. 2011265335, mailed on Nov. 8, 2012, 3 pages.
Office Action received for Australian Patent Application No. 2011265335, issued on Sep. 3, 2012, 2 pages.
Office Action received for Australian Patent Application No. 2011268047, mailed on Aug. 14, 2013, 2 pages.
Office Action received for Japanese Patent Application No. 2012-088747, mailed on Sep. 6, 2013, 4 pages (English Translation only).
Certification of Examination received for Australian Patent Application No. 2012100050, mailed on Mar. 2, 2012, 3 pages.
Office Action received for Chinese Patent Application No. 201210128911.3, mailed on Jan. 17, 2014, 6 pages (Official copy only).
Office Action received for Chinese Patent Application No. 201210128915.1, mailed on Mar. 18, 2014, 8 pages (Official copy only).
Office Action received for Chinese Patent Application No. 201210128932.5, mailed on Feb. 21, 2014, 12 pages(Official copy only).
Decision of Grant received for Japanese Patent Application No. 2012-186775, mailed on Nov. 18, 2013, 3 pages.
Office Action received for Japanese Patent Application No. 2012-218235, mailed on Sep. 24, 2013, 6 pages (3 pages of English Translation and 3 pages of Official copy).
Notice of Allowance received for Japanese Patent Application No. 2012-500844, mailed on Aug. 1, 2014, 3 pages(Official Copy only).
Office Action received for Japanese Patent Application No. 2012-500844, mailed on Feb. 24, 2014, 8 pages (6 pages of English Translation and 2 pages of Official Copy).
Office Action received for Japanese Patent Application No. 2012-500844, mailed on Jun. 3, 2013, 5 pages (English Translation only).
Office Action Received for Chinese Patent Application No. 201310073437.3, mailed on Sep. 2, 2015, 18 pages (10 pages of English Translation and 8 pages of Official Copy).
Notice of Allowance received for Japanese Patent Application No. 2013-515382, mailed on Aug. 22, 2014, 3 pages (Official Copy only).
Office Action received for Japanese Patent Application No. 2013-515382, mailed on Nov. 18, 2013, 2 pages (English Translation only).
Certificate of Grant received for Turkish part of European Patent Application No. 2126678, mailed on Jun. 21, 2012, 2 pages (Official Copy only).
Notice of Allowance received for Canadian Patent Application No. 2658177, mailed on Jan. 30, 2012, 1 page.
Office Action received for Canadian Patent Application No. 2658177, mailed on Dec. 1, 2009, 2 pages.
Office Action received for Canadian Patent Application No. 2658177, mailed on Jun. 22, 2011, 2 pages.
Ex-parte Reexamination Final Communication received for U.S. Appl. No. 90/012,332, mailed on Jul. 26, 2013, 61 pages.
Ex-parte Reexamination Non-Final Communication received for U.S. Appl. No. 90/012,332, mailed on Dec. 19, 2012, 38 pages.
Agarawala, et al., "Keepin' It Real: Pushing the Desktop Metaphor with Physics, Piles and the Pen", CHI 2006, Montreal, Canada, Apr. 22-27, 2006, pp. 1283-1292.
Allen, Jay, "Override the GNU C Library—Painlessly", available at <http://www.ibm.com/developerworks/linux/library/l-glibc/index.html>, Apr. 1, 20024 pages.
Anonymous, "FireGestures Version History: Add-ons for Firefox", Internet Article, available at <http://addons.mozilla.org/en-US/firefox/addons/version/6366>, retrieved on Oct. 28, 2009, 6 pages.
Anonymous, "Firegestures: Changelog", Internet Article, available at <http://www.xuldev.org/firegestures/changelog.php>, retrieved on Oct. 27, 2009, Oct. 28, 20098 pages.
Anonymous, "Firegestures: Firefox Extension", Internet Article, available at <http://www.xuldev.orq/firegestures/>, retrieved on Oct. 27, 2009, 2 pages.

(56) References Cited

OTHER PUBLICATIONS

Apple Inc., "Safari Web Content Guide for iPhone", , Feb. 5, 2005, 96 pages.
Balakrishnan, et al., "Performance Differences in teh Fingers, Wrist, and Forearm in Computer Input Control", ACM Conference on Human Factors in Computing Systems (CHI '97), 1997, pp. 303-310.
Ballard, Paul, "Microsoft Makes Research Technologies Available for Licensing", available at <http://www.theserveside.com/discussions/thread.tss?thread_id=33761>, May 5, 20058 pages.
Bartlett, et al., "Rock 'n' Scroll is here to stay [user interface]", Computer Graphics and Applications, IEEE, vol. 20, Issue 3, May/Jun. 2000.
Bederson, et al., "Jazz: An Extensible 2D+Zooming Graphics Toolkit in Java", , Jul. 1999.
Bederson, et al., "Jazz: An Extensible Zoomable User Interface Graphics Toolkit in Java", ACM Symposium on User Interfaces Software and Technology, May 2000.
Bederson, et al., "Pad++: A Zooming Graphical Interface for Exploring Alternate Interface Physics", UIST' 94 Proceedings of the 7th Annual ACM symposium on User Interface Software and Technology, Nov. 1994, pp. 17-26.
Bederson, et al., "PhotoMesa 3.1.2 Screen Shots", , 2004-2006, 5 pages.
Benko, et al., "Precise Selection Techniques for Multi-Touch Screens", CHI 2006, Apr. 22-27, 2006, 10 pages.
Bier, et al., "Snap-Dragging", Proceedings of SIGGRAPH 86, Computer Graphics (20) 4, 1986, pp. 233-240.
Brown, et al., "Distributed Active Objects", Computer Networks and ISDN Systems, vol. 28, No. 11, May 1996, pp. 1037-1052.
Browne, et al. "Designing a Collaborative Finger Painting Application for Children", UM Computer Science Department, CS-TR-4184, 2000.
Buxton, W., "Invited Paper: A Touching Story: A Personal Perspective on the Histsory of Touch Interfaces Past and Future", Society for Information Display (SID) Symposium Digest of Technical Papers, vol. 41(1), Session 31, May 2010, pp. 444-448.
Buxton, "Lexical and Pragmatic Considerations of Input Structures", Computer Graphics, vol. 17, No. 1, 1983pp. 31-37.
Buxton, Bill, "Multi-Touch Systems that I Have Known and Loved", available at <http://www.billbuxton.com/multitouchOverview.html>, Jan. 12, 200714 pages.
C., A., R., Hoare "Programming Techniques—Communicating Sequential Processes", Communications of the ACM, vol. 21, No. 8, Aug. 1978, pp. 666-677.
Cao, et al., "Interacting with Dynamically Defined Information Spaces using a Handheld Projector and a Pen", UIST '06, Montreux, Switzerland, Oct. 15-18, 2006, pp. 225-234.
Captain, Sean, "Future Gear: Keyless (Data) Entry", PCWorld, Apr. 24, 2002.
Chang, et al., "Animation: From Cartoons to the User Interface", UIST '93 Proceedings of the 6th Annual ACM Symposium on User Interface Software and Technology, Nov. 1993, pp. 45-55.
Chartier, David, "Apple Releases iOS 4.3 beta for Developers", available at <http://www.macworld.com/article/1157114/ios_4_3.html>, Jan. 12, 20117 pages.
Chen, Tom, "The Web is Everywhere", IEEE Communications Magazine, Sep. 2007p. 16.
Cheng, et al., "Navigation Control and Gesture Recognition Input Device for Small, Portable User Interfaces", Synaptics, Inc. of San Jose, California, Jun. 11, 2004, pp. 1-13.
Dannenberg, et al., "A Gesture Based User Interface Prototyping System", UIST '89 Proceedings of the 2nd Annual ACM SIGGRAPH symposium on User interface software and technology, 1989, pp. 127-132.
Davidson, et al., "Synthesis and Control on Large Scale Multi-Touch Sensing Displays", In Proceedings of the 2006 Conference on New Interfaces for Musical Expression, 2006, pp. 216-219.
Davies, E R., "Lateral Histograms for Efficient Object Location: Speed versus Ambiguity", Pattern Recognition Letters, vol. 6, No. 3, , Aug. 1987, pp. 189-198.
Davis, Joshua, "Flash to the Core—An Interactive Sketchbook", available at <http://flashtothecore.praystation.com/menu.html>, 20023 pages.
DeWid, R D., "Scroll Control Box", IBM Technical Disclosure Bulletin, vol. 38, No. 4, Apr. 1993, pp. 399-403.
Dietz, et al., "DiamondTouch: A Multi-User Touch Technology", Mitsubishi Electric Research Laboratories, Oct. 2003, 11 pages.
Dietz, et al., "DT Controls: Adding Identity to Physical Interfaces", UIST '05, Seattle, Washington, USA, Oct. 23-27, 2005.
Dietz, et al., "Submerging Technologies", ACM SIGGRAPH 2006 Sketches, 2006.
Dodge, et al., "Microsoft Office Excel 2003 Office Manual", Microsoft Press, vol. 1, Unable to Locate English Translation, Jul. 12, 2004, 5 pages.
Duce, et al., "An Approach to Hierarchical Input Devices", Computer Graphics Forum, vol. 9(1), 1990, pp. 1-16.
Duce, et al., "Components, Frameworks and GKS Input", CWI Report, No. CS-R8947, Amsterdam, CWI, 1980, pp. 87-106.
Epps, et al., "A Study of Hand Shape Use in Tabletop Gesture Interaction", CHI 2006—Work-in-progress, Montreal, Quebec, Canada, Apr. 22-27, 2006, pp. 748-753.
Erickson, T.,D., "Working with Interface Metaphors, in Human-computer Itneraction", , 1995, pp. 65-73.
Esenther, et al., "DiamondTouch SDK: Support for Multi-User, Multi-Touch Applications", Mistsubishi Electric Research Laboratories, Nov. 2002, 5 pages.
Esenther, et al., "Fluid DTMouse: Better Mouse Support for Touch-Based Interactions", AVI '06, Venezia, Italy, May 23-26, 2006.
Esenther, et al., "Multi-User Multi-Touch Games on Diamond Touch with the DTFlash Toolkit", Dec. 2005, 5 pages.
Esenther, et al., "RemoteDT: Support for Multi-Site Table Collaboration", International Conference on Collaboration Technologies (CollabTech), Jul. 2006.
Everitt, et al., "Modal Spaces: Spatial Multiplexing to Mediate Direct-Touch Input on Large Displays", CHI 2005, Portland, Oregon, USA, Apr. 2-7, 2005, pp. 1359-1362.
Everitt, et al., "MultiSpace: Enabling Electronic Document Micromobility in Table-Centric, Multi-Device Environments", First IEEE International Workshop on Horizontal Interactive Human-Computer Systems, TableTop 2006.
Everitt, et al., "Observations of a Shared Tabletop User Study", CSCW '04, Chicago, USA, Nov. 6-10, 2004.
Everitt, Katherine E., "UbiTable: Impromptu Face-to-Face Collaboration on Horizontal Interactive Surfaces", Mitsubishi Electric Research Laboratories, Sep. 2003, 10 pages.
Faconti, et al., "The Input Model of Standard Graphics Systems Revisited by Formal Specification", Eurographics '92, vol. 11, No. 3, 1992, pp. C-237 to C-251.
Fearing, R S., "Tactile Sensing Mechanisms", The International Journal of Robotics Research, vol. 9, No. 3, Jun. 1990, pp. 3-23.
Ferg, "Event-Driven Programming: Introduction, Tutorial, History", Version 0.2, Feb. 8, 2006pp. 1-59.
FingerWorks Inc., "FingerWork Installation and Operation Guide for the TouchStream ST & TouchStream LP", , 2002, pp. 1-25.
Fitzmaurice, et al., "Bricks: Laying the Foundations for Graspable User Interfaces", Proceeding of the ACM Conference on Human Factors in Computing Systems (CHI '95), New York: ACM, 1995, pp. 1-8.
Flanagan, David, "JavaScript", 5th Edition, O'reilly Japan, Jan. 31, 2008pp. 405-437 (Japanese Language).
Foley, et al., "The Art of Natural Graphic Man—Machine Conversation", Proceedings of the IEEE, vol. 62, No. 4, Apr. 1974, pp. 462-471.
Forlines, et al., "DTLens: Multi-user Tabletop Spatial Data Exploration", UIST'05, Oct. 23-27, 2005, 6 pages.
Forlines, et al., "Exploring the Effects of Group Size and Display Configuration on Visual Search", CSCW '06, Banff, Alberta, Canada, Nov. 4-8, 2006, pp. 11-20.
Forlines, et al., "Glimpse: A Novel Input Model for Multi-Level Devices", CHI'2005, Apr. 2-7, 2005, 6 pages.

(56) References Cited

OTHER PUBLICATIONS

Forlines, et al., "HybridPointing: Fluid Switching Between Absolute and Relative Pointing with a Direct Input Device", UIST '06, Montreux, Switzerland, Oct. 15-18, 2006, pp. 211-220.
Forlines, et al., "Multi-User, Multi-Display Interaction with a Single-User, Single-Display Geospatial Application", Mitsubishi Electric Research Laboratories, Inc., TR2006-083, Oct. 2006, pp.—797HTC-0043238—797HTC-0043242.
Forlines, et al., "Under My Finger: Human Factors in Pushing and Rotating Documents Across the Table", Proceedings of Human-Computer Interaction—Interact 2005: IFIP TC13 Interaction Conference, Rome Italy, Dec. 2005, pp. 994-997.
Forlines, et al., "Zoom-and-Pick: Facilitating Visual Zooming and Precision Pointing with Interactive Handheld Projectors", UIST '05, Seattle, Washington, USA, Oct. 23-27, 2005, pp. 73-82.
Fukuchi, Kentaro, "Concurrent Manipulation of Multiple Components on Graphical User Interface", PhD Thesis, Tokyo Institute of Technology, Oct. 23, 2006160 pages.
Fukuchi, et al., "Interaction Techniques for SmartSkin", In Proceedings of UIST '02, 2002, 2 pages.
Fukuchi, et al., "Marble Market: Bimanual Interactive Game with a Body Shape Sensor", 2007.
Fukuchi, "Multi-track Scratch Player on a Multi-Touch Sensing Device", 2007.
Fukuchi, et al., "SmartSkin", , 2003.
Furuichi, et al., "DTMap Demo: Interactive Tabletop Maps for Ubiquitous Computing", UbiComp 2005.
Gingold, et al., "A Direct Texture Placement and Editing Interface", UIST '06, Montreux, Switz, Oct. 15-18, 2006, pp. 23-31.
Gleicher, M., "Image Snapping", , 1995, pp. 183-190.
Gross, Mark D., "Grids in Design and CAD", Proceedings of Association for Computer Aided Design in Architecture, 1991, pp. 1-110.
Grossman, et al., "Multi-Finger Gestural Interaction with 3D Volumetric Displays", UIST '04, Santa Fe, New Mexico, USA, Oct. 24-27, 2004.
Grossman, et al., "The Design and Evaluation of Selection Techniques for 3D Volumetric Displays", UIST '06, Montreux, Switzerland, Oct. 15-18, 2006, pp. 3-12.
Han, Jeff, "Jeff Han Demos his Breakthrough Touchscreen", TED, Ideas Worth Spreading, available at <http://www.ted.com/tals// jeff_han_demos_his_breakthrough_touchscreen.html>, Feb. 25, 200612 pages.
Han, Jefferson Y., "Low-Cost Multi-Touch Sensing Through Frustrated Total Internal Reflection", Oct. 23, 2005, pp. 115-118.
Han, et al., "Measuring Bidirectional Texture Reflectance with a Kaleidoscope", , 2003, pp. 741-748.
Han, "Media Mirror".
Han, Jeff Y., "Multi-Touch Interaction Research", available at <http://mrl.nyu.edu/~jhan/ftirtouch/>, retrieved on Apr. 13, 2006, 4 pages.
Han, "Multi-touch Interaction Wall", in ACM SIGGRAPH, 20061 page.
Han, "Multi-Touch Sensing Through Frustrated Total Internal Reflection", , 2 pages.
Han, "Unveiling the Genius of Multi-Touch Interface Design", Feb. 2006.
Hancock, et al., "Exploring Non-Speech Auditory Feedback at an Interactive Multi-User Tabletop", GI '05 Proceedings of Graphics Interface, 2005.
Hansen, et al., "Events Not Equal to GUIs", SIGCSE '04, Norfolk, Virginia, USA, Mar. 3-7, 2004, pp. 378-381.
Harrison, et al., "Squeeze Me, Hold Me, Tilt Me! An Exploration of Manipulative User Interfaces", CHI '98, Los Angelse, CA USA, Apr. 1998, pp. 17-24.
Hauptman, et al., "Gesture Analysis for Graphic Manipulation", , Nov. 28, 1988, pp. 1-15.
Holzner, "Built-in JavaScript Objects", JavaScript Program Control and Objects, 1998pp. 71-79.
IBM, "Method to Disable and Enable a Touch Pad Pointing Device or Tablet Input Device Using Gestures", Jun. 11, 2002, pp. 1-3.
Ishak, et al., "Content-Aware Scrolling", UIST'06 Proceedings of the 19th annual ACM symposium on User Interface Software and Technology, Montrex, Switzerland, Oct. 15-18, 2006.
JazzMutant, "Lemur v1.3 Documentation/Addendum", available at <http://www.jazzmutant.com/support_download.php>, Mar. 22, 20053 pages.
JazzMutant, "Lemur v1.3 Examples Package: CursorModes.xml", available at <http://www.jazzmutant.com/support_download.php>, Jan. 31, 20064 pages.
JazzMutant, "Lemur v1.3 Examples Package: LightStepSeq.xml", available at <http://www.jazzmutant.com/support_download.php>, Jan. 31, 20065 pages.
JazzMutant, "Support", available at <http://web.archive.org/web/20060421144624/http://www.jazzmutant.com/support_download.php>, Apr. 21, 20062 pages.
JazzMutant, "The Lemur Owner's Manual", available at <http://www.jazzmutant.com/support_download.php>, Oct. 31, 2005108 pages.
Johnson, Jeff A., "A Comparison of User Interfaces for Panning on a Touch-Controlled Display", CHI '95 Proceedings, Mosaic of Creativity, May 7-11, 1995, pp. 218-225.
Johnson, et al., "The Effect of Touch-Pad Size on Pointing Accuracy", , Apr. 1994, pp. 1-8.
Justice Floyd, "UK Royal Court of Justice: [2012] EWHC 1789 (Pat)—Extracts", available at <http://www.judiciary.gov.uk/Resources/JCO/Documents/Judgments/htc-v-apple-judgment.pdf>, Jul. 4, 201226 pages.
Karlson, et al., "AppLens and LaunchTile: Two Designs for One-Handed Thumb Use on Small Devices", Powerpoint Presentation, CHI 2005, 17 pages.
Karlson, et al., "AppLens and LaunchTile: Two Designs for One-Handed Thumb Use on Small Devices", CHI 2005, Papers: Small Devices 1, Apr. 2-7, 2005, pp. 201-210.
Kenny, "UIGestureRecognizer", available at <http://iphonedevwiki.net/index.php?title=UIGestureRecognizer&oldid=319>, Oct. 31, 20093 pages.
Kim, et al., "HCI (Human Computer Interaction) Using Multi-touch Tabletop Display", IEEE Pacific Rim Conference on Communications, Computers and Signal Processing, Victoria, BC, Canada, Aug. 2007, pp. 391-394.
Kim, et al., "Multi-touch Interaction for Table-Top Display", ICAT 2006, LNCS 4282, , pp. 1273-1282.
Kirk, "Optimal Control Theory—An Introduction, Numerical Determination of Optimal Trajectories", 1970, pp. 331-343.
Krolik, M., "PIV Creator 3.41", Cross Browser DHTML 360 Panorama Image Viewer (PIV), 1999.
Kurtenbach, et al., "The Design of a GUI Paradigm Based on Tablets, Two-Hands, and Transparency", Mar. 27, 1997, 8 pages.
Laurel, B., "The Art of Human-Computer Interface Design",1990, pp. 65-73.
Lee, et al., "Haptic Pen: Tactile Feedback Stylus for Touch Screens", Mitsubishi Electric Research Laboratories, Oct. 2004, 6 pages.
Lytle, "FingerWorks Announces a Gesture Keyboard for Apple PowerBooks", PR Newswire.
Malik, "An Exploration of Multi-Finger Interaction on Multi-Touch Surfaces", Doctoral Dissertation, 2007, pp. 1-169.
Malik, et al., "Interacting with Large Displays from a Distance with Vision-Tracked Multi-Finger Gestural Input", UIST '05, Seattle, Washington, USA, 2005, pp. 43-52.
Malik, et al., "Visual Touchpad: A Two-Handed Gestural Input Device", ICMI'04 Proceedings of the 6th International Conference on Multimodal Intercases, ACM, Oct. 13-15, 2004, pp. 289-296.
Masui, et al., "Elastic Graphical Interfaces for Precise Data Manipulation", ACM Conference on Human Factors in Computing Systems (CHI '95), Conference Companion, Apr. 1995, pp. 143-144.
Mertz, et al., "The Influence of Design Techniques on User Interfaces: The DigiStrips Experiment for Air Traffic Control", Proceeding of HCI-Aero 2000 International Conference on Human-Computer Interaction in Aeronautics, 2000, 6 pages.

(56) References Cited

OTHER PUBLICATIONS

Microsoft, "Microsoft® Windows® Software Development Kit—Update for Windows Vista.TM.", available at <http://www.microsoft.com/download/en/details.aspx?displaying=en&id=23719>, Mar. 22, 2007 26 pages.
Microsoft, "Window Styles—Microsoft Windows SDK", Screenshot, Mar. 22, 2007 2 pages.
Miller, Dana, "PersonalJava Application Environment", available at <http://java.sun.com/products/personaljava/touchable/>, Jun. 8, 1999 12 pages.
Millhollon, et al., "Microsoft Office Word 2003 Inside Out", 2004, 7 pages.
Minsky, "Manipulating Simulated Objects with Real-World Gestures Using a Force and Position Sensitive Screen", Proceedings of the 11th Annual Conference on Computer Graphics and Interactive Techniques, Jul. 1984pp. 195-203.
Moghaddam, et al., "Visualization & User-Modeling for Browsing Personal Photo Libraries", International Journal of Computer Vision, vol. 56, No. 1/2, 2004, pp. 109-130.
Morris, et al., "Beyond Social Protocols: Multi-User Coordination Policies for Co-located Groupware", CSCW '04, Chicago, Illinois, USA, Nov. 6-10, 2004.
Morris, et al., "Conflict Resolution in Paper and Digital Worlds: Two Surveys of User Expectations", ACM Conference on Computer Supported Cooperative Work (CSCW), Chicago, Illinois.
Moscovich, et al., "A Multifinger Interface for Performance Animation of Deformable Drawings", UIST '05—Adjunct Proceedings of the 18th Annual ACM Symposium on User Interface Software and Technology, 2005.
Moscovich, et al., "Multi-Finger Cursor Techniques", GI '06 Proceedings of Graphics Interface 2006, Quebec City, Quebec, Canada, Jun. 9, 2006, 7 pages.
Moyle, et al., "The Designe and Evaluation of a Flick Gesture for 'Back' and 'Forward' in Web Browsers", AUIC '03 Proceedings of the Fourth Australasian user interface conference on User interfaces 2003, vol. 18.
Myers, et al., "Past, Present, and Future of User Interface Software Tools", ACM Transactions on Computer-Human Interaction, vol. 7, No. 1, Mar. 2000, pp. 3-28.
Nairn, Rown, "Breakthrough Internet Device", Eureka Man, available at <URL:https://web.archive.org web/20070709083626/http://1eurekaman.com/towards-multi-touch-in-the-browser>, retrieved on Jul. 9, 2007, Jul. 9, 2007 2 pages.
Nakatani, et al. "Soft Machines: A Philosophy of User-Computer Interface Design", CHI '83, Proceedings, Dec. 1983, pp. 19-23.
Narayanaswamy, et al., "User Interface for a PCS Smart Phone", Multimedia Computing and Systems, IEEE Conference 1999, Published, Jun. 7-11, 1999, vol. 1, pp. 777-781.
Newman, "A System for Interactive Graphical Programming", AFIPS '68 (Spring) Proceedings of the Apr. 30-May 2, 1968, spring joint computer conference, pp. 47-54.
Ogawa, et al., "Preprocessing for Chinese Character Recognition and Global Classification of Handwritten Chinese Characters", Pattern Recognition, vol. 11, 1979, pp. 1-7.
Owen, G.,S., "Principles of Animation: Slow in and Out", Mar. 13, 1999.
International Preliminary Report on Patentability received for PCT Patent Application No. PCT/US2005/000089, issued on Jun. 18, 2008, 5 pages.
International Search Report and Written Opinion received for PCT Patent Application No. PCT/US2005/000089, mailed on May 31, 2005, 7 pages.
International Preliminary Report on Patentability received for PCT Patent Application No. PCT/US2008/000058, mailed on Jul. 7, 2009, 5 pages.
International Search Report and Written Opinion received for PCT Patent Application No. PCT/US2008/000058, mailed on Jul. 31, 2008, 10 pages.
International Preliminary Report on Patentability received for PCT Patent Application No. PCT/US2008/000060, mailed on Jul. 7, 2009, 7 pages.
International Search Report and Written Opinion received for PCT Patent Application No. PCT/US2008/000060, mailed on Apr. 22, 2008, 12 pages.
International Preliminary Report on Patentability received for PCT Patent Application No. PCT/US2008/000069, mailed on Jul. 7, 2009, 8 pages.
International Search Report and Written Opinion received for PCT Patent Application No. PCT/US2008/000069, mailed on May 2, 2008, 16 pages.
International Preliminary Report on Patentability received for PCT Patent Application No. PCT/US2008/000089, mailed on Jul. 7, 2009, 9 pages.
International Search Report and Written Opinion received for PCT Patent Application No. PCT/US2008/000089, mailed on Jun. 4, 2008, 14 pages.
International Preliminary Report on Patentability received for PCT Patent Application No. PCT/US2008/000103, mailed on Jul. 7, 2009, 9 pages.
International Search Report and Written Opinion received for PCT Patent Application No. PCT/US2008/000103, mailed on Jun. 3, 2008, 11 pages.
International Search Report and Written Opinion received for PCT Patent Application No. PCT/US2008/050292, mailed on Sep. 19, 2008, 19 pages.
Invitation to Pay Additional Fees received for PCT Patent Application No. PCT/US2008/050292, Jul. 18, 2008, 4 pages.
International Preliminary Report on Patentability received for PCT Patent Application No. PCT/US2009/034772, mailed on Sep. 16, 2010, 8 pages.
International Search Report received for PCT Patent Application No. PCT/US2009/034772, mailed on Apr. 16, 2009, 3 pages.
International Preliminary Report on Patentability received for PCT Patent Application No. PCT/US2009/035856, mailed on Sep. 16, 2010, 8 pages.
International Search Report and Written Opinion received for PCT Patent Application No. PCT/US2009/035856, mailed on Jul. 3, 2009, 7 pages.
International Preliminary Report on Patentability received for PCT Patent Application No. PCT/US2009/035858, mailed on Sep. 16, 2010, 7 pages.
International Search Report and Written Opinion received for PCT Patent Application No. PCT/US2009/035858, mailed on Jul. 3, 2009, 10 pages.
International Preliminary Report on Patentability received for PCT Patent Application No. PCT/US2009/035874, mailed on Sep. 16, 2010, 3 pages.
International Search Report and Written Opinion received for PCT Patent Application No. PCT/US2009/035874, mailed on Nov. 11, 2009, 7 pages.
International Preliminary Report on Patentability received for PCT Patent Application No. PCT/US2010/027118, mailed on Sep. 20, 2011, 10 pages.
International Search Report and Written Opinion received for PCT Patent Application No. PCT/US2010/027118, mailed on Oct. 5, 2010, 14 pages.
Invitation to Pay Additional Fees received for PCT Patent Application No. PCT/US2010/027118, mailed on Jul. 13, 2010, 7 pages.
International Preliminary Report on Patentability received for PCT Patent Application No. PCT/US2011/022516, mailed on Aug. 9, 2012, 11 pages.
International Search Report and Written Opinion received for PCT Patent Application No. PCT/US2011/022516, mailed on May 20, 2011, 16 pages.
International Preliminary Report on Patentability received for PCT Patent Application No. PCT/US2011/039583, mailed on Dec. 27, 2012, 10 pages.
International Search Report and Written Opinion received for PCT Patent Application No. PCT/US2011/039583, mailed on Dec. 13, 2011, 12 pages.

(56) References Cited

OTHER PUBLICATIONS

International Preliminary report on Patentability received for PCT Patent Application No. PCT/US2011/065859, mailed on Jul. 4, 2013, 16 pages.
International Search Report and Written Opinion received for PCT Patent Application No. PCT/US2011/065859, mailed on Jun. 1, 2012, 22 pages.
Invitation to Pay Additional Fees received for PCT Patent Application No. PCT/US2011/065859, mailed on Mar. 12, 2012, 10 pages.
Petzold, Charles, "Programming Microsoft Windows with C#", , Jan. 18, 20025 pages.
Pickering, J. A., "Touch-Sensitive Screens: The Technologies and Their Application", International Journal of Man-Machine Studies, vol. 25, No. 3, Sep. 1986, pp. 249-269.
Pixley, Tom (Editor)., "Document Object Model (DOM) Level 2 Events Specifications (Version 1.0)", W3C Recommendation, Nov. 13, 2000, 47 pages.
Plaisant, C., "Touchscreen Toggle Design", available at <http://www.youtube.com/watch?v=wFWbdxicvK0>, retrieved on Nov. 15, 2013, 2 pages.
Plaisant, et al., "Touchscreen Toggle Design", CHI'92, May 3-7, 1992, pp. 667-668.
Pogue, David, "Windows Vista for Starters: The Missing Manual", available at <http://academic.safaribooksonline.com/book/operating-systems/0596528264>, Jan. 25, 2007, 18 pages.
Raab, "Pedagogical Power Tools for Teaching Java", ITiCSE 2000 7/00 Helsinki, Finland, pp. 156-159.
Raiha, Liisa, "Delegation: Dynamic Specialization", ACM, 1994pp. 172-179.
Rasala, "Java Power Tools: Model Software for Teaching Object-Oriented Design", SIGCSE 2001 Feb. 2001 Charlotte, NC USA, pp. 297-301.
Raskar, et al., "Intelligent Clusters and Collaborative Projector-based Displays", NSF Lake Tahoe Workshop on Collaborative Virtual Reality and Visualization, Oct. 2003, pp. 1-5.
Rekimoto, et al., "Augmented Surfaces: A Spatially Continuous Work Space for Hybrid Computing Environments", CHI '99 Proceedings of the SIGCHI Conference on Human Factors in Computing Systems: the CHI is the Limit, 1999.
Rekimoto, "Pick-and-Drop: A Direct Manipulation Technique for Multiple Computer Environments", UIST '97 Proceedings of the 10th Annual ACM Symposium on User Interface Software and Technology, Banff, Alberta, Canada, 1997pp. 31-39.
Rekimoto, et al., "SmartSkin: An Infrastructure for Freehand Manipulation on Interactive Surfaces", Proceedings of the SIGCHI conference on Human factors in computing systems, vol. 4, Issue 1, Apr. 25, 2002, pp. 113-120.
Robertson, et al., "Data Mountain: Using Spatial Memory for Document Management", Uist '98: Proceedings of the 11th Annual ACM symposium on User Interface Software and Technology, San Francisco, 1998, pp. 153-162.
Rogers, Michael, "It's for You! An iPhone Development Primer for the Busy College Professor", Journal of Computing Sciences in Colleges, vol. 25, No. 1, Oct. 2009, pp. 94-101.
Rosenberg, et al., "Real-Time Stereo Vision Using Semi-Global Matching on Programmable Graphics Hardware", ACM SIGGRAPH 2006 Sketches, 2006.
Rosenthal, et al., "The Detailed Semantics of Graphics Input Devices", Computer Graphics, vol. 16, No. 3, Jul. 1982, pp. 33-38.
Rubine, Dean, "Combining Gestures and Direct Manipulation", CHI '92, May 3-7, 1992pp. 659-660.
Rubine, "Intergrating Gesture Recognition and Direct Manipulation", Usenix Technical Conference, 1991pp. 1-18.
Rubine, et al., "Programmable Finger-Tracing Instrument Controllers", Computer Music Journal, vol. 14, No. 1 New Performance Interfaces, Spring 1990, pp. 26-41.
Rubine, D., "Specifying Gestures by Example", Computer Graphics vol. 25, No. 4, Jul. 1991, pp. 329-337.
Rubine, Dean Harris., "The Automatic Recognition of Gestures", CMU-CS-91-202 Thesis Submitted in Partial Fulfillment of the Requirements for the Degree of Doctor of Philosophy in Computer Science at Carnegie Mellon University, Dec. 1991, 285 pages.
Rubine, et al., "The VideoHarp", Proceedings of the 14th International Computer Music Conference, Cologne, W. Germany, Sep. 20-25, 1988, 1988, pp. 49-55.
Ryall, et al., "Experiences with and Observations of Direct-Touch Tabletops", Tabletop '06 Proceedings of the First IEEE International Workshop on Horizontal Interactive Human-Computer Systems.
Ryall, et al., "Exploring the Effects of Group Size and Table Size on Interactions with Tabletop Shared-Display Groupware", CSCW '04, Chicago, Illinois, USA, Nov. 6-10, 2004.
Ryall, et al., "iDwidgets: Parameterizing Widgets by User Identity", INTERACT 2005 (Tenth IFIP TC13 Int Conf on Human-Computer Interaction).
Ryall, et al., "Temporal Magic Lens: Combined Spatial and Temporal Query and Presentation", INTERACT 2005 (Tenth IFIP TC13 Int. Conf on Human-Computer Interaction), 2005.
Salmoni, "The Zooming User Interface", Advogato, available at <http://www.advogato.org/article/788.html>, Aug. 16, 200414 pages.
Sears, et al., "High Precision Touchscreens: Design Strategies and Comparisons with a Mouse", International Journal of Man-Machine Studies, vol. 34, No. 4, Apr. 1991, pp. 593-613.
Sensor Fram Corporation, "The Sensor Frame Graphic Manipulator NASA Phase II Final Report", , May 8, 1990pp. 1-25.
Seonkyoo Lee, "A Fast Multiple-Touch-Sensitive Input Device", , Oct. 1984.
Sharon, "Haptic Perception with an Articulated Sensate Robot Hand", Robotica, vol. 10, 1992pp. 497-508.
Shen, et al., "Building and Sharing Digital Group Histories", CSCW '02, New Orleans, Louisiana, USA, Nov. 16-20, 2002.
Shen, et al., "CoR2Ds: Context-Rooted Rotatable Draggables for Tabletop Interaction", CHI 2005, Portland, Oregon, USA, Apr. 2-7, 2005, pp. 1781-1784.
Shen, et al., "DiamondSpin: An Extensible Toolkit for Around-the-Table Interaction", , Apr. 24-29, 2004, 8 pages.
Shen, et al., "Multi-User Interface and Interactions on Direct-Touch Horizontal Surfaces: Collaborative Tabletop Research at MERL", First IEEE International Workshop on Horizontal Interactive Human-Computer Systems, TableTop 2006, 2006.
Shen, et al., "Personal Digital Historian: Story Sharing Around the Table", Interactions—Winds of Change, vol. 10, No. 2, 2003, pp. 15-22.
Shen, et al., "Three Modes of Multi-Surface Interaction and Visualization", ACM CHI '06 International Conference, Montreal, Canada, Apr. 22-23, 2006, pp. 1-4.
Shneiderman, "Future Directions for Human—Computer Interaction", International Journal of Human Computer Interaction, 1990, pp. 1-19.
Sibert, et al., "An Object-Oriented User Interface Management System", SIGGRAPH '86, vol. 20, No. 4, 1986, pp. 259-268.
Siegel, et al., "Performance ANalysis of a Tactile Sensor", IEEE International Conference on Robotics and Automation, Proceedings, 1987, pp. 1493-1499.
Smith, et al., "The Radial Scroll Tool: Scrolling Support for Stylus- or Touch-Based Document Navigation", UIST '04 Proceedings of the 17th Annual ACM symposium on User Interface Software and Technology, Santa Fe, New Mexico, Oct. 24-27, 2004, pp. 1-4.
Son, et al., "Comparison of Contact Sensor Localization Abilities During Manipulation", Robotics and Autonomous Systems, vol. 17(4), 1996, pp. 217-233.
Sony, "The Power of a Full-Sized PC in the Palm of your Hand", 2004.
Stauffer, "Progress in Tactile Sensor Development", Robotics Today, Jun. 1983pp. 43-49.
Stein, "What We Swept Under the Rug: Radicaly Rethinking CSI", Computer Science Education, vol. 8, No. 2, 1998, pp. 118-129.
Sugimoto, et al., "HybridTouch: An Intuitive Manipulation Technique for PDAs Using Their Front and Rear Surfaces", MobileHCI '06, Helsinki, Finland, Sep. 12-15, 2006, pp. 137-140.

(56) References Cited

OTHER PUBLICATIONS

Sugiyama, et al., "Tactile Image Detection Using a 1k- element Silicon Pressure Sensor Array", Sensors and Actuators, A21-A23, 1990, pp. 397-400.

Sun, et al., "Flipper: A New Method of Digital Document Navigation", CHI '05 extended abstracts on Human factors in computing systems, Portland, Oregon, Apr. 2-7, 2005, pp. 2001-2004.

TE Connectivity, "CarrollTouch Infrared Touch Technology".

Thomas, et al., "Animating Direct Manipulation Interfaces", UIST 95 Pittsburg, PA, Nov. 1995, pp. 3-12.

Thomas, et al., "Applying Cartoon Animation Techniques to Graphical User Interfaces", ACM Transactions on Computer-Human Interaction, vol. 8, No. 3, Sep. 2001, pp. 198-222.

Tidwell, Jenifer, "Magnetism", Designing Interfaces, 2006pp. 261-262.

Tse, et al., "Enabling Interaction with Single User Applications Through Speech and Gestures on a Multi-User Tabletop", Mitsubishi Electric Research Laboratories, 2005, pp. 336-343.

Tse, et al., "GSI Demo: Multiuser Gesture/Speech Interaction over Digital Tables by Wrapping Single User Applications", ICMI '06, Alberta, Canada, Nov. 2-4, 2006.

Tse, et al., "Multimodal Multiplayer Tabletop Gaming", Third International Workshop on Pervasive Gaming Applicaitons—PerGames 2006, Dublin, Ireland, May 7, 2006.

Wallace, "The Semantics of Graphic Input Devices", ACM SIGGRAPH Computer Graphics, vol. 10, No. 1, 1974, pp. 61-65.

Wellner, Pierre D., "Adaptive Thresholding fo rthe Digital Desk", Technical Report, Rank Xerox Research Center, Cambridge Laboratory, Cambridge, United Kingdom (Available online at http://citeseerx.ist.psu.edu/viewdoc/download?doi=10.1.1.71.8970&rep=rep1&type=pdf, Jul. 1993, 18 pages.

Wellner, Pierre D., "Self Calibration for the DigitalDesk", Technical Report, Rank Xerox Research Centre, Cambridge Laboratory, Cambridge, United Kingdom (Available online at http://citeseerxist/psu.edu/viewdoc/download?doi=10.1.1.44.7371&rep=rep1&type=pdf, last visited Apr. 22, 2010), Jul. 1993, 16 pages.

Wellner, Pierre, "The DigitalDesk Calculators: Tangible Manipulation on a Desk Top Display", In ACM UIST '91 Proceedings, Nov. 11-13, 1991pp. 27-33.

Westerman, Wayne, "Hand Tracking, Finger Identification and Chordic Manipulation on a Multi-Touch Surface", Doctoral Dissertation, 1999, 363 Pages.

Westermann, et al., "MultiTouch: A New Tactile 2-D Gesture Interface for HumanComputer Interaction", Proceedings of the Human Factors and Ergonomics Society 45th Annual Meeting, Minneapolis, MN, USA, 2001, pp. 632-636.

Wigdor, et al., "Effects of Display Position and Control Space Orientation on User Preference and Performance", CHI 2006, Montreal, Quebec, Canada, Apr. 22-27, 2006, pp. 309-318.

Wigdor, et al., "Empirical Investigation into the Effect of Orientation on Text Readability in Tabletop Displays", ECSCW '05 Proceedings in the 9th Conference on European Conference on Computer Supported Cooperative Work, 2005.

Wigdor, et al., "Table-Centric Interactive Spaces for Real-Time Collaboration", AVI '06, Venezia Italy, May 23-26, 2006.

Wigdor, et al., "Under the Table Interaction", UIST '06, Montreux, Switzerland, Oct. 15-18, 2006, pp. 259-268.

Wikibooks, "Java Programming/Applets/Event Listeners", available at <http://en.wikibooks.org/wiki/Java_Programming/Applets/Event_Listeners>, May 1, 20076 pages.

Wilson, "PlayAnywhere: A Compact Interactive Tabletop Projection-Vision System", UIST '05, Seattle, Washington, USA, Oct. 23-27, 2005.

Wilson, Andrew D., "TouchLight: An Imaging Touch Screen and Display for Gesture-Based Interaction", ACM, Oct. 13-15, 2004, 8 pages.

Wireless News, "Adobe Rolls Out Flash Player 9", Jun. 28, 2006.

Wittenburg, et al., "Research on Public, Community, and Situated Displays", MERL Cambridge, Public, Community and Situated Displays Workshop (CSCW), Nov. 2002.

Wu, et al., "Gesture Registration, Relaxation, and Reuse for Multi-Point", IEEE, International Workshop on Horizontal Interactive Human-Computer Systems, 2006, 8 pages.

Wu, et al., "Multi-Finger and Whole Hand Gestural Interaction Techniques for Multi-User Tabletop Displays", UiST '03, Vancouver, BC, Canada, © ACM 2003, , Nov. 5-7, 2003, pp. 193-202.

YouTube, "A Lemurized Formula", Video uploaded to YouTube by Sph9000, available at <http://www.youtube.com/watch?v=sHAMyQak-LM>, Dec. 15, 2007, 1 page.

Intention to Grant received for European Patent Application No. 08712964.9, mailed on Nov. 30, 2016, 7 pages.

Non-Final Office Action received for U.S. Appl. No. 13/251,152, dated Jan. 20, 2012, 20 pages.

Non-Final Office Action received for U.S. Appl. No. 13/464,800, dated Jun. 18, 2012, 10 pages.

Notice of Allowance received for U.S. Appl. No. 13/464,800, dated Dec. 19, 2012, 9 pages.

Notice of Allowance received for U.S. Appl. No. 13/464,800, dated Nov. 13, 2012, 8 pages.

Notice of Allowance received for U.S. Appl. No. 13/620,390, dated Jan. 15, 2014, 10 pages.

Supplemental Notice of Allowance received for U.S. Appl. No. 13/620,390, dated Jan. 27, 2014, 2 pages.

Non-Final Office Action received for U.S. Appl. No. 13/670,378, dated Mar. 5, 2013, 28 pages.

Notice of Allowance received for U.S. Appl. No. 13/670,378, dated Jul. 24, 2013, 18 pages.

Non-Final Office Action received for U.S. Appl. No. 13/867,950, dated Jun. 26, 2013, 5 pages.

* cited by examiner

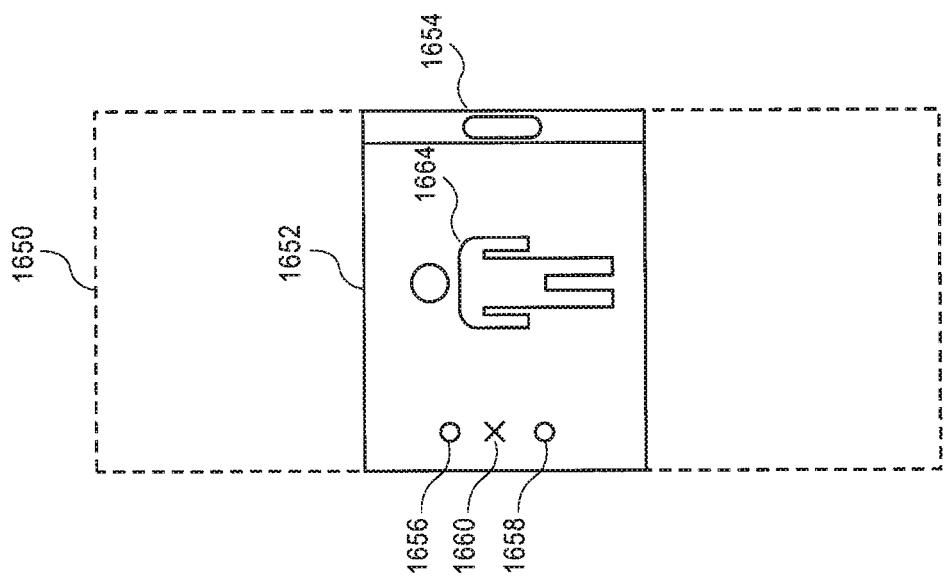
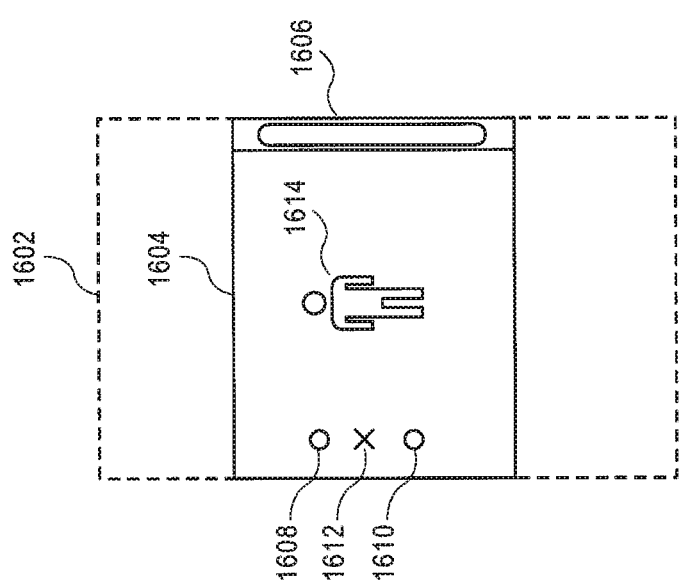

APPLICATION PROGRAMMING INTERFACES FOR SCROLLING OPERATIONS

This application is a continuation of U.S. application Ser. No. 14/712,637, filed on May 14, 2015, now U.S. Pat. No. 9,448,712, issued on Sep. 20, 2016, which is a continuation of U.S. application Ser. No. 14/189,922, filed on Feb. 25, 2014, now U.S. Pat. No. 9,037,995, issued on May 19, 2015, which is a continuation of U.S. application Ser. No. 13/867, 950, filed on Apr. 22, 2013, now U.S. Pat. No. 8,661,363, issued on Feb. 25, 2014, which is a continuation of U.S. application Ser. No. 12/869,182, filed on Aug. 26, 2010, now U.S. Pat. No. 8,429,557, issued on Apr. 23, 2013, which is a divisional of U.S. application Ser. No. 11/620,717, filed on Jan. 7, 2007, now U.S. Pat. No. 7,844,915, issued on Nov. 30, 2010, all of which are incorporated herein by reference in their entirety.

FIELD OF THE DISCLOSURE

This disclosure relates to application programming interfaces that provide scrolling operations.

COMPUTER PROGRAM LISTING

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

Applicant has submitted herewith Computer Program Listings which are included as Appendix A, attached.

BACKGROUND OF THE DISCLOSURE

An API is a source code interface that a computer system or program library provides in order to support requests for services from a software application. An API is specified in terms of a programming language that can be interpretative or compiled when an application is built, rather than an explicit low level description of how data is laid out in memory. The software that provides the functionality described by an API is said to be an implementation of the API.

Various devices such as electronic devices, computing systems, portable devices, and handheld devices have software applications. The API interfaces between the software applications and user interface software to provide a user of the device with certain features and operations. A user may desire certain operations such as scrolling, selecting, gesturing, and animating operations for a display of the device.

Scrolling is the act of sliding a directional (e.g., horizontal or vertical) presentation of content, such as text, drawings, or images, across a screen or display window. In a typical graphical user interface, scrolling is done with the help of a scrollbar or using keyboard shortcuts, often the arrow keys. Gesturing is a type of user input with two or more input points. Animating operations include changing content within a given time period.

The various types of devices may have a limited display size, user interface, software, API interface and/or processing capability which limits the ease of use of the devices. User interfaces of devices implement APIs in order to provide requested functionality and features. These user interfaces can have difficulty interpreting the various types of user inputs and providing the intended functionality associated with the user inputs.

SUMMARY OF THE DESCRIPTION

At least certain embodiments of the present disclosure include one or more application programming interfaces in an environment with user interface software interacting with a software application. Various function calls or messages are transferred via the application programming interfaces between the user interface software and software applications. Example application programming interfaces transfer function calls to implement scrolling, gesturing, and animating operations for a device.

At least certain embodiments of the present disclosure include an environment with user interface software interacting with a software application. A method for operating through an application programming interface (API) in this environment includes transferring a set bounce call. The method further includes setting at least one of maximum and minimum bounce values. The set bounce call causes a bounce of a scrolled region in an opposite direction of a scroll based on a region past an edge of the scrolled region being visible in a display region at the end of the scroll.

At least certain embodiments of the present disclosure include an environment with user interface software interacting with a software application. A method for operating through an application programming interface (API) in this environment includes transferring a rubberband call. Rubberbanding a scrolled region within a display region occurs by a predetermined maximum displacement when the scrolled region exceeds a display edge. The method further includes transferring an edge rubberband call to set displacement values for at least one edge of the display (e.g., top and bottom edges, left and right edges).

At least certain embodiments of the present disclosure include gesture operations for a display of a device. The gesture operations include performing a scaling transform such as a zoom in or zoom out in response to a user input having two or more input points. The gesture operations also include performing a rotation transform to rotate an image or view in response to a user input having two or more input points.

At least certain embodiments of the present disclosure include a method for performing animations for a display of a device. The method includes starting at least one animation. The method further includes determining the progress of each animation. The method further includes completing each animation based on a single timer. The single timer can be based on a redraw interval of the display hardware.

Various devices which perform one or more of the foregoing methods and machine readable media which, when executed by a processing system, cause the processing system to perform these methods, are also described.

Other methods, devices and machine readable media are also described.

BRIEF DESCRIPTION OF THE DRAWINGS

The disclosure is described by way of example with reference to the accompanying drawings, wherein:

FIGS. 16A and 16B illustrate a display of a device with a view having a first and a second scaling factor;

DETAILED DESCRIPTION

Figure 1:
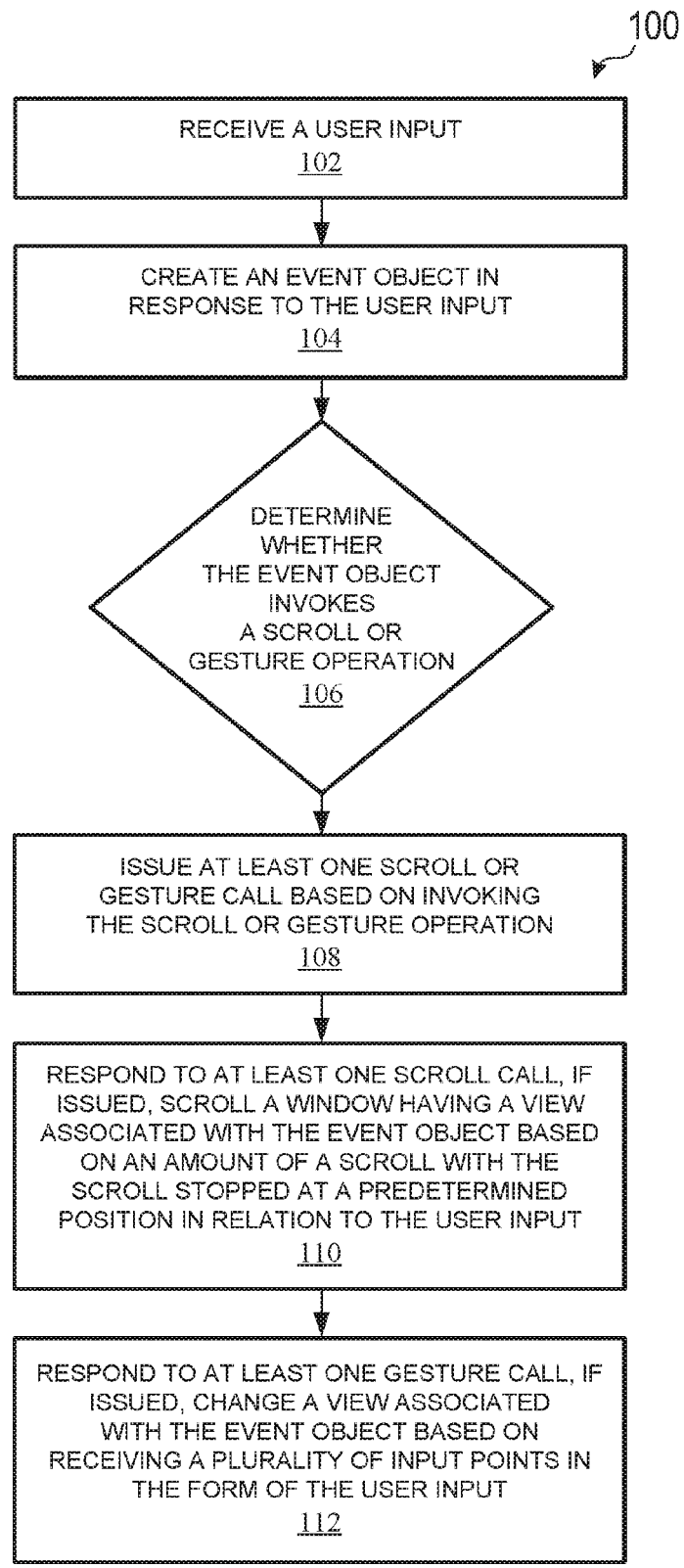
FIG. 1 is flow chart of a method for responding to a user input of a data processing device.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a through understanding of various embodiments of the present disclosure. However, in certain instances, well-known or conventional details are not described in order to provide a concise discussion of embodiments of the present disclosure.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.; etc.

At least certain embodiments of the present disclosure include one or application programming interfaces in an environment with user interface software interacting with a software application. Various function calls or messages are transferred via the application programming interfaces between the user interface software and software applications. Transferring the function calls or messages may include issuing, initiating, invoking or receiving the function calls or messages. Example application programming interfaces transfer function calls to implement scrolling, gesturing, and animating operations for a device having a display region. An API may also implement functions having parameters, variables, or pointers. An API may receive parameters as disclosed or other combinations of parameters. In addition to the APIs disclosed, other APIs individually or in combination can perform similar functionality as the disclosed APIs.

The display region is a form of a window. A window is a display region which may not have a border and may be the entire display region or area of a display. In some embodiments, a display region may have at least one window and/or at least one view (e.g., web, text, or image content). A window may have at least one view. The methods, systems, and apparatuses disclosed can be implemented with display regions, windows, and/or views.

At least certain embodiments of the present disclosure include scrolling operations for scrolling a display of a device. The scrolling operations include bouncing a scrolled region in an opposite direction of a scroll when a scroll completes, rubberbanding a scrolled region by a predetermined maximum displacement when the scrolled region exceeds a display edge, and setting a scrolling angle that locks the scroll in a horizontal or vertical direction.

At least certain embodiments of the present disclosure include gesture operations for a display of a device. The gesture operations include performing a scaling transform such as a zoom in or zoom out in response to a user input having two or more input points. The gesture operations also include performing a rotation transform to rotate an image or view in response to a user input having two or more input points.

At least certain embodiments of the present disclosure include a method for performing animations for a display of a device. The method includes starting at least one animation. The method further includes determining the progress of each animation. The method further includes completing each animation based on a single timer. The single timer can be based on a redraw interval of the display hardware.

At least certain embodiments of the disclosure may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). In some embodiments, the display device and input device are integrated while in other embodiments the display device and input device are separate devices. Examples of a portable media player are described in published U.S. patent application numbers 2003/0095096 and 2004/0224638, both of which are incorporated by reference.

Embodiments of the disclosure described herein may be part of other types of data processing systems, such as, for example, entertainment systems or personal digital assistants (PDAs), or general purpose computer systems, or special purpose computer systems, or an embedded device within another device, or cellular telephones which do not include media players, or multi touch tablet devices, or other multi touch devices, or devices which combine aspects or functions of these devices (e.g., a media player, such as an iPod®, combined with a PDA, an entertainment system, and a cellular telephone in one device). In this disclosure, electronic devices and consumer devices are types of devices.

FIG. 1 is flow chart of a method for responding to a user input of a device. The method 100 includes receiving a user input at block 102. The user input may be in the form of an input key, button, wheel, touch, or other means for interacting with the device. The method 100 further includes creating an event object in response to the user input at block 104. The method 100 further includes determining whether the event object invokes a scroll or gesture operation at block 106. For example, a single touch that drags a distance across a display of the device may be interpreted as a scroll operation. In one embodiment, a two or more finger touch of the display may be interpreted as a gesture operation. In certain embodiments, determining whether the event object invokes a scroll or gesture operation is based on receiving a drag user input for a certain time period. The method 100 further includes issuing at least one scroll or gesture call based on invoking the scroll or gesture operation at block 108. The method 100 further includes responding to at least one scroll call, if issued, by scrolling a window having a view (e.g., web, text, or image content) associated with the event object based on an amount of a scroll with the scroll stopped at a predetermined position in relation to the user input at block 110. For example, an input may end at a certain position on a display of the device. The scrolling may continue until reaching a predetermined position in relation to the last input received from the user. The method 100 further includes responding to at least one gesture call, if issued, by changing a view associated with the event object based on receiving a plurality of input points in the form of the user input at block 112.

In certain embodiments of the present disclosure, scroll operations include attaching scroll indicators to a content edge of a display. Alternatively, the scroll indicators can be attached to the display edge. In some embodiments, user input in the form of a mouse/finger down causes the scroll indicators to be displayed on the display edge, content edge, or window edge of the scrolled region. If a mouse/finger up is then detected, the scroll indicators are faded out from the display region, content edge, or window edge of the scrolled region.

In certain embodiments of the present disclosure, gesture operations include responding to at least one gesture call, if issued, by rotating a view associated with the event object based on receiving a plurality of input points in the form of the user input. Gesture operations may also include scaling a view associated with the event object by zooming in or zooming out based on receiving the user input.

In some embodiments, a device includes a display region having multiple views or windows. Each window may have a multiple views including superviews and subviews. It is necessary to determine which window, view, superview, or subview is contacted by a user input in the form of a mouse up, mouse down, or drag, etc. An API can set various modes for making this determination. In one embodiment, a pass always mode sends mouse down, mouse up, and drag inputs to the nearest subview. In another embodiment, an intercept on drag mode sends a drag input to the superview while mouse up and down inputs are sent to the subview. In another embodiment, an intercept always mode sends all drag, mouse up and down inputs to the superview. The superview may be scroller software operating as a subclass of a view software. The subview may be view software operating as a subclass of the user interface software.

Figure 2:
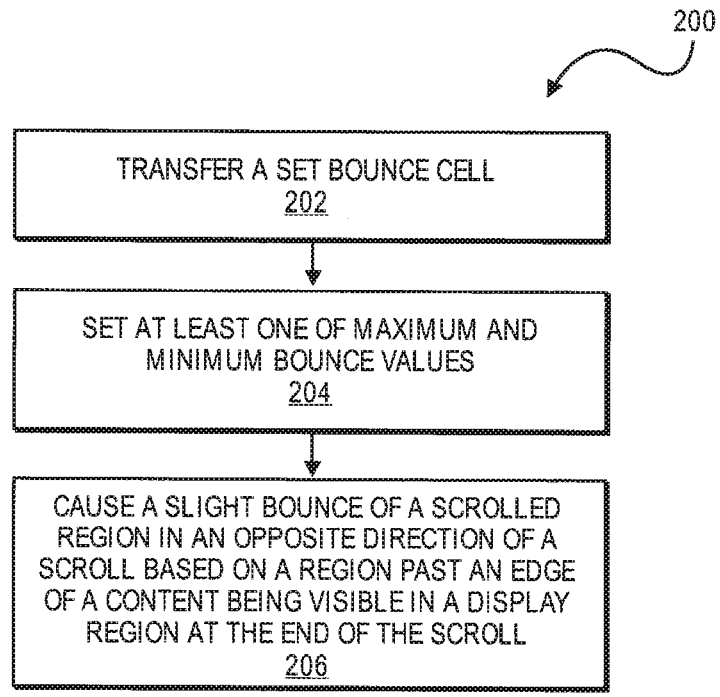
FIG. 2 illustrates details of an application programming interface in flow chart form according to certain teachings of the present disclosure.

FIG. 2 illustrates details of an application programming interface in flow chart form according to certain teachings of the present disclosure. The application programming interface operates in an environment with user interface software interacting with a software application in order to provide a bounce operation. The method 200 for providing a bounce operation includes transferring a set bounce call at block 202. The method 200 further includes setting at least one of maximum and minimum bounce values at block 204. The minimum and maximum bounce values may be associated with at least one edge of a window that has received a user input. The method 200 further includes causing a bounce of a scrolled region in an opposite direction of a scroll based on a region past the scrolled region being visible in a display region at the end of the scroll at block 206. The scrolled region may be a content region.

In certain embodiments of the present disclosure, transferring the set bounce call is either one of issuing, initiating, invoking or receiving the set bounce call.

Figure 3:
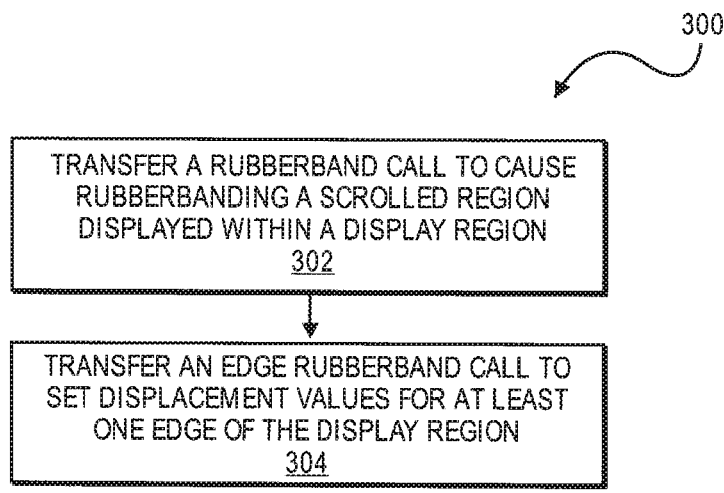
FIG. 3 illustrates details of an application programming interface in flow chart form according to certain teachings of the present disclosure.

FIG. 3 illustrates details of an application programming interface in flow chart form according to certain teachings of the present disclosure. The application programming interface operates in an environment with user interface software interacting with a software application in order to provide a rubberband operation. The method 300 for providing a rubberband operation includes transferring a rubberband call to cause rubberbanding a scrolled region displayed within a display at block 302. The method 300 further includes transferring an edge rubberband call to set displacement values for at least one edge of the display at block 304. In some embodiments, the displacement values are set for top and bottom edges, left and right edges, or all edges.

Rubberbanding a scrolled region according to the method 300 occurs by a predetermined maximum displacement value when the scrolled region exceeds a display edge of a display of a device based on the scroll. If a user scrolls content of the display making a region past the edge of the content visible in the display, then the displacement value limits the maximum amount for the region outside the content. At the end of the scroll, the content slides back making the region outside of the content no longer visible on the display.

In certain embodiments of the present disclosure, transferring the rubberband call is either one of issuing, initiating, invoking or receiving the rubberband call.

Figure 4:
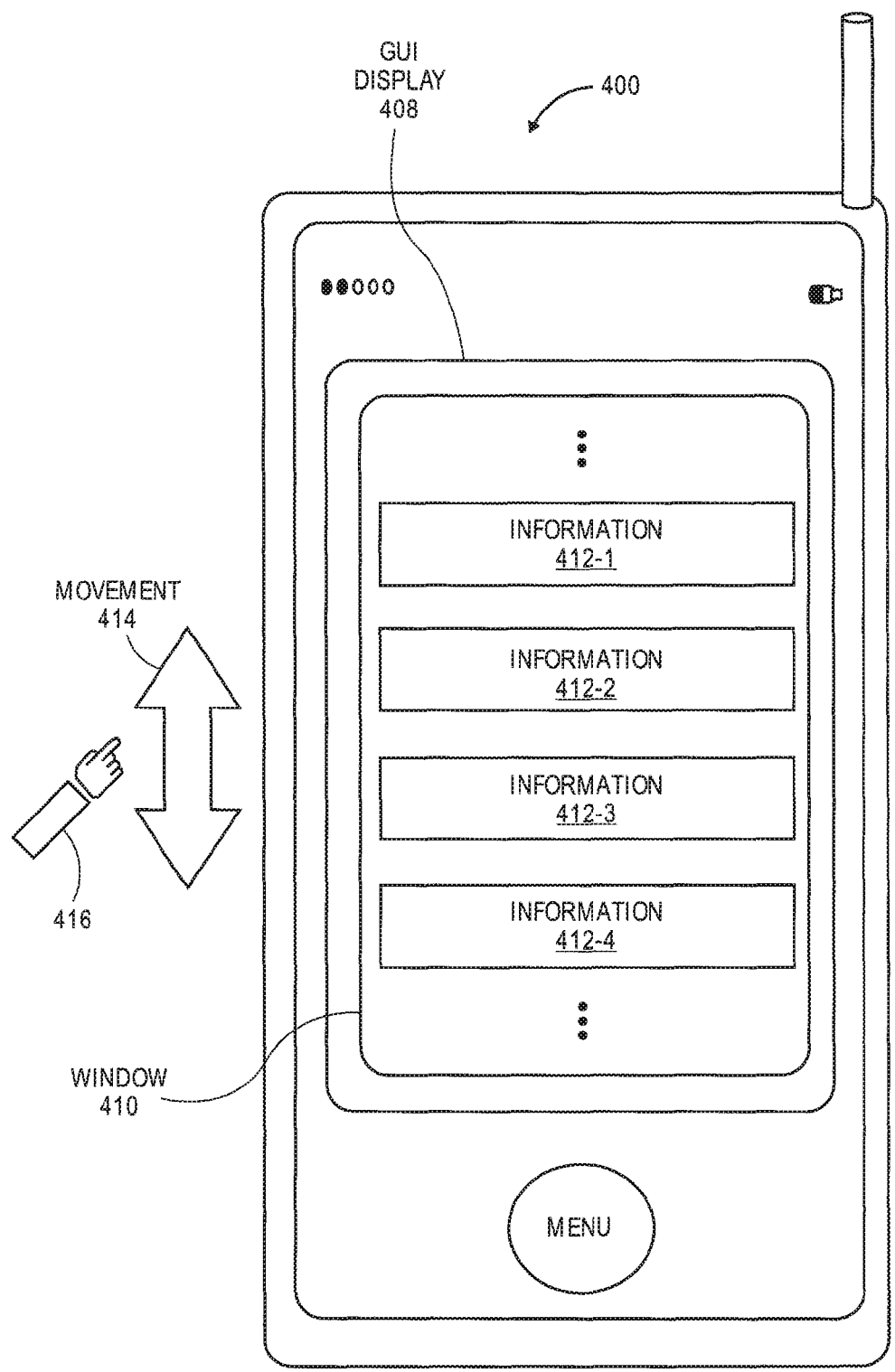
FIG. 4 is a schematic diagram illustrating an embodiment of user interface of a portable electronic device 400 having a touch-sensitive display 408.

FIG. 4 is a schematic diagram illustrating an embodiment of user interface of a portable electronic device 400 having a touch-sensitive display 408. The display 408 may include a window 410. The window 410 may include one or more displayed objects, such as information objects 412-1 to 412-4. In an exemplary embodiment, the information objects 412 may correspond to contact information for one or more individuals in a list of items. The displayed objects may be moved in response to detecting or determining movement 414 of a point of contact with the display, such as that associated with one or more digits 416 of a user (which are not drawn to scale in FIG. 4). In some embodiments, movement of the displayed objects may be accelerated in response to detecting or determining accelerated movement of the point of contact. While embodiment 400 includes one window 410, in other embodiments there may be two or more display windows. In addition, while embodiment 400 illustrates movement 414 in a particular direction, in other embodiments movement of the displayed objects may be in response to movement 414 in one or more other directions, or in response to a scalar (i.e., a determined or detected movement independent of the direction).

Figure 5A:
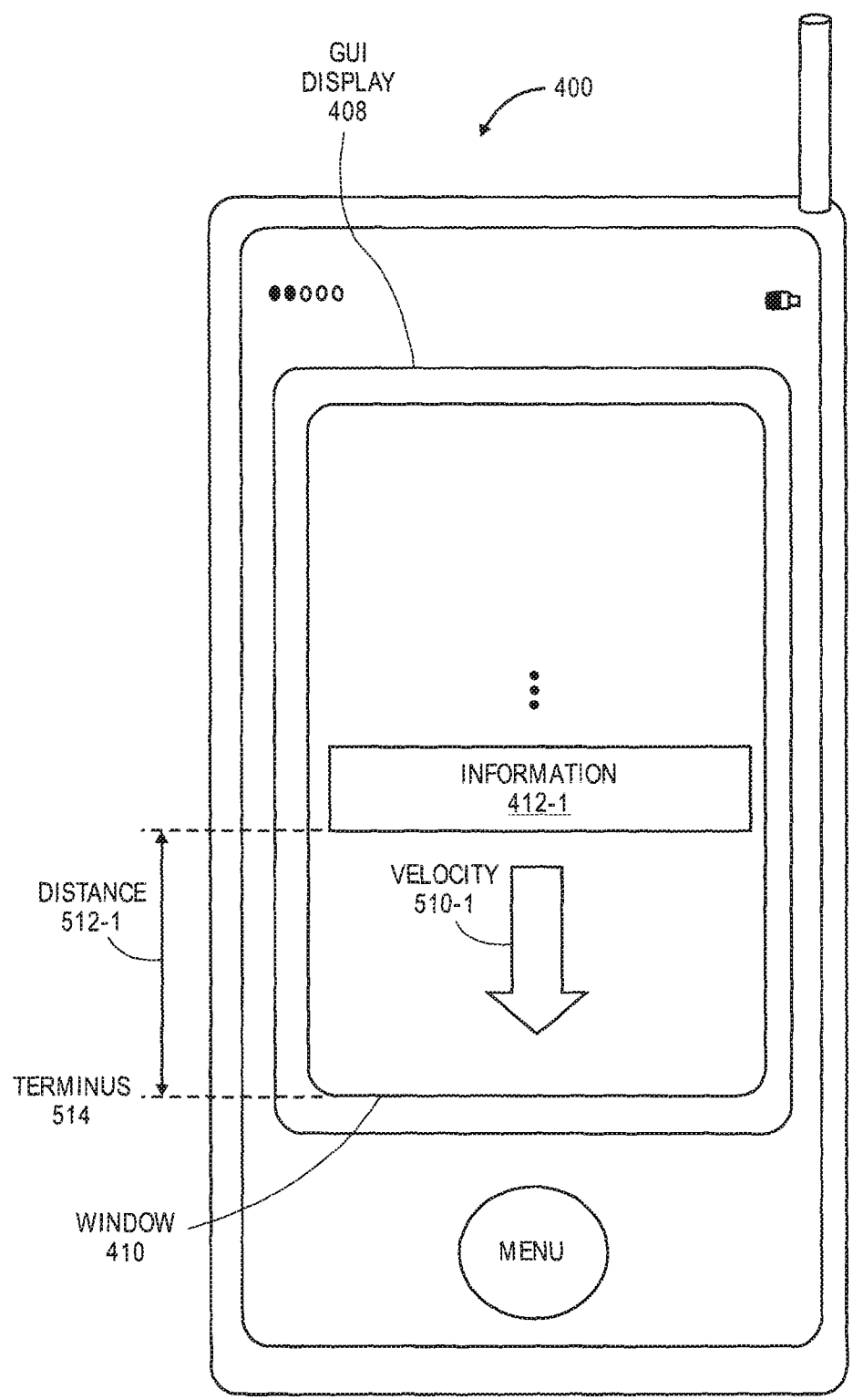
FIG. 5A-5C illustrate at least some embodiments of user interface of a portable electronic device 400 having a touch-sensitive display.
Figure 5B:
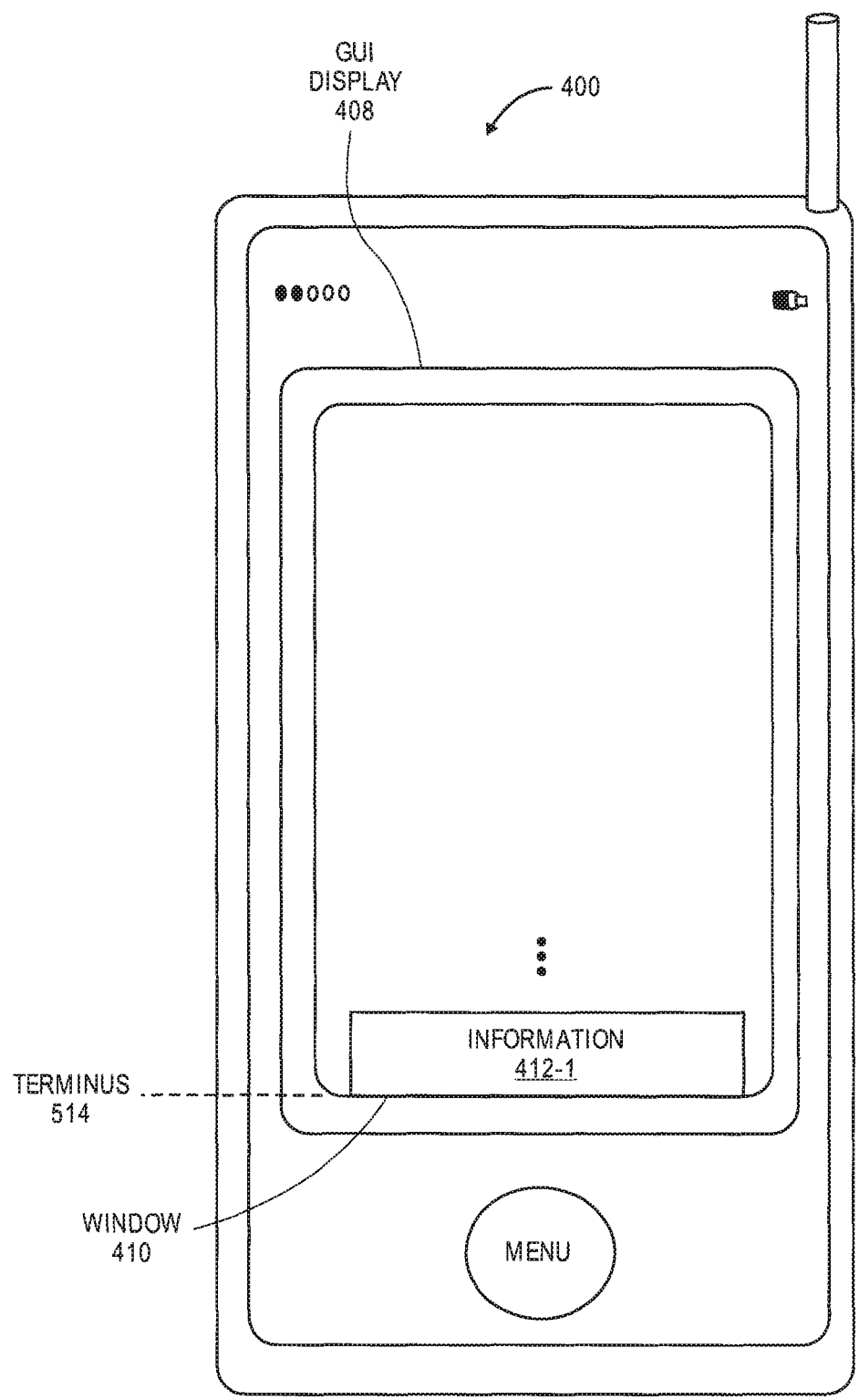
Figure 5C:
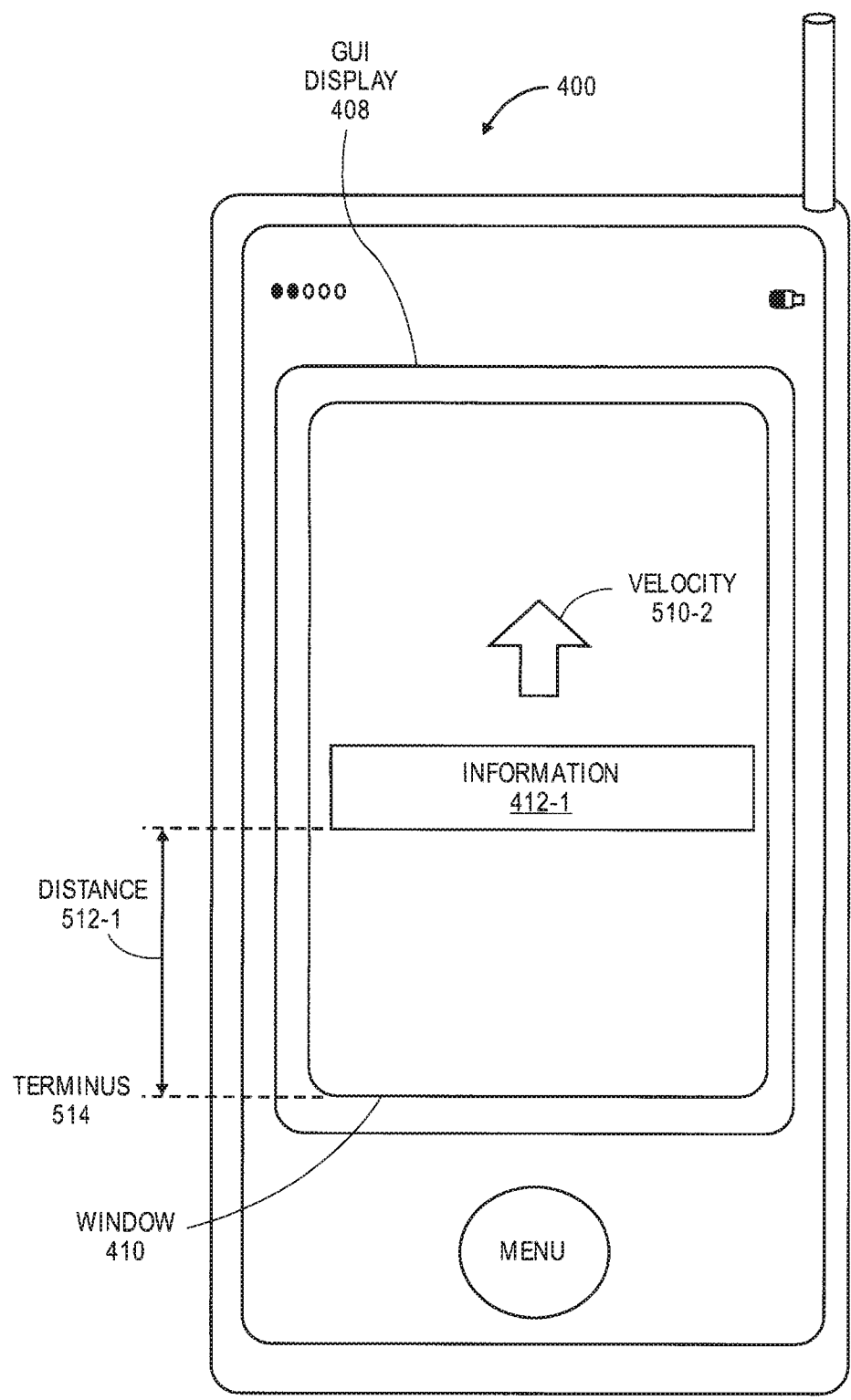

FIGS. 5A-5C illustrate the scrolling of a list of items on a device to a terminus of the list, at which point one or more displayed items at the end of the list smoothly bounce off the end of the display, reverse direction, and then optionally come to a stop. FIG. 5A is a schematic diagram illustrating an embodiment of user interface of a portable electronic device 400 having a touch-sensitive display. One or more displayed objects, such as information object 412-1 may be a distance 512-1 from a terminus 514 of the list of items which is an edge of a scrolled region and may be moving with a velocity 510-1 while the list is being scrolled. Note that the terminus 514 is a virtual boundary associated with the displayed objects, as opposed to a physical boundary associated with the window 410 and/or the display 408. As illustrated in FIG. 5B, when the one or more displayed objects, such as the information object 412-1, reach or intersect with the terminus 514, the movement corresponding to the scrolling may stop, i.e., the scrolling velocity may be zero at an instant in time. As illustrated in FIG. 5C, the one or more displayed objects, such as the information 412-1, may subsequently reverse direction. At a time after the intersection with the terminus 514, the information object 412-1 may have velocity 510-2 and may be a distance 512-2 from the terminus 514. In some embodiments, the magnitude of velocity 510-2 may be less than the magnitude of velocity 510-1 when the distance 512-2 equals the distance 512-1, i.e., the motion of the one or more displayed objects is damped after the scrolling list reaches and "bounces" at its terminus.

In at least some embodiments of the present disclosure, the method 200 performs the bounce operations described in FIGS. 5A-5C. The bounce call transferred at block 202 determines whether a bounce operation is enabled. The maximum and minimum bounces values determine the amount of bouncing of the scrolled region in an opposite direction of the scroll.

FIGS. 6A-6D illustrate the scrolling of a list of items to a terminus of the list, at which point an area beyond the terminus is displayed and the list is then scrolled in an opposite direction until the area beyond the terminus is no longer displayed, in accordance with some embodiments. The rubberband operation of method 300 is illustrated in the example of FIGS. 6A-6D with the listed items being email messages. FIGS. 6A-6D illustrate an exemplary user interface 3500A for managing an inbox in accordance with some embodiments. An analogous user interface may be used to display and manage other mailboxes (e.g., drafts, sent, trash, personal, etc.). In addition, other types of lists are possible, including but not limited to lists of instant message conversations, favorite phone numbers, contact information, labels, email folders, email addresses, physical addresses, ringtones, or album names.

Figure 6A:
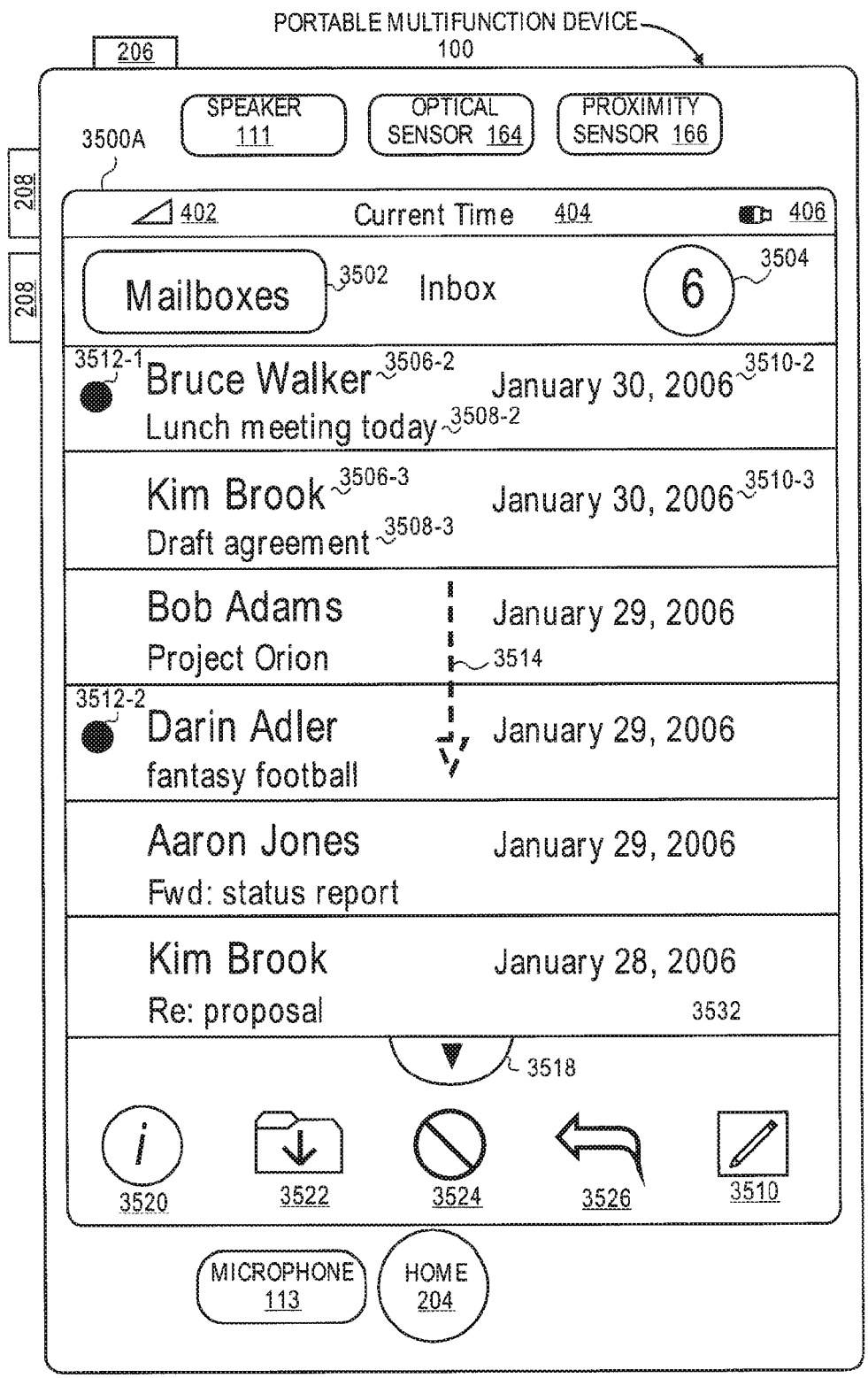
FIG. 6A-6D illustrate the scrolling of a list of items to a terminus of the list, at which point an area beyond the terminus is displayed and the list is then scrolled in an opposite direction until the area beyond the terminus is no longer displayed, in accordance with some embodiments.

If the list of emails fills more than the allotted screen area, the user may scroll through the emails using vertically upward and/or vertically downward swipe gestures on the touch screen. In the example of FIG. 6A, a portion of a list of emails is displayed in the screen area, including a top displayed email 3530 from Bruce Walker and a bottom displayed email 3532 from Kim Brook. A user performs a vertically downward swipe gesture 3514 to scroll toward the top of the list. The vertically downward gesture 3514 need not be exactly vertical; a substantially vertical gesture is sufficient. In some embodiments, a gesture within a predetermined angle of being perfectly vertical results in vertical scrolling.

Figure 6B:
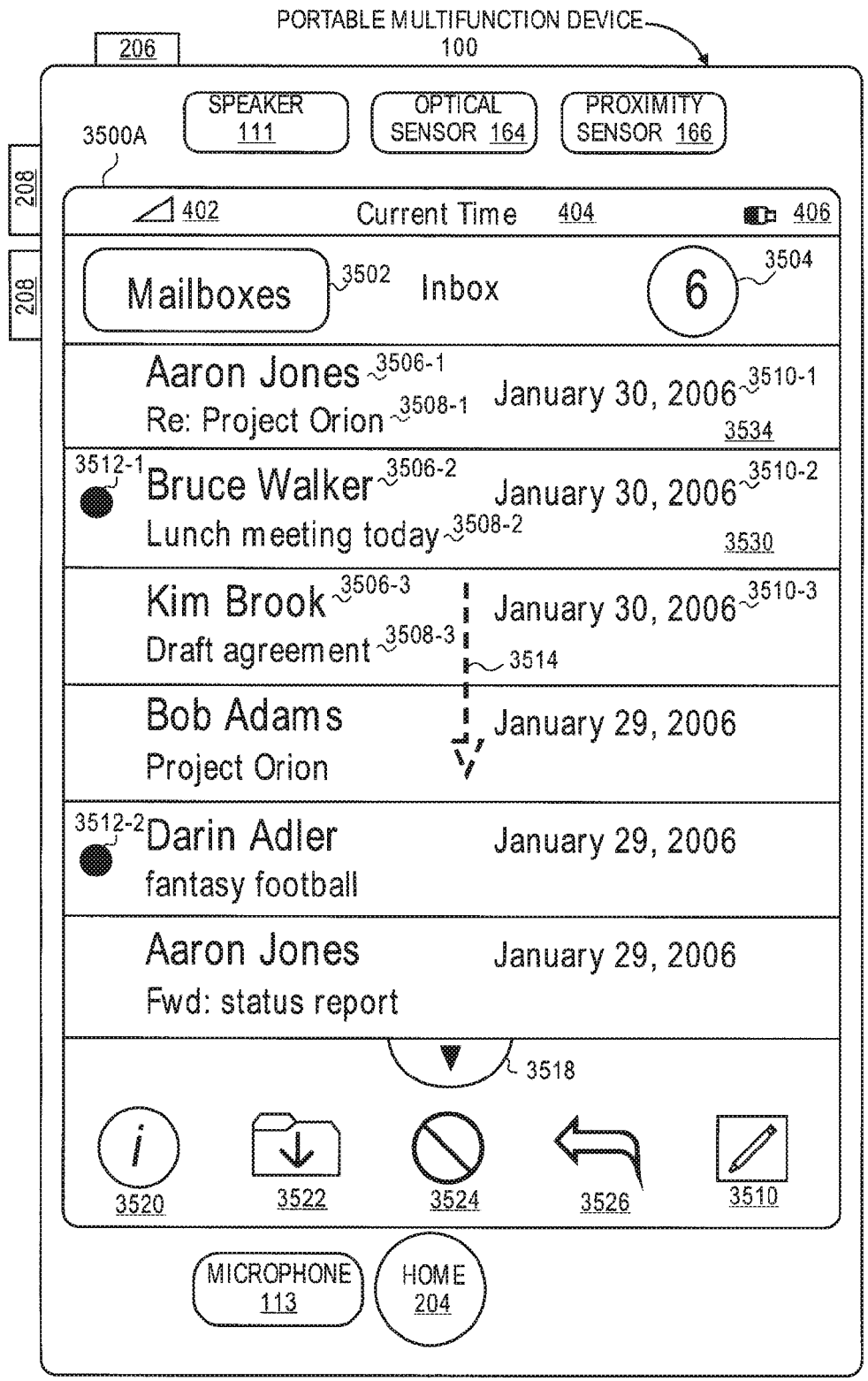

As a result of detecting the vertically downward gesture 3514, in FIG. 6B the displayed emails have shifted down, such that the previous bottom displayed email 3532 from Kim Brook is no longer displayed, the previous top displayed email 3530 from Bruce Walker is now second from the top, and the email 3534 from Aaron Jones, which was not displayed in FIG. 6A, is now displayed at the top of the list.

Figure 6C:
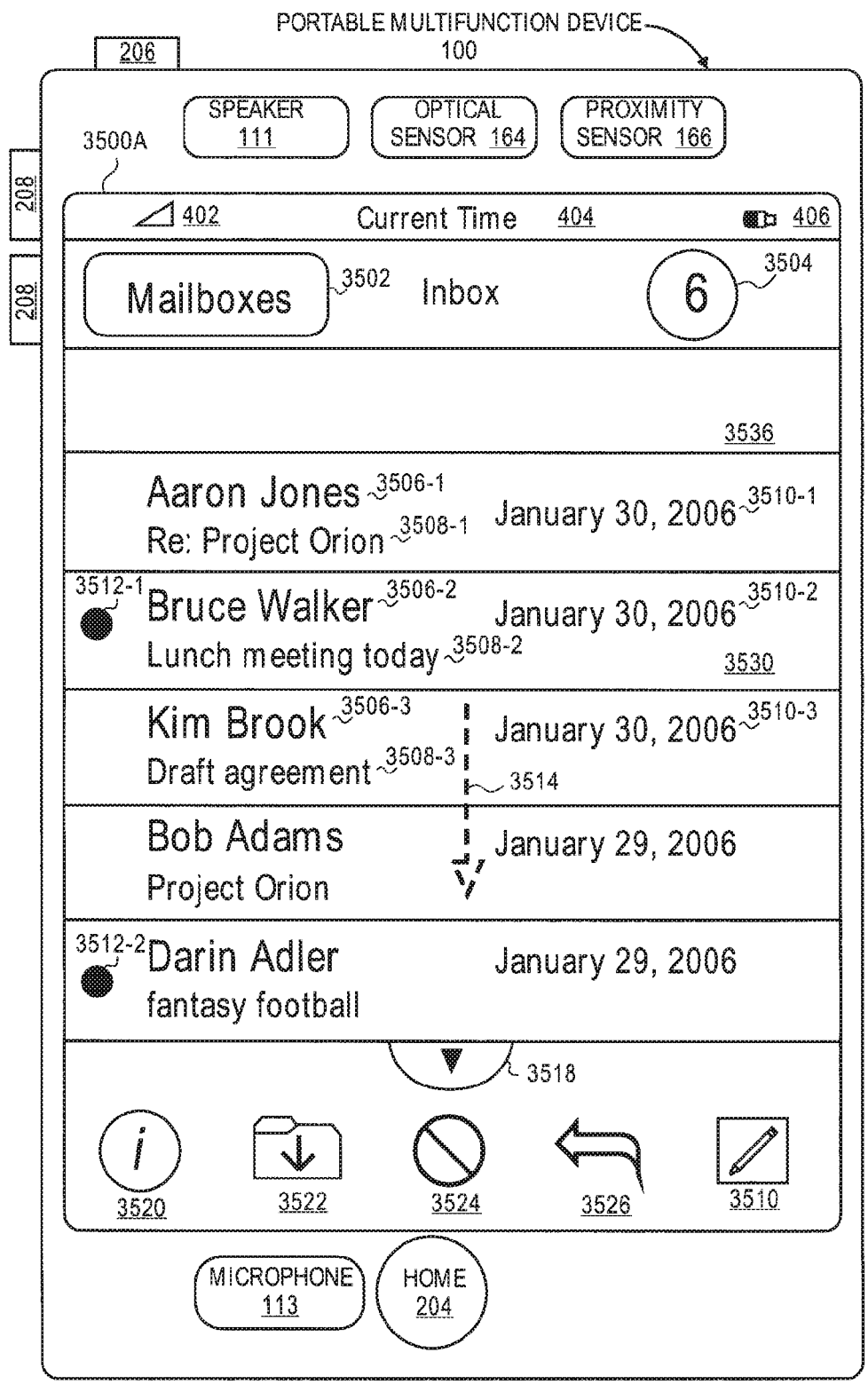

In this example, the email 3534 from Aaron Jones is the first email in the list and thus is the terminus of the list. Upon reaching this email 3534, in response to continued detection of the vertically downward gesture 3514, an area 3536 (FIG. 6C) above the first email 3534 (i.e., beyond the terminus of the list) is displayed. In some embodiments, the area displayed beyond the terminus of the list is visually indistinct from the background of the list. In FIG. 6C, both the area 3536 and the background of the emails (e.g., emails 3534 and 3530) are white and thus are visually indistinct.

Figure 6D:
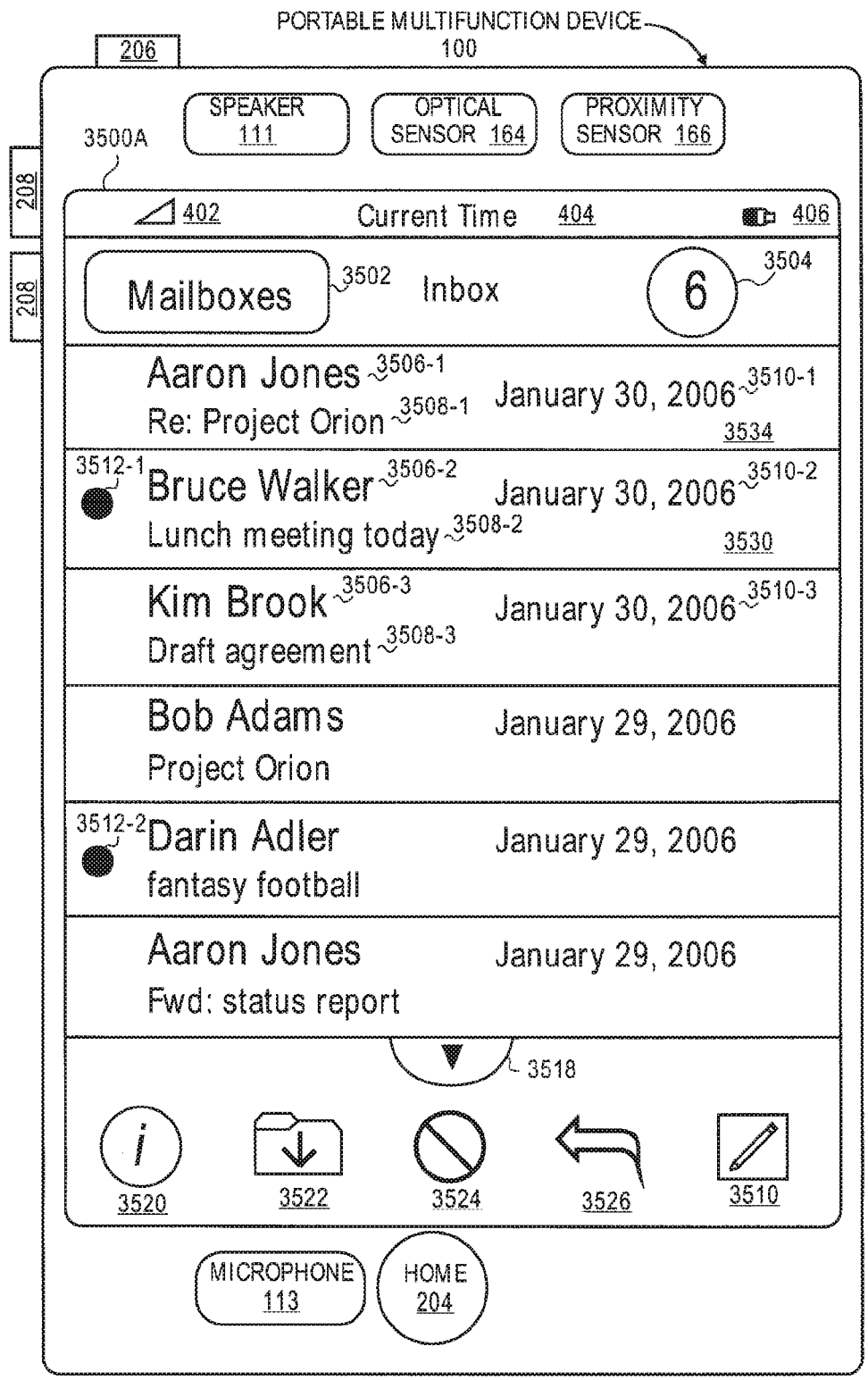

Once vertically downward gesture 3514 is complete, such that a corresponding object is no longer detected on or near the touch screen display, the list is scrolled in an opposite direction until the area 3536 is no longer displayed. FIG. 6D illustrates the result of this scrolling in the opposite direction, the email 3534 from Aaron Jones is now displayed at the top of the screen area allotted to the list and the area 3536 is not displayed.

In the example of FIGS. 6A-6D, a vertically downward gesture resulted in display of an area beyond the first item in the list. As described in FIG. 3, the values for the predetermined maximum displacement (e.g., display of an area beyond the first item in the list) are set at block 304 for top and bottom edges or at block 306 for all edges of the window.

Similarly, a vertically upward gesture may result in display of an area beyond the last item of the list, if the vertically upward gesture continues once the list has been scrolled to the last item. The last item may be considered a terminus of the list, similar to the first item. As discussed above, the gesture need not be exactly vertical to result in vertical scrolling; a gesture within a predefined range of angles from perfectly vertical is sufficient.

Figure 7:
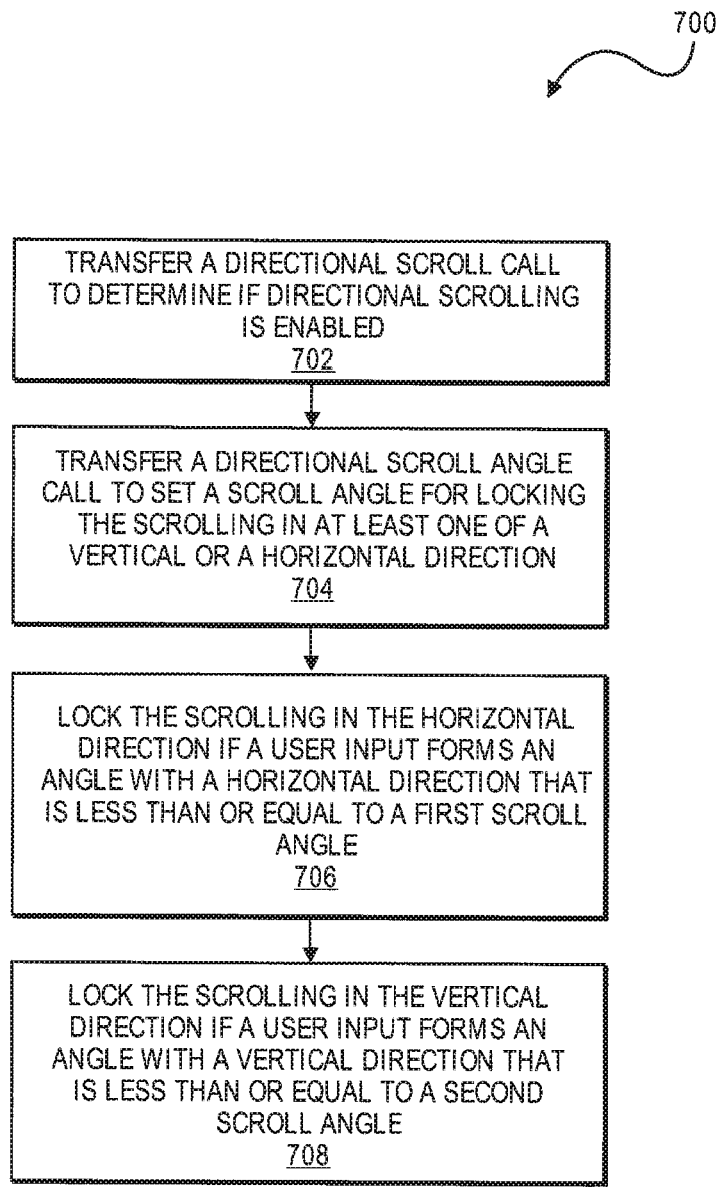
FIG. 7 illustrates details of an application programming interface in flow chart form according to certain teachings of the present disclosure.

FIG. 7 illustrates details of an application programming interface in flow chart form according to certain teachings of the present disclosure. The application programming interface operates in an environment with user interface software interacting with a software application in order to provide a directional scrolling operation. The method 700 for operating through an application programming interface (API) includes transferring a directional scroll angle call to determine if directional scrolling is enabled at block 702. The method 700 further includes transferring a directional scroll angle call to set a scroll angle for locking the scrolling in at least one of a vertical or a horizontal direction at block 704. The method 700 further includes locking the scrolling in the horizontal direction if a user input forms an angle with a horizontal direction that is less than or equal to a first scroll angle at block 706. The method 700 further includes locking the scrolling in the vertical direction if a user input forms an angle with the vertical direction that is less than or equal to a second scroll angle at block 708.

In certain embodiments, a user input in the form of a drag forms an angle with the horizontal direction that is less than the first scroll angle. In this case, the user presumably intends to scroll in the horizontal direction. The scrolling will be locked in the horizontal direction until the user input exceeds the first scroll angle. A second scroll angle may be used for locking the user input in the vertical direction. The second scroll angle may be set equal to the first scroll angle.

Figure 8:
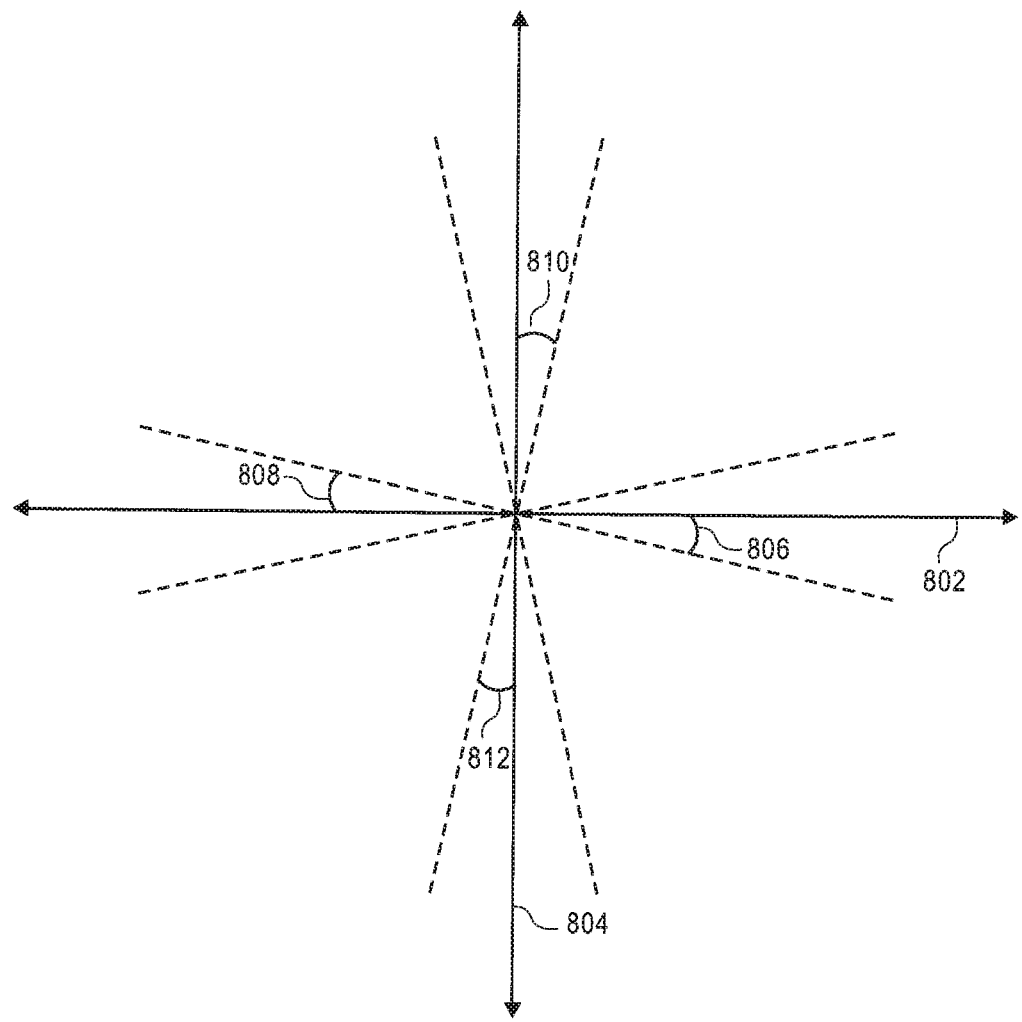
FIG. 8 illustrates first and second scroll angles for locking a scroll of a display of a device in a horizontal or vertical direction according to certain teachings of the present disclosure.

FIG. 8 illustrates first and second scroll angles for locking a scroll of a display of a device in a horizontal or vertical direction. The horizontal direction 802 and vertical direction 804 are in reference to a window or a display of a device. As discussed in the method 700, a user input such as a drag movement forming an angle with the horizontal direction 802 less than or equal to the first scrolling angle 806 or 808 will lock the user input in the horizontal direction. In a similar manner, a user input forming an angle with the vertical direction 810 less than or equal to the second scrolling angle 810 or 812 will lock the user input in the vertical direction. The first and second scrolling angles may be set at the same angle or at different angles as well. For example, the first and second scrolling angles may be set at 25 degrees. A user input less than or equal to 25 degrees with respect to the horizontal or vertical direction will lock the scrolling in the appropriate direction.

In some embodiments, the horizontal and vertical locking angles can be determined in part by the aspect of the content. For example, content in the form of a tall page may receive a larger vertical locking angle compared to the horizontal locking angle.

Figure 9:
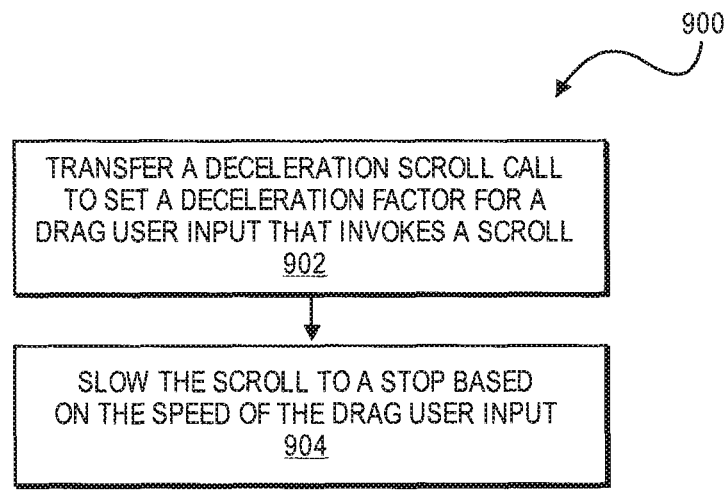
FIG. 9 illustrates details of an application programming interface in flow chart form according to certain teachings of the present disclosure.

FIG. 9 illustrates details of an application programming interface in flow chart form according to certain teachings of the present disclosure. The application programming interface operates in an environment with user interface software interacting with a software application in order to provide a deceleration scroll operation. The method 900 for providing the deceleration scroll operation includes transferring a deceleration scroll call to set a deceleration factor for a drag user input at block 902. The method 900 further includes slowing the scroll to a stop based on the speed of the drag user input and the deceleration factor at block 904.

In certain embodiments, a user input in the form of a drag invokes a scroll operation for a certain time period. The user input has a certain speed. The scroll of the scrolled region of a window or a display region of a display of a device will be stopped after the user input stops by applying a deceleration factor to the speed of the user input during the drag movement.

Figure 10:
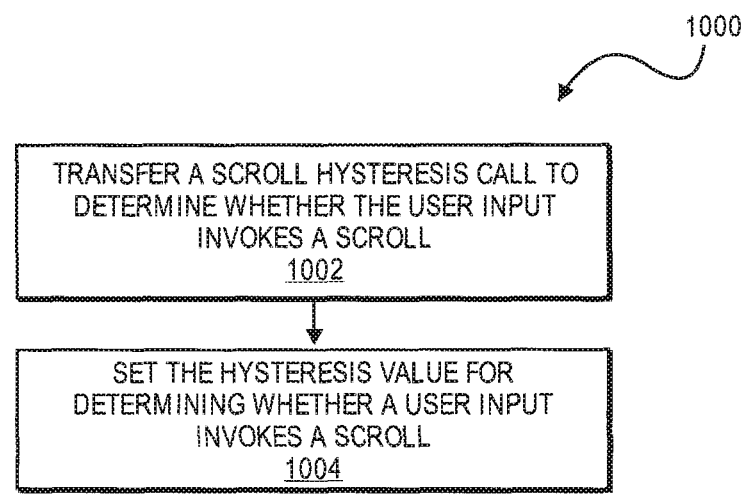
FIG. 10 illustrates details of an application programming interface in flow chart form according to certain teachings of the present disclosure.

FIG. 10 illustrates details of an application programming interface in flow chart form according to certain teachings of the present disclosure. The application programming interface operates in an environment with user interface software interacting with a software application in order to provide a scroll hysteresis operation. The method 1000 for providing the scroll hysteresis operation includes transferring a scroll hysteresis call to determine whether a user input invokes a scroll at block 1002. The method 1000 further includes setting a hysteresis value for determining whether a user input invokes a scroll at block 1004.

In certain embodiments, a user input in the form of a drag over a certain distance across a display or window within a display of a device invokes a scroll operation. The hysteresis value determines the certain distance which the user input must drag across the display or window prior to invoking a scroll operation. A user input that does not drag the certain predetermined distance will not invoke a scroll operation and may be considered a mouse up or down input or other type of input.

Figure 11:
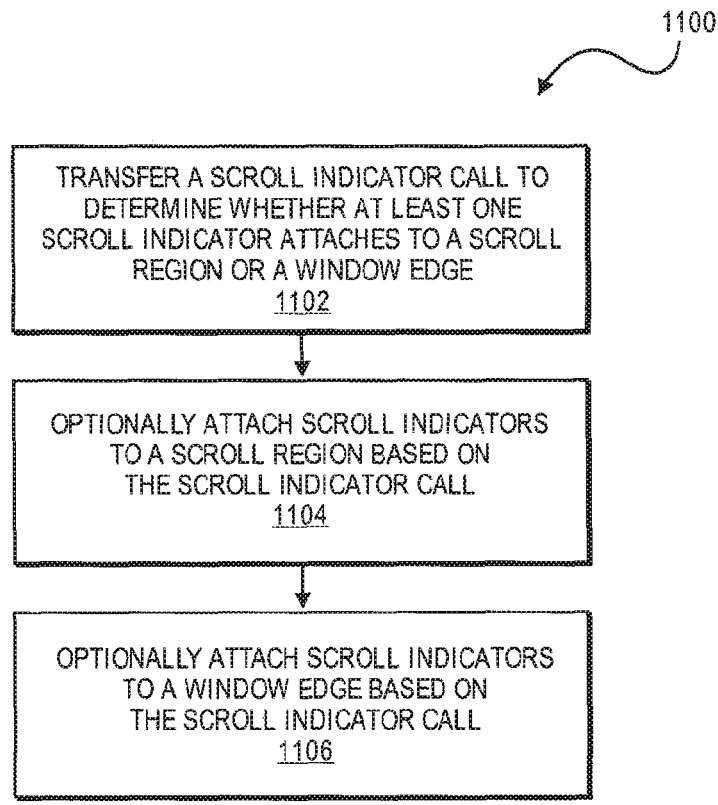
FIG. 11 illustrates details of an application programming interface in flow chart form according to certain teachings of the present disclosure.

FIG. 11 illustrates details of an application programming interface in flow chart form according to certain teachings of the present disclosure. The application programming interface operates in an environment with user interface software interacting with a software application in order to attach a scroll indicator to a scroll region edge or a window edge of a device. In some embodiments, the scroll region edge is associated with a content edge. The window or display edge may be associated with the edge of a display region. The method 1100 for providing the scroll indicator includes transferring a scroll indicator call to determine whether at least one scroll indicator attaches to an edge of a scroll region or a window edge at block 1102. A scroll indicator may be displayed on any display edge, window edge or scroll region edge. The method 1100 further includes optionally attaching at least one scroll indicator to the edge of the scroll region based on the scroll indicator call at block 1104. Alternatively, the method 1100 further includes optionally attaching at least one scroll indicator to the window edge of the view based on the scroll indicator call at block 1106.

In some embodiments, the operations of method 1100 can be altered, modified, combined, or deleted. For example, block 1104 can be deleted. Likewise, block 1106 can be deleted from the method 1100. Alternatively, the order of block 1104 and block 1106 can be switched. Other methods having various operations that have been disclosed within the present disclosure can also be altered, modified, rearranged, collapsed, combined, or deleted.

In certain embodiments of the present disclosure, transferring the scroll indicator call is either one of issuing, initiating, invoking or receiving the scroll indicator call. For example, the user interface software (e.g., software kit or library) may receive the scroll indicator call from the software application.

Figure 12:
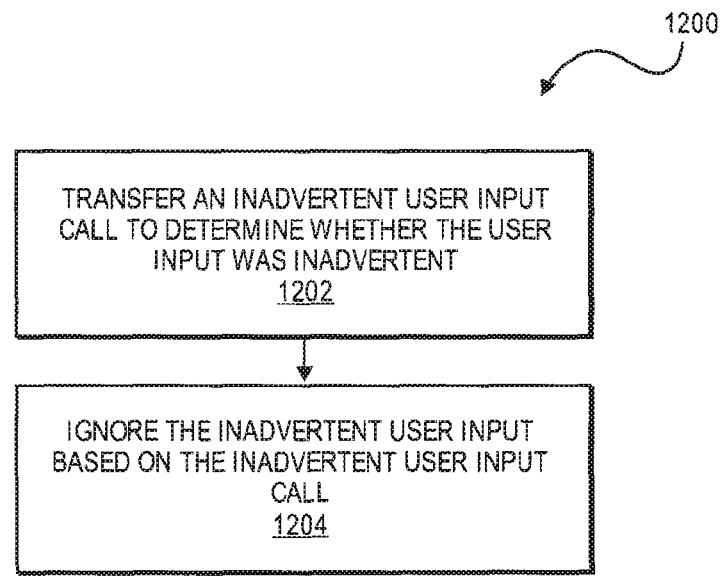
FIG. 12 illustrates details of an application programming interface in flow chart form according to certain teachings of the present disclosure.

FIG. 12 illustrates details of an application programming interface in flow chart form according to certain teachings of the present disclosure. The application programming interface operates in an environment with user interface software interacting with a software application in order to determine if an inadvertent user input contacts a view of a display of a device. The method 1200 includes transferring an inadvertent user input call to determine whether the user input was inadvertent at block 1202. The method 1200 further includes ignoring the inadvertent user input based on the determination of the inadvertent user input call at block 1204. In one embodiment, the inadvertent user input call comprises a thumb detection call to determine whether the user input was an inadvertent thumb.

In certain embodiments of the present disclosure, transferring the inadvertent user input call is either one of issuing, initiating, invoking or receiving the inadvertent user input call.

A gesture API provides an interface between an application and user software in order to handle gesturing. Gesturing may include scaling, rotating, or other changes to a view, window, or display. A mask may merely permit certain changes while limiting or not permitting other changes. Events of all kinds come into the application via a graphics framework. They are enqueued, collected if necessary and dispatched. If the events are system level events (e.g., application should suspend, device orientation has changed, etc) they are routed to the application having an instance of a class of the user interface software. If the events are hand events based on a user input, the events are routed to the window they occurred over. The window then routes these events to the appropriate control by calling the instance's mouse and gesture methods. The control that receives a mouse down or mouse entered function will continue to get all future calls until the hand is lifted. If a second finger is detected, the gesture methods or functions are invoked. These functions may include start, change, and end gesture calls. The control that receives start gesture call will be sent all future change gesture calls until the gesture ends.

Figure 13:
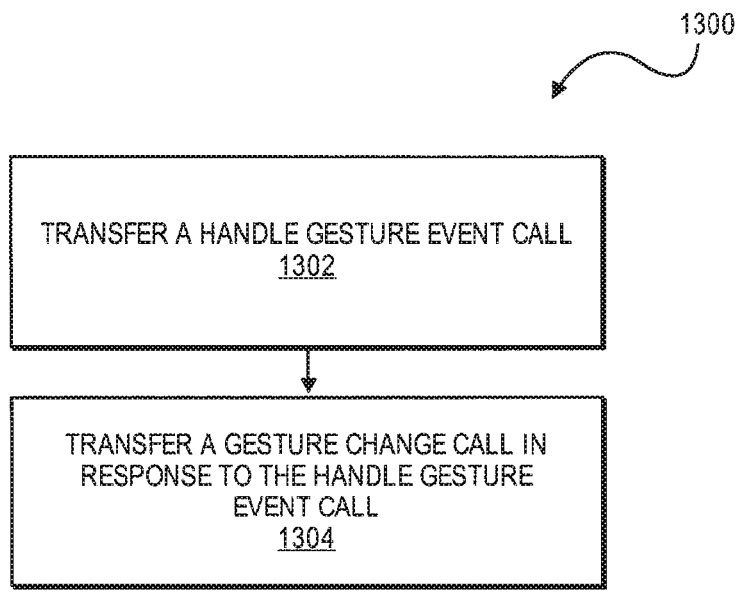
FIG. 13 illustrates details of an application programming interface in flow chart form according to certain teachings of the present disclosure.

FIG. 13 illustrates details of an application programming interface in flow chart form according to certain teachings of the present disclosure. The application programming interface operates in an environment with user interface software interacting with a software application in order to provide a gesture operation. The method 1300 for providing the gesture operation includes transferring a handle gesture event call at block 1302. The method 1300 further includes transferring a gesture change call in response to the handle gesture event call at block 1304.

In certain embodiments, a user input in the form of two or more points is received by a display of a device. A multi-touch driver of the device receives the user input and packages the event into an event object. A window server receives the event object and determines whether the event object is a gesture event object. If the window server determines that a gesture event object has been received, then user interface software issues or transfers the handle gesture call at block 1302 to a software application associated with the view. The software application confirms that a gesture event has been received and passes the handle gesture call to a library of the user interface software. The window server also associates the gesture event object with the view that received the user input. The library responds by transferring a gesture change call in response to the handle gesture event call at block 1304.

In one embodiment, a window or view associated with the user input receives the change call in order to perform the gesture event. The user software that provides the view receives a gesture start event call, a gesture changed event call, a zoom to scale setting for the view, and a gesture end call. The gesture calls receive an input of a gesture event which may be base event having a type such as a hand event, keyboard event, system event, etc. A delegate associated with the application receives a start gesture call, gesture did change call, and gesture did finish call. The user software is dynamically linking into the application during the run time of the gesture process.

In some embodiments, the gesture changed function call contains the following information about the gesture:
the number of fingers currently down;
the number of fingers initially down;
the rotation of the hand;
the scale of the hand;
the translation of the hand;
the position of the inner and outermost fingers; and
the pressure of the first finger.
In other embodiments, more information about each finger down may be included as follows.
the stage of the finger (just touch down, fully pressed, lifting off, etc);
the position of the finger;
the proximity of the finger (how hard you're touching);
the orientation of the finger (what angle the ovoid is at);
the length of the major and minor axis;
the velocity of the finger; and
the eccentricity of the finger's ovoid.

A gesture event object may be a chord event object having a chord count (e.g., number of fingers contacted the view or display), a chord start event, a chord change event, and a chord end event. A chord change event may include a scaling or rotation transform.

Figure 14:
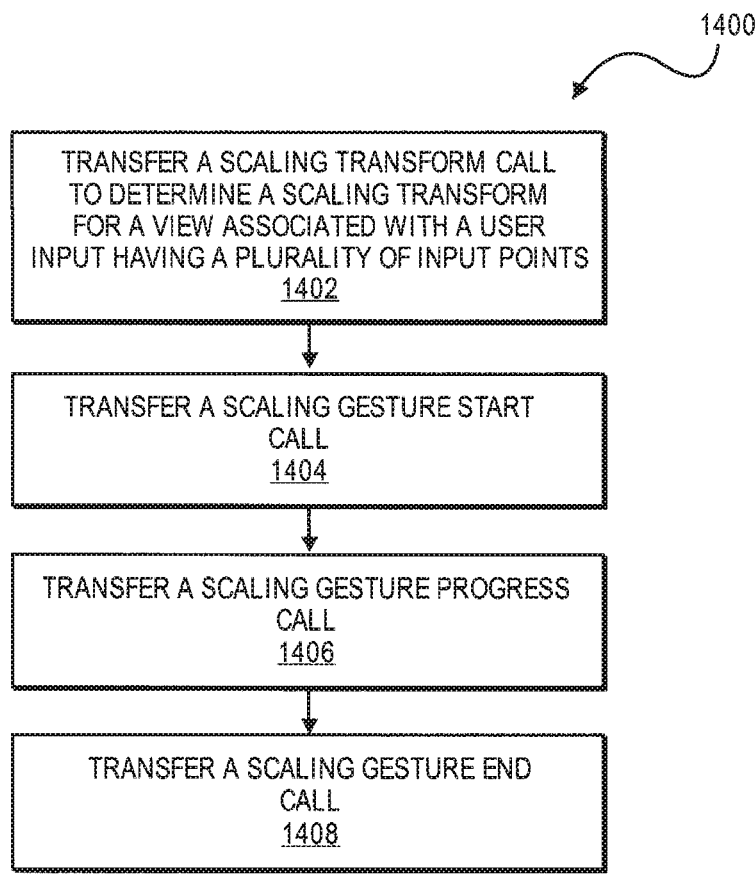
FIG. 14 illustrates details of an application programming interface in flow chart form according to certain teachings of the present disclosure.

FIG. 14 illustrates details of an application programming interface in flow chart form according to certain teachings of the present disclosure. The application programming interface operates in an environment with user interface software interacting with a software application in order to provide a scaling transform of a display region, window, or view of a display of a device. The method 1400 for providing the scaling transform includes transferring a scaling transform call to determine a scaling transform for a view associated with a user input having a plurality of input points at block 1402. The method 1400 further includes transferring a scaling gesture start call at block 1404. The method 1400 further includes transferring a scaling gesture progress call at block 1406. The method 1200 further includes transferring a scaling gesture end call at block 1408.

Figure 15:
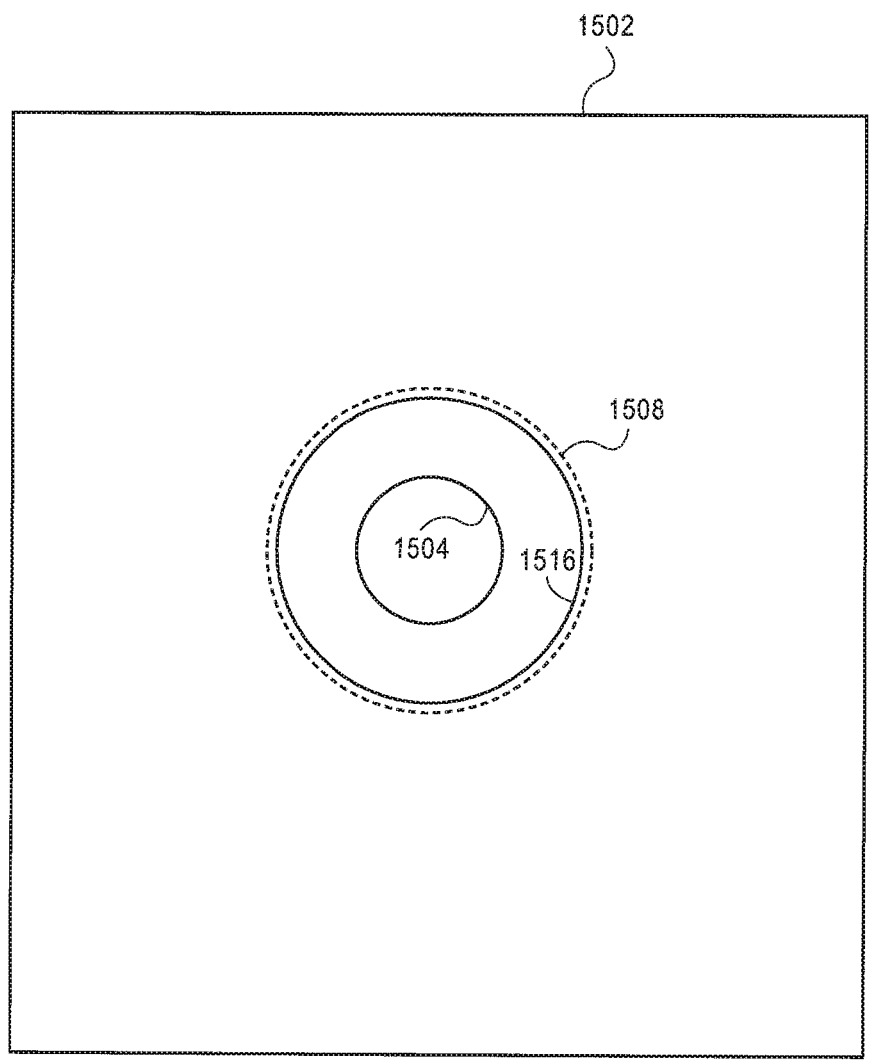
FIG. 15 illustrates a display of a device having a scaling transform of a view.

In certain embodiments, a user input in the form of two or more input points (e.g., fingers) moves together or apart to invoke a gesture event that performs a scaling transform on the view associated with the user input. A scale transform includes a minimum and maximum scale factor. FIG. 15 illustrates a display 1502 of a device having a scaling transform of a view. The view 1504 (e.g., web, text, or image content) has a first scale factor. A user input e.g., two fingers moving apart) associated with the view 1504 is interpreted as a gesture event to zoom out from view 1504 to view 1508 having a second scale factor that exceeds the maximum scale factor of the view 1516. A snapback flag determines whether the zoom out can proceed past the maximum scale factor to view 1508 prior to snapping back to the maximum scale factor associated with view 1516.

FIG. 16A illustrates a display 1604 of a device having a first scaling factor of a view 1616. A user input (e.g., two fingers 1608 and 1610 moving together) associated with the view 1614 is interpreted as a gesture event to zoom in from view 1614 to view 1664 having a second scale factor as illustrated in FIG. 16B. The dashed regions 1602 and 1650 represent the total area of the content with the only content being displayed in the display area 1604 and 1652. In performing the scaling transform from FIG. 16A to FIG. 16B, the center of the gesture event, center 1612 for FIG. 16A and center 1660 for FIG. 16B, remains in the same position with respect to the display 1604. The scroll indicator 1606 shrinks to become scroll indicator 1654 during the transform to indicate that a smaller portion of the total content 1650 is being displayed on display 1604 as a result of the zoom in operation. The dashed region 1650 is larger than the dashed region 1602 to represent that a larger portion of content is not being displayed on display 1652 in FIG. 16B as a result of the zoom in operation.

Figure 16C:
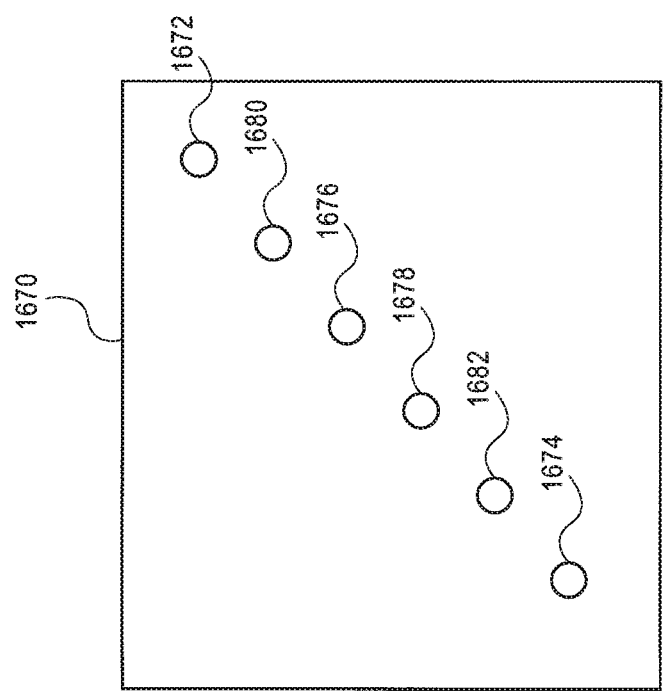
FIG. 16C illustrates changing a view from a scale factor of 2× to a scale factor of 1× in at least some embodiments of the present disclosure.

In at least some embodiments of the present disclosure, a user desires to change a view 1670 from a scale factor of 2× to a scale factor of 1× as illustrated in FIG. 16C. A first set of user inputs 1672 and 1674 that move to the second set of user inputs 1676 and 1678 will decrease the scale factor from 2× to 1×. It may be desirable for the user to scale from 2× to 1× without having to move the user inputs a large distance across the view 1670. In an environment with user interface software interacting with a software application, a gesture scaling transform flag may be set in order to determine a scaling transform for a view associated with a user input having a plurality of input points. The scaling transform flag scales either from a current scale factor to a minimum scale factor or from the current scale factor to a maximum scale factor. For example, a flag may be set at the position associated with a 1.5× scale factor and a third set of user inputs 1680 and 1682. A user desiring to change the scale factor from 2× to 1× would only have to move his fingers, the user inputs, from the first set 1672 and 1674 to the third set 1680 and 1682 if the gesture scaling transform flag has been set at a scale factor of 1.5×.

Figure 17:
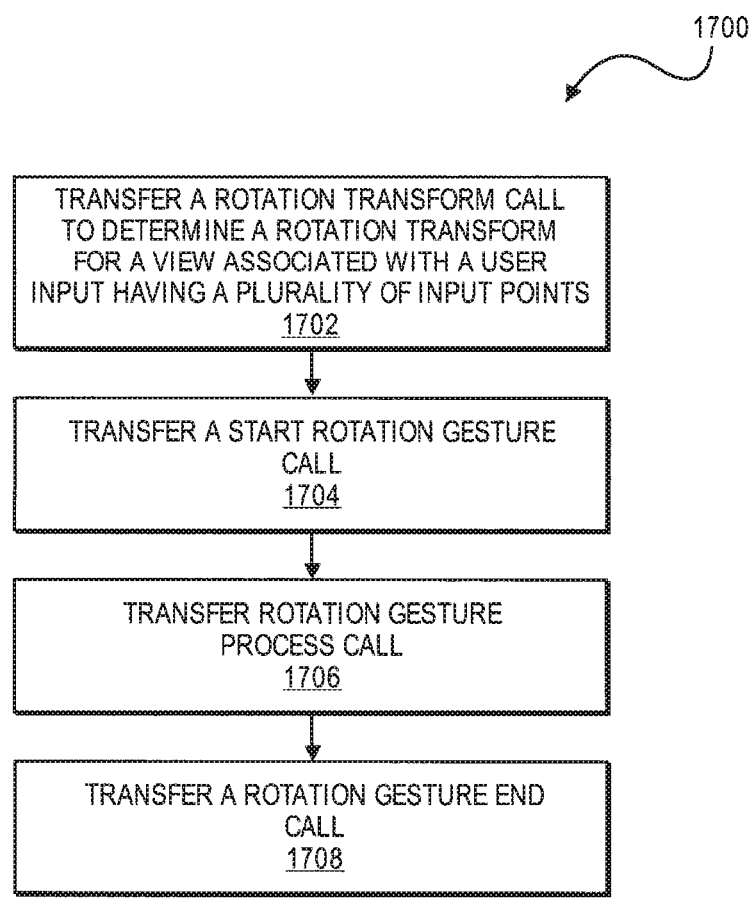
FIG. 17 illustrates details of an application programming interface in flow chart form according to certain teachings of the present disclosure.

FIG. 17 illustrates details of an application programming interface in flow chart form according to certain teachings of the present disclosure. The application programming interface operates in an environment with user interface software interacting with a software application in order to provide a rotation transform of a view, window, or display region of a display of a device. The method 1700 for providing the rotation transform includes transferring a rotation transform call to determine a rotation transform for a view associated with a user input having a plurality of input points at block 1702. The method 1700 further includes transferring a rotation gesture start call at block 1704. The method 1700 further includes transferring a scaling gesture progress call at block 1706. The method 1700 further includes transferring a scaling gesture end call at block 1708.

In certain embodiments, a user input in the form of two or more input points rotates to invoke a gesture event that performs a rotation transform on the view associated with the user input. The rotation transform includes a minimum and maximum degree of rotation for associated minimum and maximum rotation views. The user input may temporarily rotate a view past a maximum degree of rotation prior to the view snapping back to the maximum degree of rotation.

Figure 18:
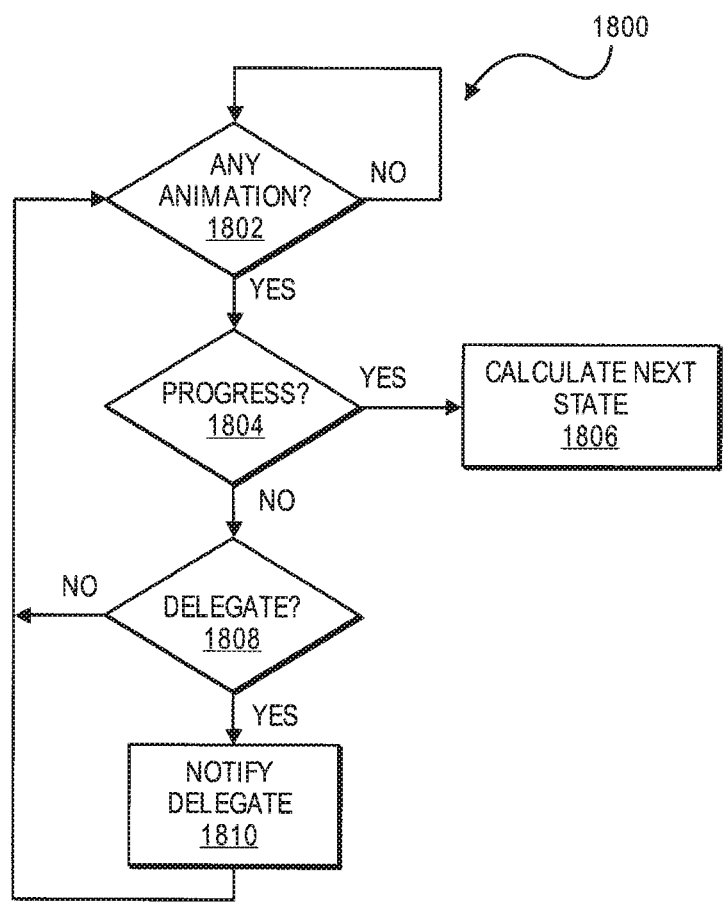
FIG. 18 illustrates details of an application programming interface in flow chart form according to certain teachings of the present disclosure.

FIG. 18 illustrates details of an application programming interface in flow chart form according to certain teachings of the present disclosure. The application programming interface operates in an environment with user interface software interacting with a software application in order to notify a delegate of at least one animation associated with a display region, window, or view of a display of a device. A delay in the animation may be specified by the API. Also, multiple animations may be assigned priority by the API. The method 1800 for notifying the delegate includes determining whether any animation occurs at block 1802. The method 1800 further includes checking the progress of an animation at block 1804. If progress has occurred, then the next state (e.g., position, opacity, or transform) of the animation can be calculated at block 1806. If progress has completed at block 1806, then at block 1808 it is determined whether the view associated with the completed animation is associated with a delegate. If so, a delegate call is transferred to notify the delegate of the animation for the view at block 1810. The delegate operating under the control of the software application can change other views in response to the view being modified by the animation.

In certain embodiments, software invokes an animation that performs a scaling transform on the view associated with the user input. A display may include numerous views. The view being increased in size by the scaling transform may obstruct other views in which case the other views may need to be reduced in size. Alternatively, the view being decreased in size by the scaling transform may create additional area for other views to increase in size.

Figure 19:
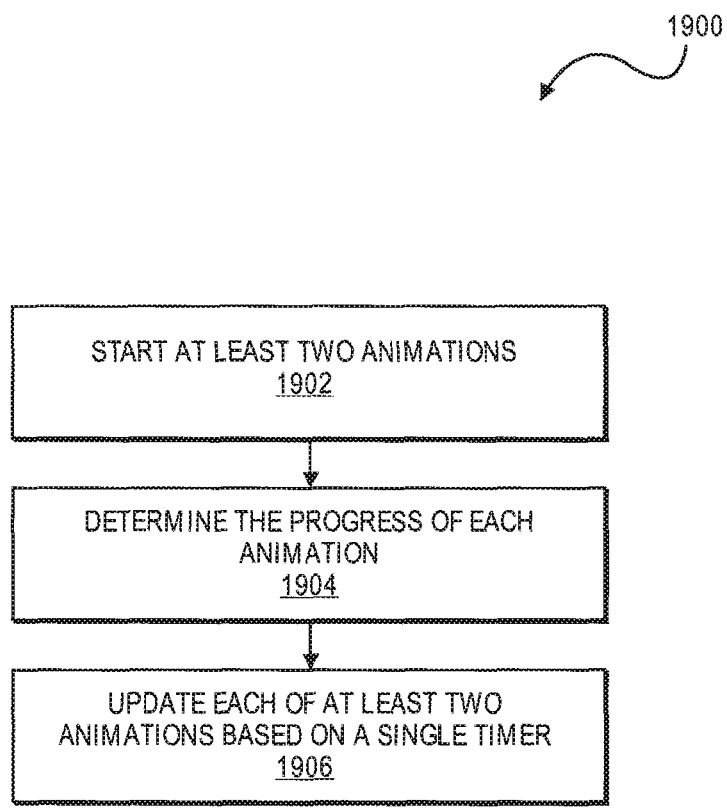
FIG. 19 is flow chart of a method for animating views displayed on a display of a device.

FIG. 19 is flow chart of a method for animating a display region, windows, or views displayed on a display of a device. The method 1900 includes starting at least two animations at block 1902. The method 1900 further includes determining the progress of each animation at block 1904. The method 1900 further includes completing each animation based on a single timer at block 1906.

In certain embodiments of the present disclosure, the single timer includes a timer based on a redraw interval which is a time period between the display of a current frame and a next frame of the display of the device. In this case, changes in animation are updated to the display during the redraw interval in order to display the changes during the next frame of the display. The progress of each animation may be calculated periodically or based upon a progress call.

The method 1900 may further include determining whether each animation is associated with a delegate. The delegate is then notified of the animation. Other views not associated with an animation may be changed depending on the software application controlling the delegate.

Figure 20:
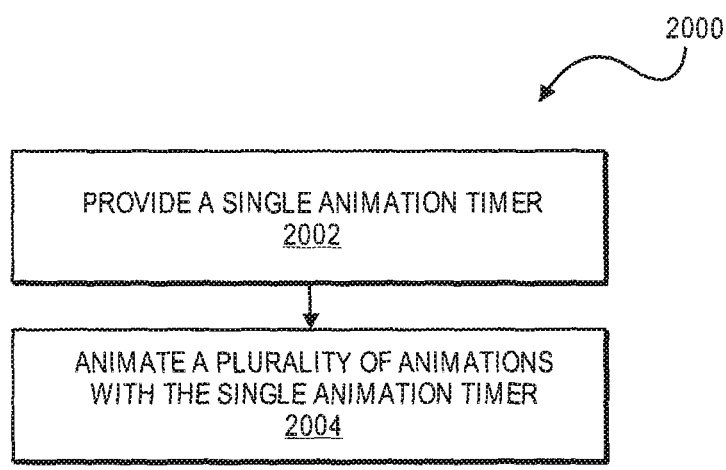
FIG. 20 is flow chart of a method for animating views displayed on a display of a device.

FIG. 20 is flow chart of a method for animating a display region, windows, or views displayed on a display of a device. The method 2000 includes providing a single animation timer at block 2002. The method 2000 further includes animating a plurality of animations with the single animation timer at block 2004. For example, a single timer may control all animations which occur simultaneously. The animations may include a transform, a frame, and an opacity animation. A animation transform may include a scaling or rotation transform. A frame animation may include resizing of a frame. An opacity animation changes the opacity from opaque to transparent or vice versa.

Figure 21:
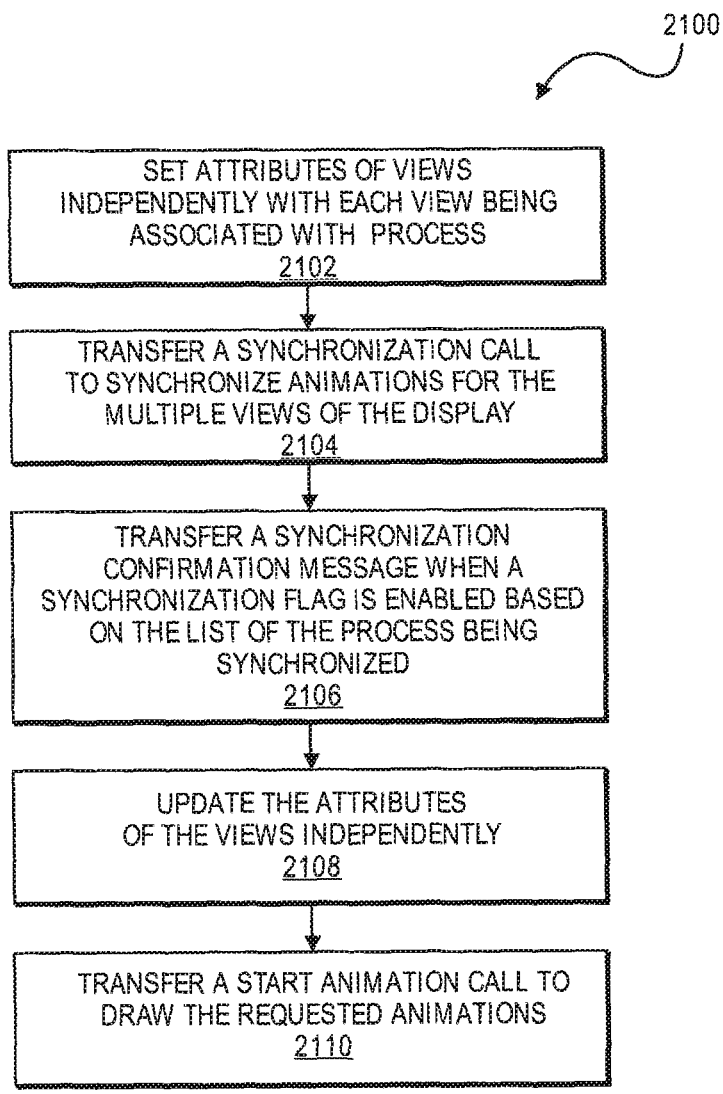
FIG. 21 illustrates details of an application programming interface in flow chart form according to certain teachings of the present disclosure.

FIG. 21 illustrates details of an application programming interface in flow chart form according to certain teachings of the present disclosure. The application programming interface operates in an environment with user interface software interacting with multiple software applications or processes in order to synchronize animations associated with multiple views or windows of a display of a device. The method 2100 for synchronizing the animations includes setting attributes of views independently with each view being associated with a process at block 2102. For example, an attribute or property of a view may include a position, size, opacity, etc. An animation alters one or more attributes from a first state to a second state. The method 2100 further includes transferring a synchronization call to synchronize animations for the multiple views of the display at block 2104. The synchronization call may include input parameters or arguments such as an identification of the synchronization of the processes and a list of the processes that are requesting animation of the multiple views. In one embodiment, the synchronization call includes the identification and the number of processes that are requesting animation. In one embodiment, each application or process sends a synchronization call at different times. The method 2100 further includes transferring a synchronization confirmation message when a synchronization flag is enabled at block 2106. The synchronization flag can be enabled when the processes to be synchronized have each sent messages to a window server operating the user interface software. The method 2100 further includes updating the attributes of the views from a first state to a second state independently at block 2108. In one embodiment, the window server receives the updated attributes from each process at different times. The method 2100 further includes transferring a start animation call to draw the requested animations when both processes have updated attributes associated with the second state at block 2110.

In some embodiments, a first data structure or layer tree represents a hierarchy of layers that correspond to the views or windows of the processes. A second data structure or render tree represents a similar copy of the layer tree. However, the render tree is not updated until the independent processes have completed their separate animations. At this time, the render tree updates and redraws the screen with the new animations.

Figure 22A:
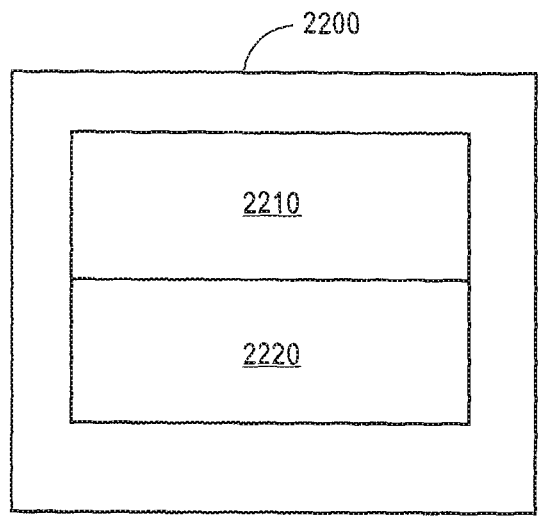
FIGS. 22A and 22B illustrate synchronizing the resizing of windows of a display of a device.
Figure 22B:
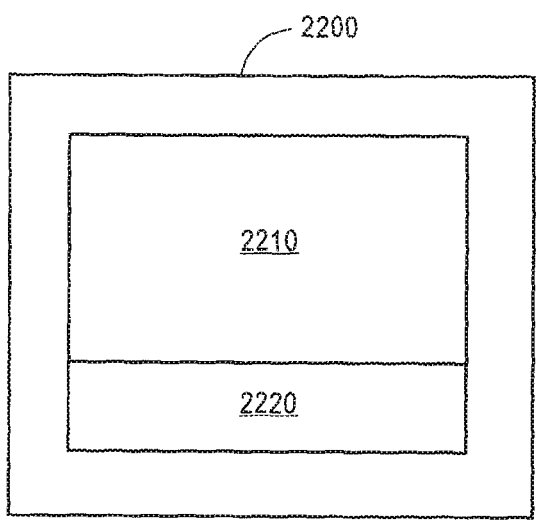

FIGS. 22A and 22B illustrate synchronizing the resizing of views or windows of a display of a device. For example, a window 2210 associated with a first process with a size attribute may increase in size by changing from a first state, window 2210 in FIG. 22A, to a second state, window 2210 in FIG. 22B. At approximately the same time, a second window 2220 may decrease in size in proportion to the increase in size of the first window 2210. The method 2100 provides synchronization of the resizing of the windows 2210 and 2220 illustrated in FIGS. 22A and 22B. The animations in changing from the first state to the second state may occur incrementally and occur with the synchronization of method 2100.

Figure 23:
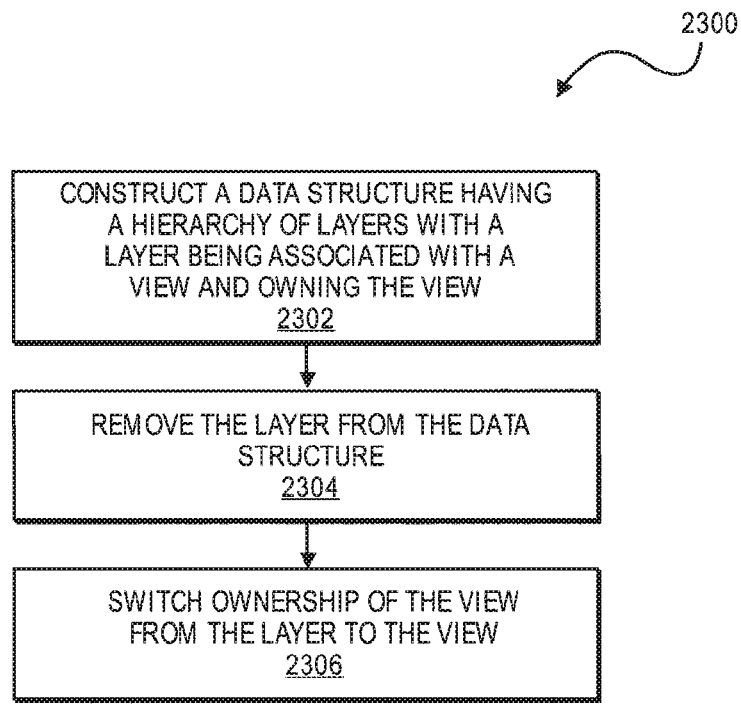
FIG. 23 illustrates a method for switching ownership of a view of an application displayed on a display of a data processing device.

FIG. 23 illustrates a method for switching ownership of a view of an application displayed on a display of a data processing device. The method 2300 includes constructing a data structure having a hierarchy of layers with a layer being associated with a view and owning the view at block 2302. The layers may be content, windows, video, images, text, media, or any other type of object for user interface of the application. The method 2300 further includes removing the layer from the data structure at block 2304. The method 2300 further includes switching ownership of the view from the layer to the view at block 2306.

In some embodiments, each layer from the data structure is associated with a view. The layer associated with the view sends a delegate function call to the view in order to generate content provided by the view. A first pointer reference points from the layer to the view. A second pointer reference points from the view to the layer. The number of references pointing to an object such as the view is defined as the retained count of the object. The view may receive notification that the layer will be removed from the data structure. Removing the layer from the data structure may occur based on the view associated with the layer being removed from the display of the device. When the layer is removed from the data structure or layer tree the pointer from the layer to the view will be removed. The view will have a retained count of zero and be deallocated or removed from memory if the ownership of the view is not reversed. The view will have a retained count of at least one if ownership is reversed.

Figure 24:
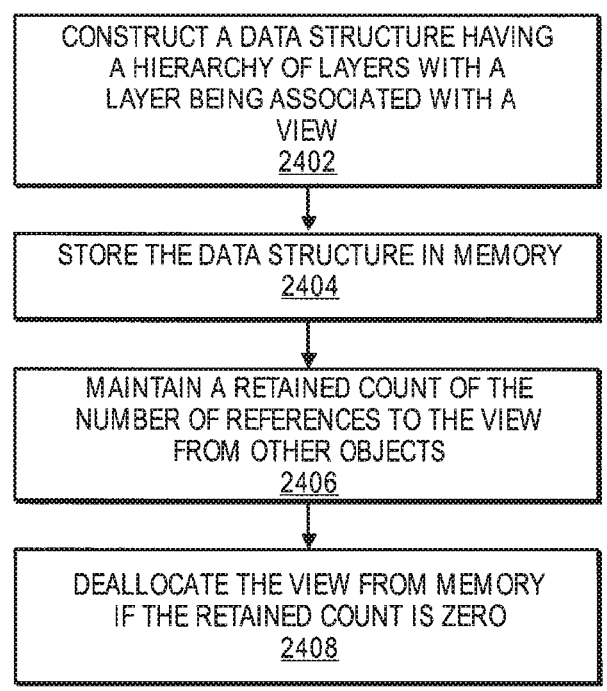
FIG. 24 illustrates a method for memory management of a view of an application displayed on a display of a device.

FIG. 24 illustrates a method for memory management of a view of an application displayed on a display of a device. The method 2400 includes constructing a data structure having a hierarchy of layers with at least one layer being associated with the view at block 2402. The method 2400 further includes storing the data structure in memory at block 2404. The method 2400 further includes maintaining a retained count of the number of references to the view from other objects at block 2406. The method 2400 further includes deallocating the view from memory if the retained count is zero at block 2408. As discussed above, the retained count of the view will be decremented if the layer is removed from the data structure. Removing the layer from the data structure may occur based on the view associated with the layer being removed from the display of the device.

Figure 25A:
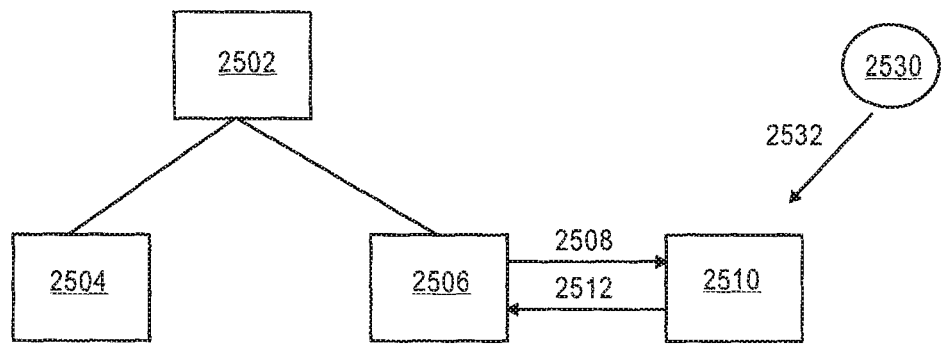
FIGS. 25A and 25B illustrate a data structure having a hierarchy of layers with a layer being associated with a view.
Figure 25B:
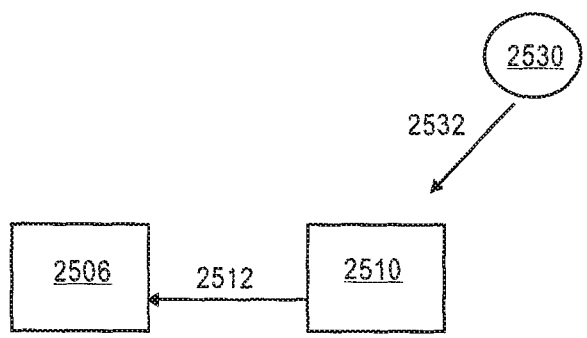

FIGS. 25A and 25B illustrate a data structure having a hierarchy of layers with a layer being associated with a view. The data structure includes layers 2502, 2504, and 2506. Layer 2506 is associated with the view 2510. The layer 2506 associated with the 2510 view sends a delegate call to the view in order to generate content provided by the view. A first pointer reference 2508 points from the layer 2506 to the view 2510. A second pointer reference 2512 points from the view 2510 to the layer 2506. A third pointer reference 2532 may point from user interface (UI) controller 2530 to the view 2510. The UI controller 2530 may control operations associated with the view 2510 such as scrolling the view 2510 in response to a user input. The view 2510 in FIG. 25A has a retained count of two based on the pointer references 2508 and 2532.

If the layer 2506 is removed from the data structure as illustrated in FIG. 25B, then the pointer 2508 is removed. View 2510 will have a lower retained count as illustrated in FIG. 25B. If view 2510 has a retained count of zero, then the memory storing the view 2510 will be deallocated.

Figure 26:
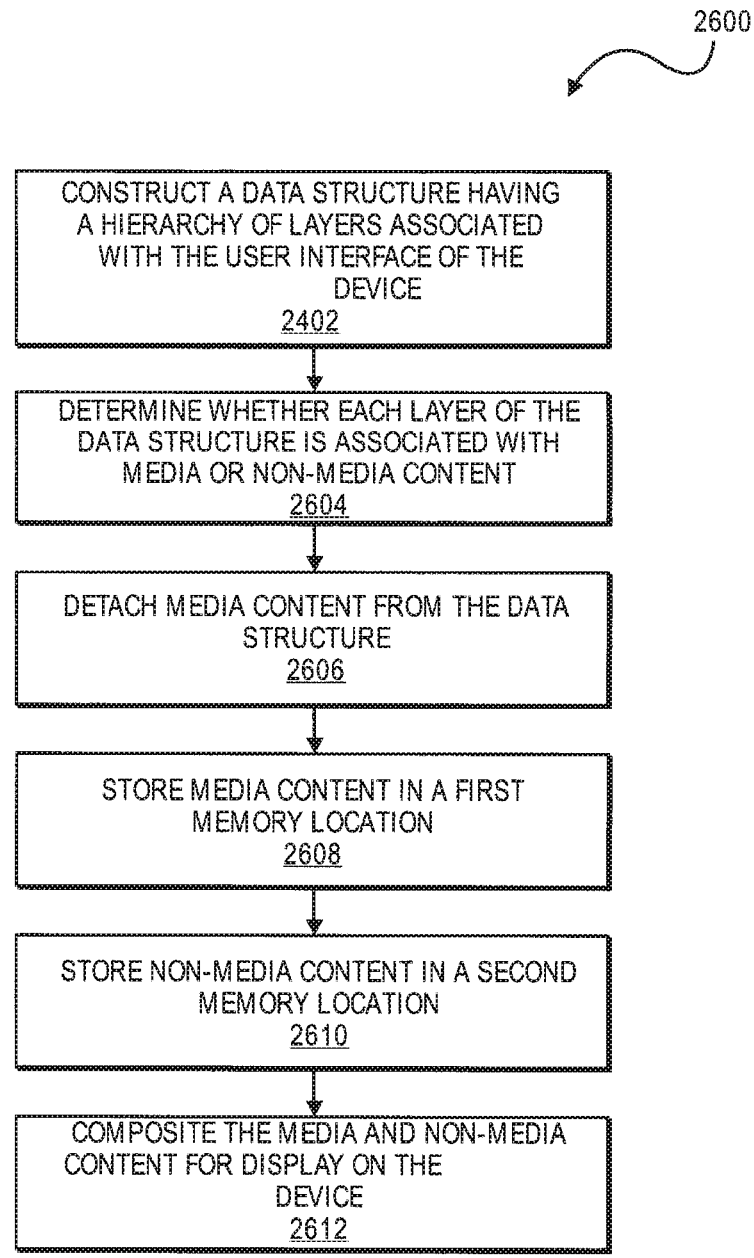
FIG. 26 illustrates a method for compositing media and non-media content of user interface for display on a device.

FIG. 26 illustrates a method for compositing media and non-media content of user interface for display on a device. The method 2600 includes constructing a data structure having a hierarchy of layers associated with the user interface of the device at block 2602. The method 2600 further includes determining whether each layer of the data structure is associated with media or non-media content at block 2604. The data structure or layer tree is traversed in order to determine whether each of the layers of the data structure is associated with media or non-media content. The method 2600 further includes detaching a layer associated with media content from the data structure at block 2606. The method 2600 further includes storing media content in a first memory location at block 2606. The method 2600 further includes storing non-media content in a second memory location at block 2608. The method 2600 further includes compositing the media and non-media content for display on the device at block 2610.

In some embodiments, compositing the media and non-media content includes retrieving the media content from the first memory location, retrieving the non-media content from the second memory location, and scanning the media and non-media content directly to the display. The memory location can be any type of memory located in cache, main memory, a graphics processing unit, or other location within a device. The media content may include video, video plug-in, audio, image, or other time varying media. The media content may be in the form of a YUV model with the Y representing a luminance component (the brightness) and U and V representing chrominance (color) components. The media content may be scanned to the display at a rate of substantially twenty to forty frames per second. The media content may be scaled prior to being scanned to the display of the device.

The non-media content may include content, views, and images that do not require frequent updating. The non-media content may be in the form of a RGB model which is an additive model in which red, green, and blue (often used in additive light models) are combined in various ways to reproduce other colors. The non-media content may be scanned to the display at a slower rate compared to the media content.

Figure 27:
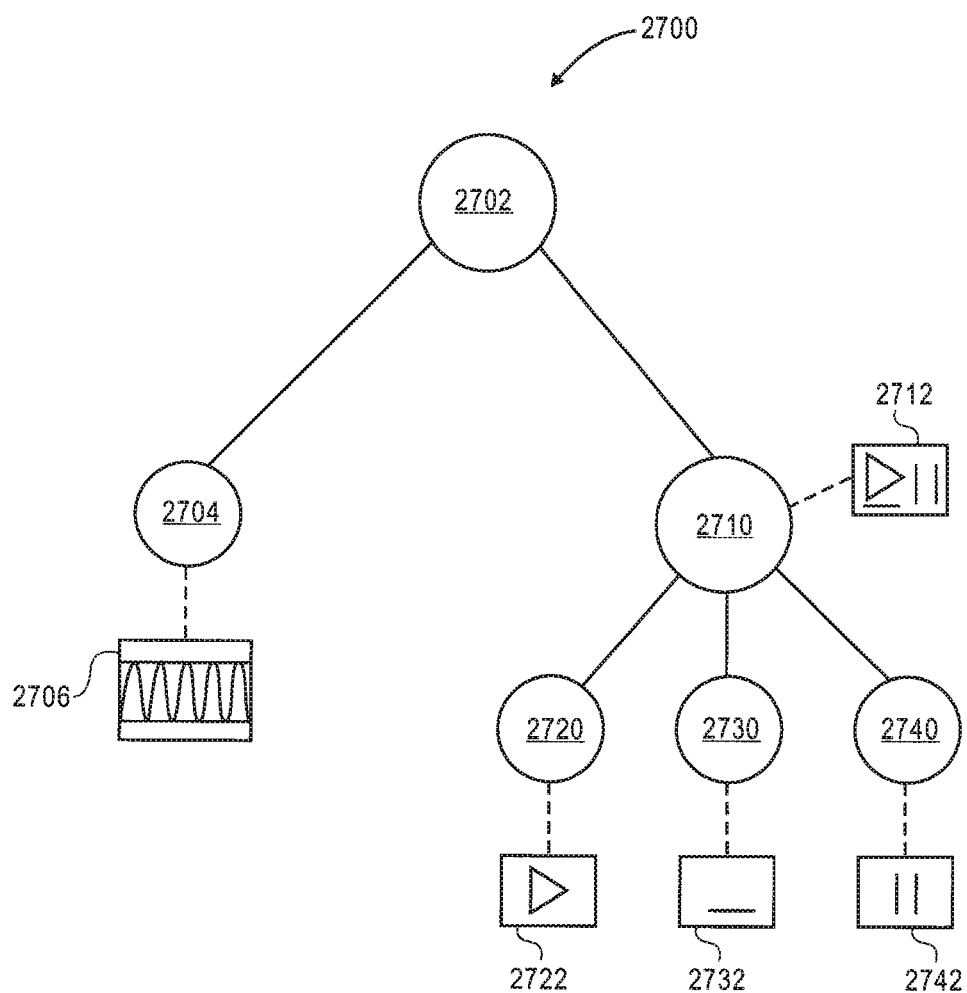
FIG. 27 illustrates a data structure or layer tree having a hierarchy of layers.

FIG. 27 illustrates a data structure or layer tree having a hierarchy of layers. The layers can be associated with media and non-media content. For example, layer 2704 is associated with media content 2706 such as a video. Layer 2710 is associated with non-media content 2712 which may be user interface view for the video. Layers 2720, 2730, and 2740 are associated with non-media content 2722, 2732, and 2742, respectively, that forms the components of the non-media content 2712. The method 2600 will determine whether each layer of the data structure is associated with media or non-content. Any layers associated with media content such as layer 2704 will be removed from the data structure and processed in a separate memory location.

In some embodiments, the methods, systems, and apparatuses of the present disclosure can be implemented in various devices including electronic devices, consumer devices, data processing devices, desktop computers, portable computers, wireless devices, cellular devices, tablet devices, handheld devices, multi touch devices, multi touch data processing devices, any combination of these devices, or other like devices. FIGS. 4-6 and 28-33 illustrate examples of a few of these devices.

Figure 28:
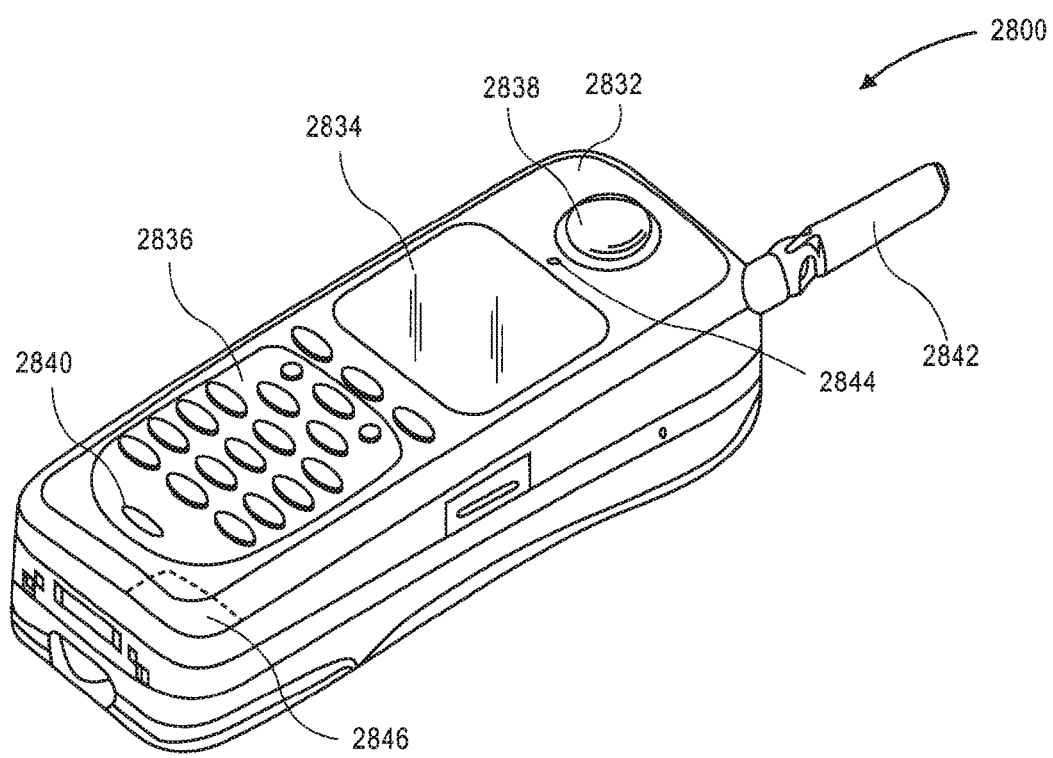
FIG. 28 is a perspective view of a device in accordance with one embodiment of the present disclosure.

FIG. 28 illustrates a device 2800 according to one embodiment of the disclosure. FIG. 28 shows a wireless device in a telephone configuration having a "candy-bar" style. In FIG. 28, the wireless device 2800 may include a housing 2832, a display device 2834, an input device 2836 which may be an alphanumeric keypad, a speaker 2838, a microphone 2840 and an antenna 2842, The wireless device 2800 also may include a proximity sensor 2844 and an accelerometer 2846. It will be appreciated that the embodiment of FIG. 28 may use more or fewer sensors and may have a different form factor from the form factor shown in FIG. 28.

The display device 2834 is shown positioned at an upper portion of the housing 2832, and the input device 2836 is shown positioned at a lower portion of the housing 2832. The antenna 2842 is shown extending from the housing 2832 at an upper portion of the housing 2832. The speaker 2838 is also shown at an upper portion of the housing 2832 above the display device 2834. The microphone 2840 is shown at a lower portion of the housing 2832, below the input device 3286. It will be appreciated that the speaker 2838 and microphone 2840 can be positioned at any location on the housing, but are typically positioned in accordance with a user's ear and mouth, respectively.

The display device 2834 may be, for example, a liquid crystal display (LCD) which does not include the ability to accept inputs or a touch input screen which also includes an LCD. The input device 2836 may include, for example, buttons, switches, dials, sliders, keys or keypad, navigation pad, touch pad, touch screen, and the like. Any well-known speaker, microphone and antenna can be used for speaker 2838, microphone 2840 and antenna 2842, respectively.

The data acquired from the proximity sensor 2844 and the accelerometer 2846 can be combined together, or used alone, to gather information about the user's activities. The data from the proximity sensor 2844, the accelerometer 2846 or both can be used, for example, to activate/deactivate a display backlight, initiate commands, make selections, control scrolling, gesturing, animating or other movement in a display, control input device settings, or to make other changes to one or more settings of the device. In certain embodiments of the present disclosure, the device 2800 can be used to implement at least some of the methods discussed in the present disclosure.

Figure 29:
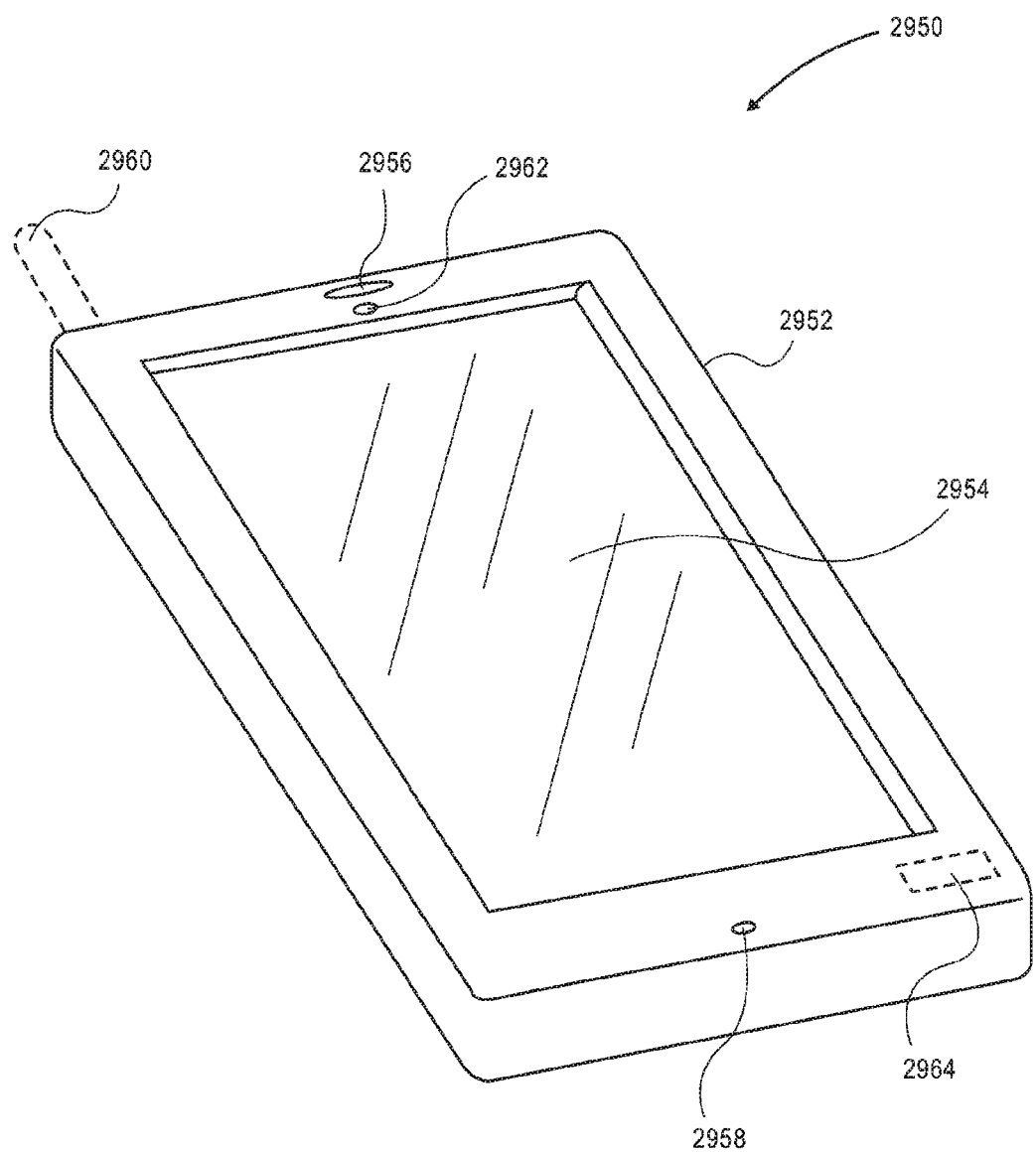
FIG. 29 is a perspective view of a device in accordance with one embodiment of the present disclosure.

FIG. 29 shows a device 2950 in accordance with one embodiment of the disclosure. The device 2950 may include a housing 2952, a display/input device 2954, a speaker 2956, a microphone 2958 and an optional antenna 2960 (which may be visible on the exterior of the housing or may be concealed within the housing). The device 2950 also may include a proximity sensor 2962 and an accelerometer 2964. The device 2950 may be a cellular telephone or a device which is an integrated PDA and a cellular telephone or a device which is an integrated media player and a cellular telephone or a device which is both an entertainment system (e.g. for playing games) and a cellular telephone, or the device 2950 may be other types of devices described herein. In one particular embodiment, the device 2950 may include a cellular telephone and a media player and a PDA, all contained within the housing 2952. The device 2950 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer and an iPod are portable devices.

In one embodiment, the display/input device 2954 may include a multi-point touch input screen in addition to being a display, such as an LCD. In one embodiment, the multi-point touch screen is a capacitive sensing medium configured to detect multiple touches (e.g., blobs on the display from a user's face or multiple fingers concurrently touching or nearly touching the display) or near touches (e.g., blobs on the display) that occur at the same time and at distinct locations in the plane of the touch panel and to produce distinct signals representative of the location of the touches on the plane of the touch panel for each of the multiple touches.

In certain embodiments of the present disclosure, the device 2800 can be used to implement at least some of the methods discussed in the present disclosure.

Figure 30A:
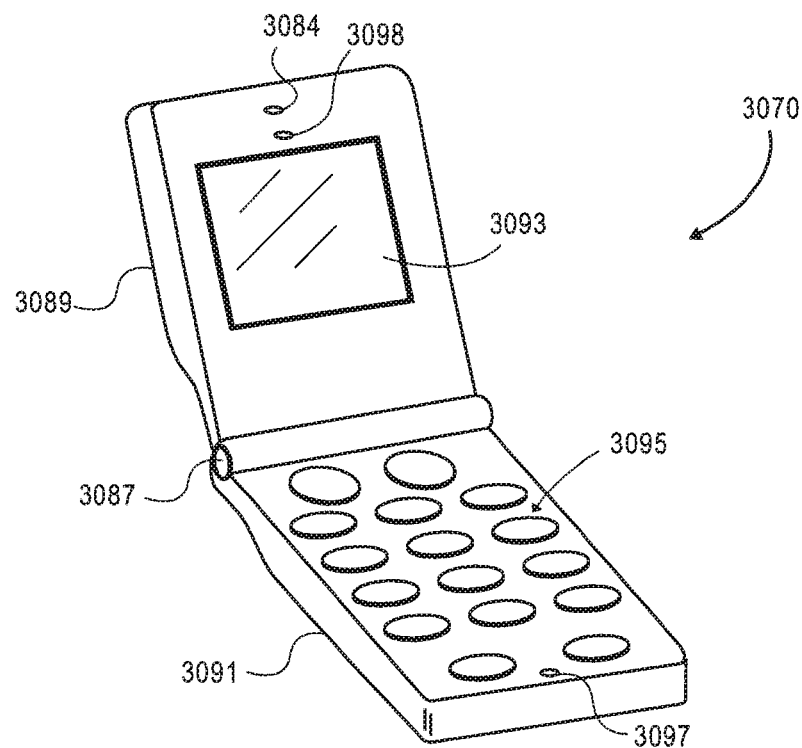
FIGS. 30A and 30B illustrate a device 3070 according to one embodiment of the disclosure.
Figure 30B:
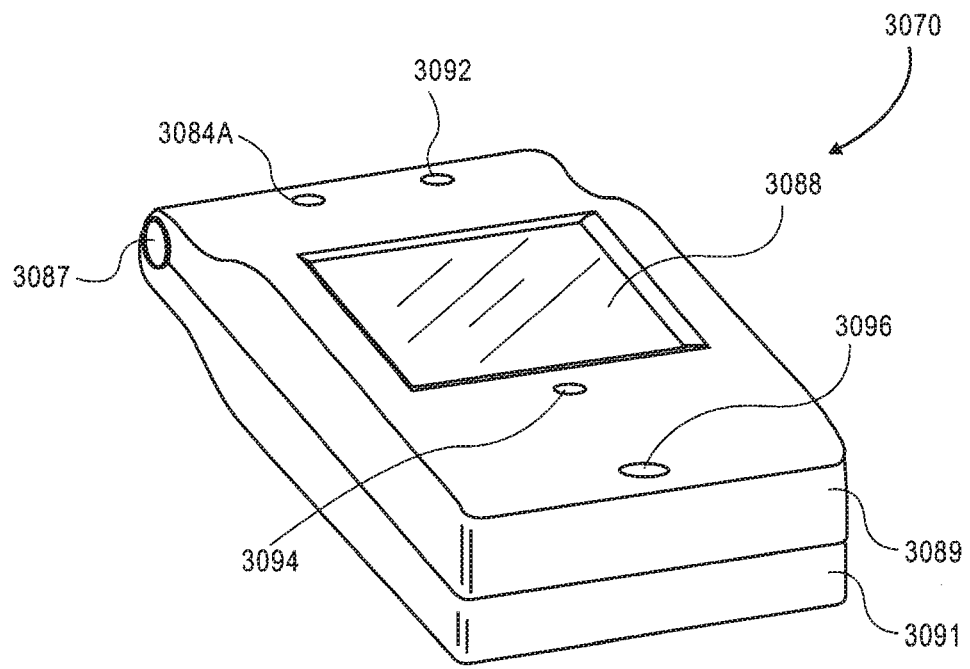

FIGS. 30A and 30B illustrate a device 3070 according to one embodiment of the disclosure. The device 3070 may be a cellular telephone which includes a hinge 3087 that couples a display housing 3089 to a keypad housing 3091. The hinge 3087 allows a user to open and close the cellular telephone so that it can be placed in at least one of two different configurations shown in FIGS. 30A and 30B. In one particular embodiment, the hinge 3087 may rotatably couple the display housing to the keypad housing. In particular, a user can open the cellular telephone to place it in the open configuration shown in FIG. 30A and can close the cellular telephone to place it in the closed configuration shown in FIG. 30B. The keypad housing 3091 may include a keypad 3095 which receives inputs (e.g. telephone number inputs or other alphanumeric inputs) from a user and a microphone 3097 which receives voice input from the user. The display housing 3089 may include, on its interior surface, a display 3093 (e.g. an LCD) and a speaker 3098 and a proximity sensor 3084; on its exterior surface, the display housing 3089 may include a speaker 3096, a temperature sensor 3094, a display 3088 (e.g. another LCD), an ambient light sensor 3092, and a proximity sensor 3084A. Hence, in this embodiment, the display housing 3089 may include a first proximity sensor on its interior surface and a second proximity sensor on its exterior surface.

In at least certain embodiments, the device 3070 may contain components which provide one or more of the functions of a wireless communication device such as a cellular telephone, a media player, an entertainment system, a PDA, or other types of devices described herein. In one implementation of an embodiment, the device 3070 may be a cellular telephone integrated with a media player which plays MP3 files, such as MP3 music files.

Figure 31:
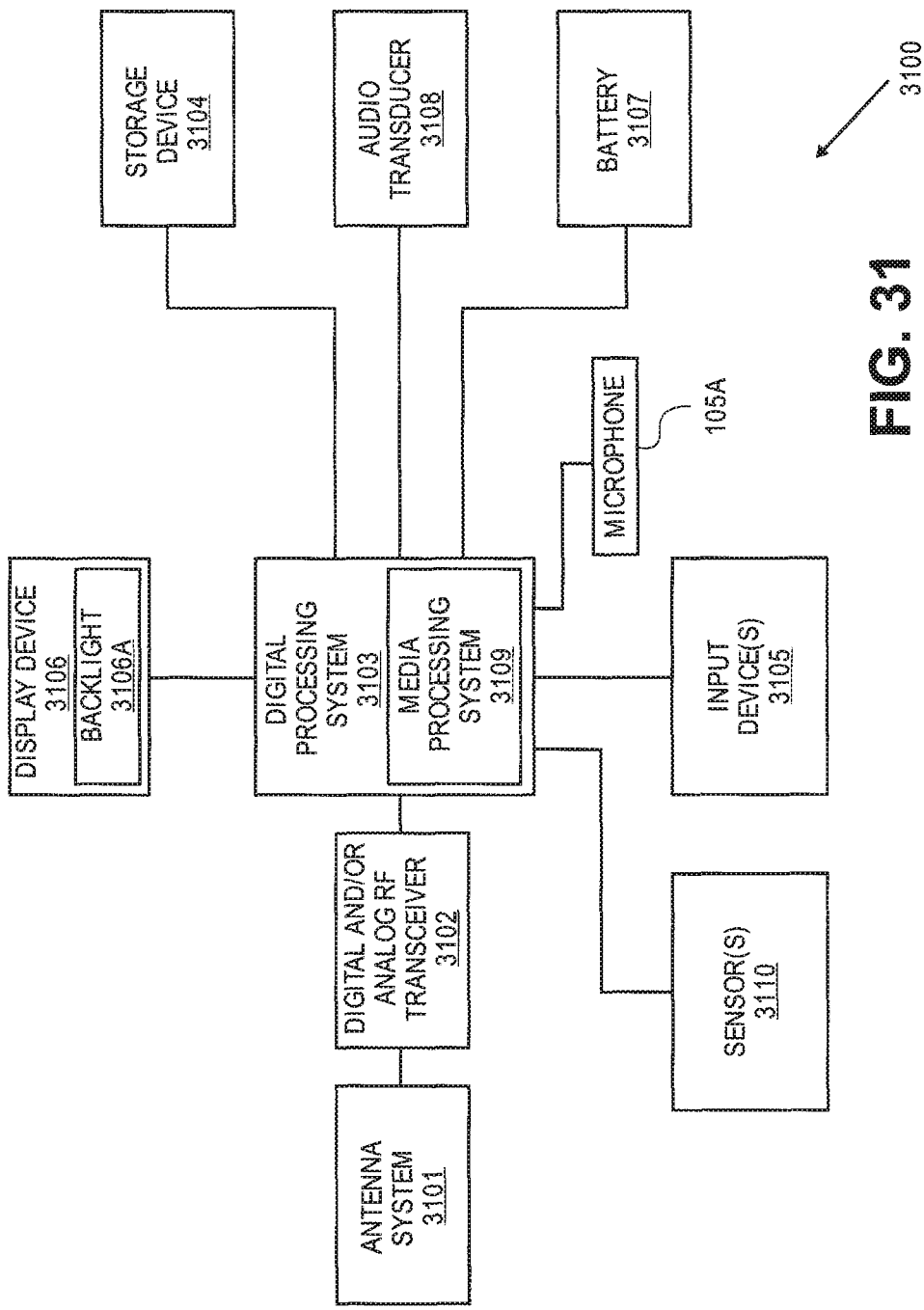
FIG. 31 is a block diagram of a system in which embodiments of the present disclosure can be implemented.

Each of the devices shown in FIGS. 4, 5A, 5B, 5C, 6A, 6B, 6C, 6D, 28, 29, 30A and 30B may be a wireless communication device, such as a cellular telephone, and may include a plurality of components which provide a capability for wireless communication. FIG. 31 shows an embodiment of a wireless device 3070 which includes the capability for wireless communication. The wireless device 3070 may be included in any one of the devices shown in FIGS. 4, 5A, 5B, 5C, 6A, 6B, 6C, 6D, 28, 29, 30A and 30B, although alternative embodiments of those devices of FIGS. 4, 5A, 5B, 5C, 6A, 6B, 6C, 6D, 28, 29, 30A and 30B may include more or fewer components than the Wireless device 3070.

Wireless device 3070 may include an antenna system 3101. Wireless device 3070 may also include a digital and/or analog radio frequency (RF) transceiver 3102, coupled to the antenna system 3101, to transmit and/or receive voice, digital data and/or media signals through antenna system 3101.

Wireless device 3070 may also include a digital processing system 3103 to control the digital RF transceiver and to manage the voice, digital data and/or media signals. Digital processing system 3103 may be a general purpose processing device, such as a microprocessor or controller for example. Digital processing system 3103 may also be a special purpose processing device, such as an ASIC (application specific integrated circuit), FPGA (field-programmable gate array) or DSP (digital signal processor). Digital processing system 3103 may also include other devices, as are known in the art, to interface with other components of wireless device 3070. For example, digital processing system 3103 may include analog-to-digital and digital-to-analog converters to interface with other components of wireless device 3070. Digital processing system 3103 may include a media processing system 3109, which may also include a general purpose or special purpose processing device to manage media, such as files of audio data.

Wireless device 3070 may also include a storage device 3104, coupled to the digital processing system, to store data and/or operating programs for the Wireless device 3070. Storage device 3104 may be, for example, any type of solid-state or magnetic memory device.

Wireless device 3070 may also include one or more input devices 3105, coupled to the digital processing system 3103, to accept user inputs (e.g., telephone numbers, names, addresses, media selections, etc.) Input device 3105 may be, for example, one or more of a keypad, a touchpad, a touch screen, a pointing device in combination with a display device or similar input device.

Wireless device 3070 may also include at least one display device 33106, coupled to the digital processing system 3103, to display information such as messages, telephone call information, contact information, pictures, movies and/or titles or other indicators of media being selected via the input device 3105. Display device 3106 may be, for example, an LCD display device. In one embodiment, display device 3106 and input device 3105 may be integrated together in the same device (e.g., a touch screen LCD such as a multi-touch input panel which is integrated with a display device, such as an LCD display device). The display device 3106 may include a backlight 3106A to illuminate the display device 3106 under certain circumstances. It will be appreciated that the Wireless device 3070 may include multiple displays.

Wireless device 3070 may also include a battery 3107 to supply operating power to components of the system including digital RF transceiver 3102, digital processing system 3103, storage device 3104, input device 3105, microphone 3105A, audio transducer 3108, media processing system 3109, sensor(s) 3110, and display device 3106. Battery 3107 may be, for example, a rechargeable or non-rechargeable lithium or nickel metal hydride battery. Wireless device 3070 may also include audio transducers 3108, which may include one or more speakers, and at least one microphone 3105A. In certain embodiments of the present disclosure, the wireless device 3070 can be used to implement at least some of the methods discussed in the present disclosure.

Figure 32:
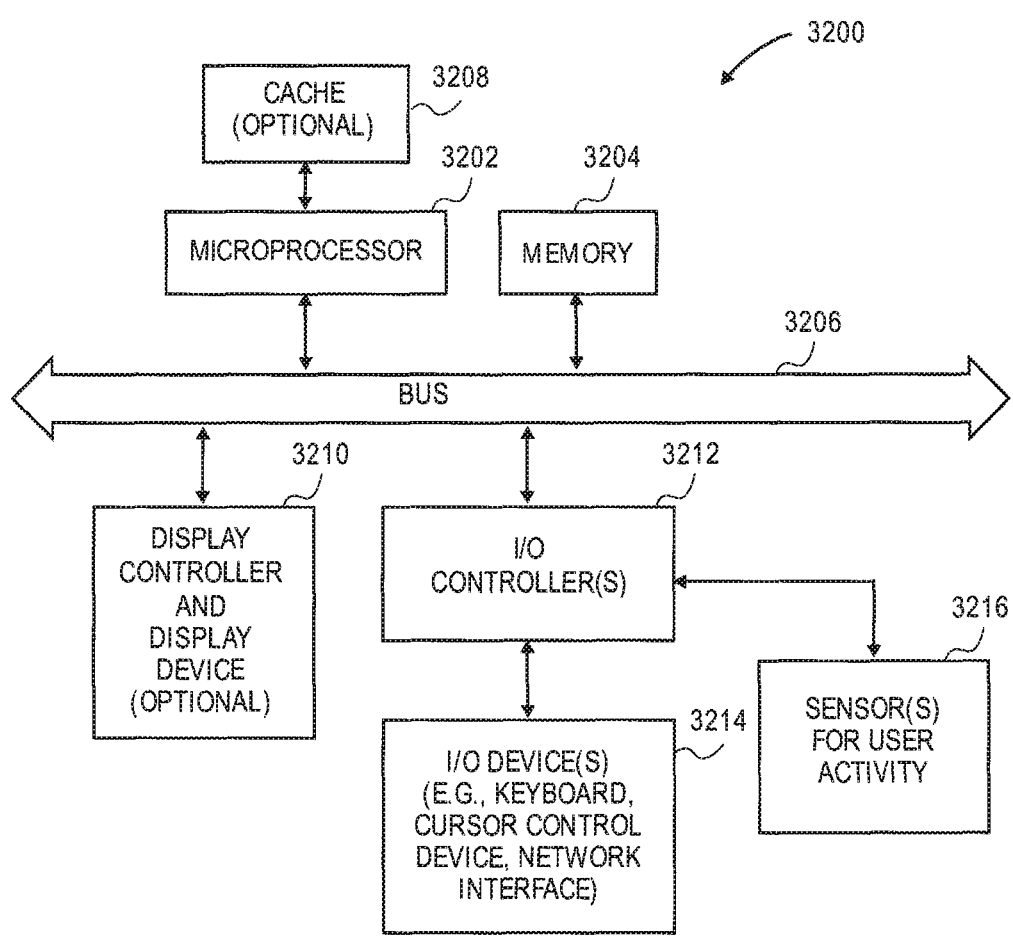
FIG. 32 shows another example of a device in accordance with one embodiment of the present disclosure.

FIG. 32 shows another example of a device according to an embodiment of the disclosure. This device 3200 may include a processor, such as microprocessor 3202, and a memory 3204, which are coupled to each other through a bus 3206. The device 3200 may optionally include a cache 3208 which is coupled to the microprocessor 3202. This device may also optionally include a display controller and display device 3210 which is coupled to the other components through the bus 3206. One or more input/output controllers 3212 are also coupled to the bus 3206 to provide an interface for input/output devices 3214 and to provide an interface for one or more sensors 3216 which are for sensing user activity. The bus 3206 may include one or more buses connected to each other through various bridges, controllers, and/or adapters as is well known in the art. The input/output devices 3214 may include a keypad or keyboard or a cursor control device such as a touch input panel. Furthermore, the input/output devices 3214 may include a network interface which is either for a wired network or a wireless network (e.g. an RF transceiver). The sensors 3216 may be any one of the sensors described herein including, for example, a proximity sensor or an ambient light sensor. In at least certain implementations of the device 3200, the microprocessor 3202 may receive data from one or more sensors 3216 and may perform the analysis of that data in the manner described herein. For example, the data may be analyzed through an artificial intelligence process or in the other ways described herein. As a result of that analysis, the microprocessor 3202 may then automatically cause an adjustment in one or more settings of the device.

In certain embodiments of the present disclosure, the device 3200 can be used to implement at least some of the methods discussed in the present disclosure.

Figure 33A:
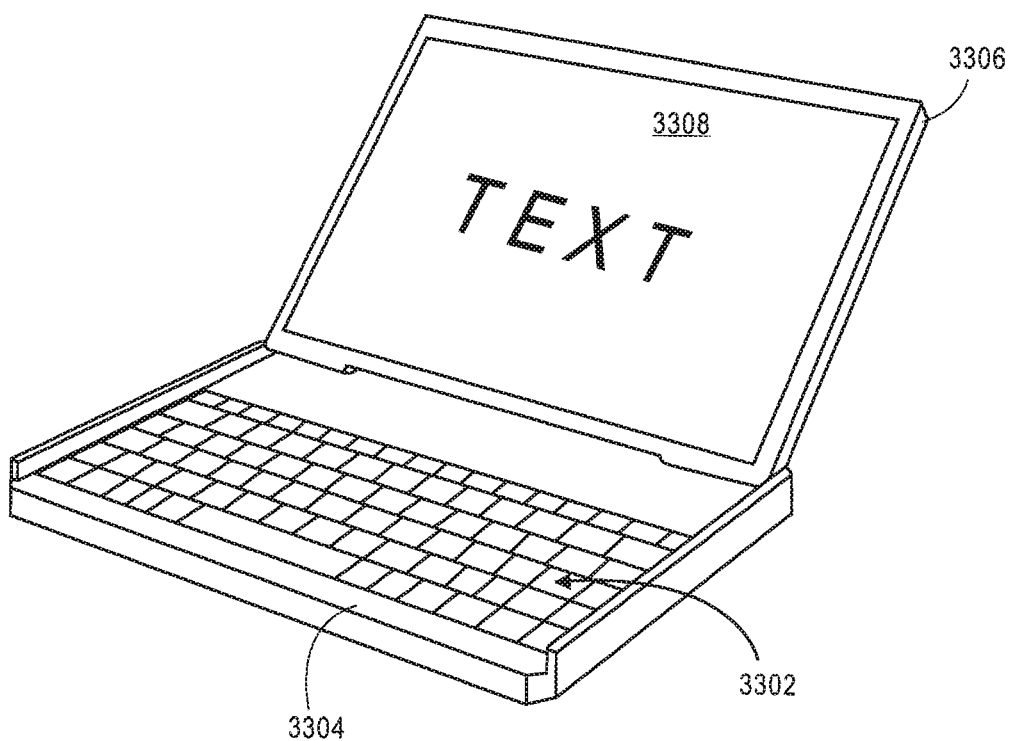
FIG. 33A is a perspective view of a device in a first configuration (e.g. in a laptop configuration) in accordance with one embodiment of the present disclosure.
Figure 33B:
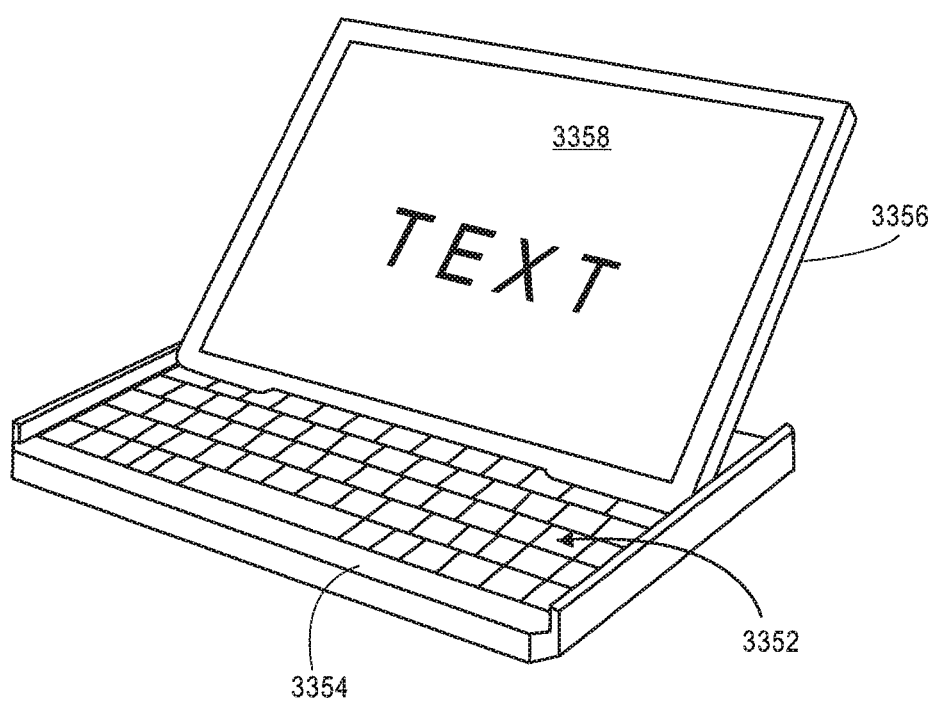
FIG. 33B is a perspective view of the device of FIG. 33A in a second configuration (e.g. a transition configuration) in accordance with one embodiment of the present disclosure.
Figure 33C:
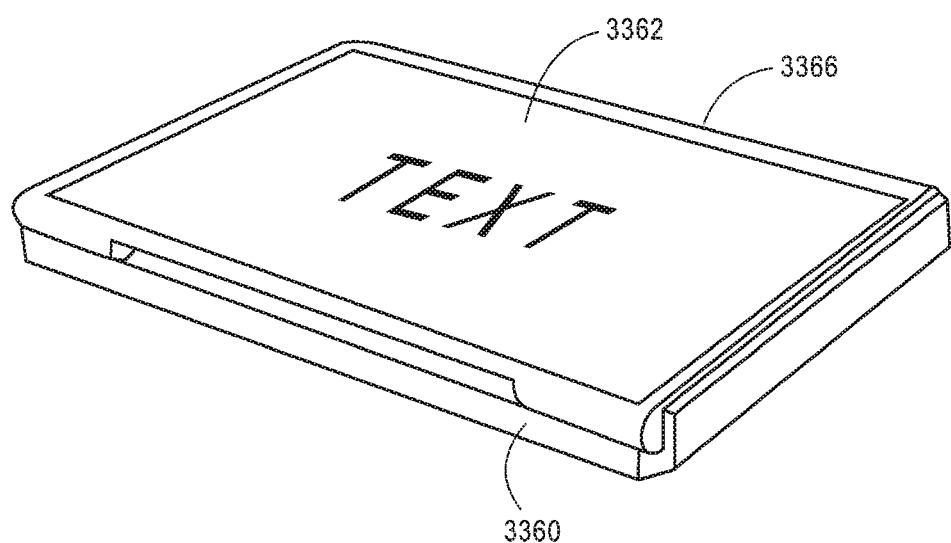
FIG. 33C is a perspective view of the device of FIG. 33A in a third configuration (e.g., a tablet configuration) in accordance with one embodiment of the present disclosure.

FIGS. 33A-C show another example of a device according to at least certain embodiments of the disclosure. FIG. 33A illustrates a laptop device 3300 with a keyboard 3302, a body 3304, a display frame 3306, and a display 3308. The laptop device 3300 can be converted into a tablet device as illustrated in FIG. 33B and FIG. 33C. FIG. 33B illustrates the conversion of the laptop device into a tablet device. An edge of a display frame 3356 containing a display 3358 is slide within the body 3354 across the top of a keyboard 3352 until forming a tablet device as illustrated in FIG. 33C. The tablet device with a display 2362 and a display frame 3366 rests on top of a body 3360.

In certain embodiments of the present disclosure, the laptop device 3300 can be used to implement at least some of the methods discussed in the present disclosure.

Figure 34:
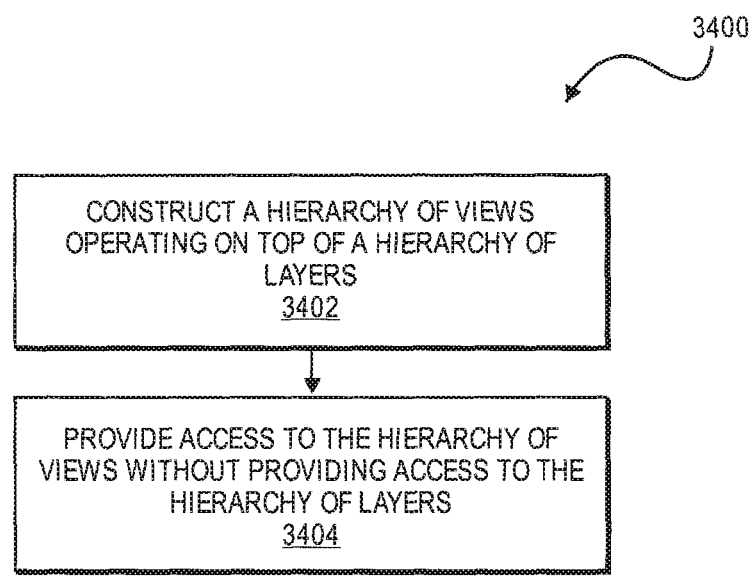
FIG. 34 illustrates details of an application programming interface in flow chart form according to certain teachings of the present disclosure.
Figure 35:
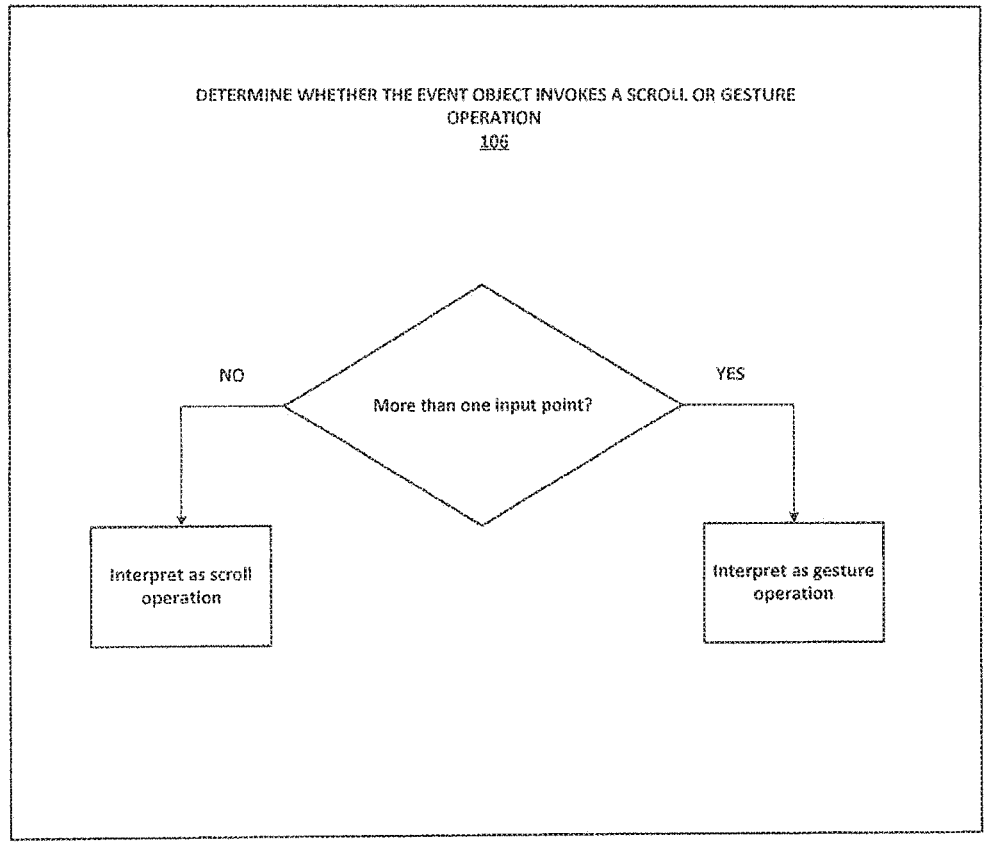
FIG. 35 illustrates a portion of a flow chart of a method for responding to a user input of a data processing device.

FIG. 34 illustrates details of an application programming interface in flow chart form according to certain teachings of the present disclosure. The application programming interface operates in an environment with user interface software interacting with a software application. In some embodiments, a hierarchy of views operates on top of a hierarchy of layers within the user interface software. The API operates as illustrated in method 3400 that includes constructing a hierarchy of views operating on top of a hierarchy of layers at block 3402. The method 3400 further includes providing access to the hierarchy of views without providing access to the hierarchy of layers at block 3404. An application may interact with the hierarchy of views via the API without accessing the hierarchy of layers operating below the hierarchy of views.

In some embodiments, a platform provides various scrolling, gesturing, and animating operations. The platform includes hardware components and an operating system. The hardware components may include a processing unit coupled to an input panel and a memory coupled to the processor. The operating system includes one or more programs that are stored in the memory and configured to be executed by the processing unit. One or more programs include various instructions for transferring function calls or messages through an application programming interface in order to perform various scrolling, gesturing, and animating operations.

In an embodiment, the one or more programs include instructions for transferring a bounce call through an API to cause a bounce of a scrolled region in an opposite direction of a scroll based on a region past an edge of the scrolled region being visible in a display region at the end of the scroll. In an embodiment, the one or more programs include instructions for transferring a rubberband call through an API to cause a rubberband effect on a scrolled region by a predetermined maximum displacement when the scrolled region exceeds a display edge based on a scroll. In an embodiment, the one or more programs include instructions for transferring a directional scroll call through an API to seta scroll angle for locking the scrolling in at least one of a vertical or a horizontal direction.

In an embodiment, the one or more programs include instructions for transferring a scroll hysteresis call through an API to determine whether a user input invokes a scroll.

In an embodiment, the one or more programs include instructions for transferring a deceleration scroll call through an API to set a deceleration factor for a user input based on the user input invoking a scroll. In an embodiment, the one or more programs include instructions for transferring a scroll indicator call through an API to determine whether at least one scroll indicator attaches to a content edge or a display edge of a display region.

In some embodiments, the platform includes a framework containing a library of software code. The framework interacts with the programs of the platform to provide application programming interfaces for performing various scrolling, gesturing, and animating operations. The framework also includes associated resources (e.g., images, text, etc.) that are stored in a single directory.

In an embodiment, the library of the framework provides an API for specifying a bounce operation to cause a bounce of a scrolled region in an opposite direction of a scroll based on a region past an edge of the scrolled region being visible in a display region at the end of the scroll. In an embodiment, the library of the framework provides an API for specifying a rubberband operation that has a rubberband effect on a scrolled region by a predetermined maximum displacement when the scrolled region exceeds a display edge based on a scroll. In an embodiment, the library of the framework provides an API for specifying a directional scroll operation to set a scroll angle for locking the scrolling in at least one of a vertical or a horizontal direction.

In an embodiment, the library of the framework provides an API for specifying a scroll hysteresis operation to determine whether a user input invokes a scroll. In an embodiment, the library of the framework provides an API for specifying a deceleration scroll operation to set a deceleration factor for a user input based on the user input invoking a scroll. In an embodiment, the library of the framework provides an API for specifying a scroll indicator operation to determine whether at least one scroll indicator attaches to a content edge or a display edge of a display region.

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory computer-readable storage medium storing executable program instructions, which when executed by an electronic device with a processor and a touch-sensitive display, cause the device to:
   receive a user input, the user input is one or more input points applied to the touch-sensitive display;
   create an event object in response to the user input;
   determine whether the event object invokes a scroll or gesture operation by distinguishing between the user input consisting of a single input point that moves a distance across the touch-sensitive display that is interpreted as the scroll operation, and the user input consisting of a plurality of input points applied to the touch-sensitive display that are interpreted as the gesture operation; and
   issue at least one scroll or gesture call based on invoking the scroll operation or gesture operation.

2. The medium of claim 1, wherein the executable program instructions, when executed by the device, further cause the device to:
   while the scroll operation is invoked:
      in accordance with a determination that an angle formed by the user input with a horizontal line on the touch-sensitive display is less than a threshold angle, lock the scrolling in a horizontal direction; and
      in accordance with a determination that an angle formed by the user input with a vertical line on the touch-sensitive display is less than the threshold angle, lock the scrolling in a vertical direction.

3. The medium of claim 1, wherein the executable program instructions, when executed by the device, further cause the device to:
   while the scroll operation is invoked:
      scroll a window associated with the event object;
      rubberband a scrolled region of the window by a predetermined maximum displacement value as the scrolled region exceeds an edge of the window; and
      bounce the scrolled region in an opposite direction of the scroll in response to termination of the user input.

4. The medium of claim 1, wherein the executable program instructions, when executed by the device, further cause the device to:
   while the operation gesture invoked is a scaling operation:
      scale a view associated with the event object while maintaining a center of the view as a center of the scaled view.

5. The medium of claim 1, wherein the executable program instructions, when executed by the device, further cause the device to:
   while the operation gesture invoked is a scaling operation:
      scale a view associated with the event object based on a scale factor that is within a range of a minimum scale factor and a maximum scale factor, the minimum and maximum scale factors being associated with the event object, wherein the scale factor is determined based on movement of the plurality of input points of the user input on the touch-sensitive display.

6. The medium of claim 1, wherein the executable program instructions, when executed by the device, further cause the device to:
   while the operation gesture invoked is a rotating operation:
      rotate a view associated with the event object by a rotation angle that is within a range of a minimum rotation angle and a maximum rotation angle, the minimum and maximum rotation angles being associated with the event object, wherein the rotation angle is determined based on movement of the plurality of input points of the user input on the touch-sensitive display.

7. An electronic device, comprising:
   a touch-sensitive display;
   one or more processors;
   a memory storing executable program instructions, which when executed by the one or more processors, cause the device to:
      receive a user input, the user input is one or more input points applied to the touch-sensitive display;
      create an event object in response to the user input;
      determine whether the event object invokes a scroll or gesture operation by distinguishing between the user input consisting of a single input point that moves a distance across the touch-sensitive display that is interpreted as the scroll operation, and the user input consisting of a plurality of input points applied to the touch-sensitive display that are interpreted as the gesture operation; and issue at least one scroll or gesture call based on invoking the scroll operation or gesture operation.

8. The device of claim 7, wherein the executable program instructions, when executed by the one or more processors, further cause the device to:

while the scroll operation is invoked:
in accordance with a determination that an angle formed by the user input with a horizontal line on the touch-sensitive display is less than a threshold angle, lock the scrolling in a horizontal direction; and
in accordance with a determination that an angle formed by the user input with a vertical line on the touch-sensitive display is less than the threshold angle, lock the scrolling in a vertical direction.

9. The device of claim 7, wherein the executable program instructions, when executed by the one or more processors, further cause the device to:

while the scroll operation is invoked:
scroll a window associated with the event object;
rubberband a scrolled region of the window by a predetermined maximum displacement value as the scrolled region exceeds an edge of the window; and
bounce the scrolled region in an opposite direction of the scroll in response to termination of the user input.

10. The device of claim 7, wherein the executable program instructions, when executed by the one or more processors, further cause the device to:

while the operation gesture invoked is a scaling operation:
scale a view associated with the event object while maintaining a center of the view as a center of the scaled view.

11. The device of claim 7, wherein the executable program instructions, when executed by the one or more processors, further cause the device to:

while the operation gesture invoked is a scaling operation:
scale a view associated with the event object based on a scale factor that is within a range of a minimum scale factor and a maximum scale factor, the minimum and maximum scale factors being associated with the event object, wherein the scale factor is determined based on movement of the plurality of input points of the user input on the touch-sensitive display.

12. The device of claim 7, wherein the executable program instructions, when executed by the one or more processors, further cause the device to:

while the operation gesture invoked is a rotating operation:
rotate a view associated with the event object by a rotation angle that is within a range of a minimum rotation angle and a maximum rotation angle, the minimum and maximum rotation angles being associated with the event object, wherein the rotation angle is determined based on movement of the plurality of input points of the user input on the touch-sensitive display.

13. A method, comprising:
at an electronic device with a touch-sensitive display:
receiving a user input, the user input is one or more input points applied to the touch-sensitive display;
creating an event object in response to the user input;
determining whether the event object invokes a scroll or gesture operation by distinguishing between the user input consisting of a single input point that moves a distance across the touch-sensitive display that is interpreted as the scroll operation, and the user input consisting of a plurality of input points applied to the touch-sensitive display that are interpreted as the gesture operation; and
issuing at least one scroll or gesture call based on invoking the scroll or gesture operation.

14. The method of claim 13, further comprising:
while the scroll operation is invoked:
in accordance with a determination that an angle formed by the user input with a horizontal line on the touch-sensitive display is less than a threshold angle, locking the scrolling in a horizontal direction; and
in accordance with a determination that an angle formed by the user input with a vertical line on the touch-sensitive display is less than the threshold angle, locking the scrolling in a vertical direction.

15. The method of claim 13, further comprising:
while the scroll operation is invoked:
scrolling a window associated with the event object;
rubberbanding a scrolled region of the window by a predetermined maximum displacement value as the scrolled region exceeds an edge of the window; and
bouncing the scrolled region in an opposite direction of the scroll in response to termination of the user input.

16. The method of claim 13, further comprising:
while the operation gesture invoked is a scaling operation:
scaling a view associated with the event object while maintaining a center of the view as a center of the scaled view.

17. The method of claim 13, further comprising:
while the operation gesture invoked is a scaling operation:
scaling a view associated with the event object based on a scale factor that is within a range of a minimum scale factor and a maximum scale factor, the minimum and maximum scale factors being associated with the event object, wherein the scale factor is determined based on movement of the plurality of input points of the user input on the touch-sensitive display.

18. The method of claim 13, further comprising:
while the operation gesture invoked is a rotating operation:
rotating a view associated with the event object by a rotation angle that is within a range of a minimum rotation angle and a maximum rotation angle, the minimum and maximum rotation angles being associated with the event object, wherein the rotation angle is determined based on movement of the plurality of input points of the user input on the touch-sensitive display.

* * * * *